Aug. 17, 1965     H. C. LEHDE ETAL     3,200,888
POTATO HARVESTER

Filed Feb. 15, 1960     26 Sheets-Sheet 1

INVENTORS
Henry C. Lehde
John J. Dickerman
BY
Reuben J. Carlson
Attorney

INVENTORS
Henry C. Lehde
John J. Dickerman
BY
Reuben J. Carlson
Attorney

Aug. 17, 1965　　　H. C. LEHDE ETAL　　　3,200,888
POTATO HARVESTER
Filed Feb. 15, 1960　　　　　　　　　　　　　26 Sheets-Sheet 3

INVENTORS
Henry C. Lehde
John J. Dickerman
BY
Reuben I. Carlson
Attorney

Aug. 17, 1965 H. C. LEHDE ETAL 3,200,888
POTATO HARVESTER

Filed Feb. 15, 1960 26 Sheets-Sheet 4

INVENTORS
Henry C. Lehde
John J. Dickerman
BY
Reuben J. Carlson
Attorney

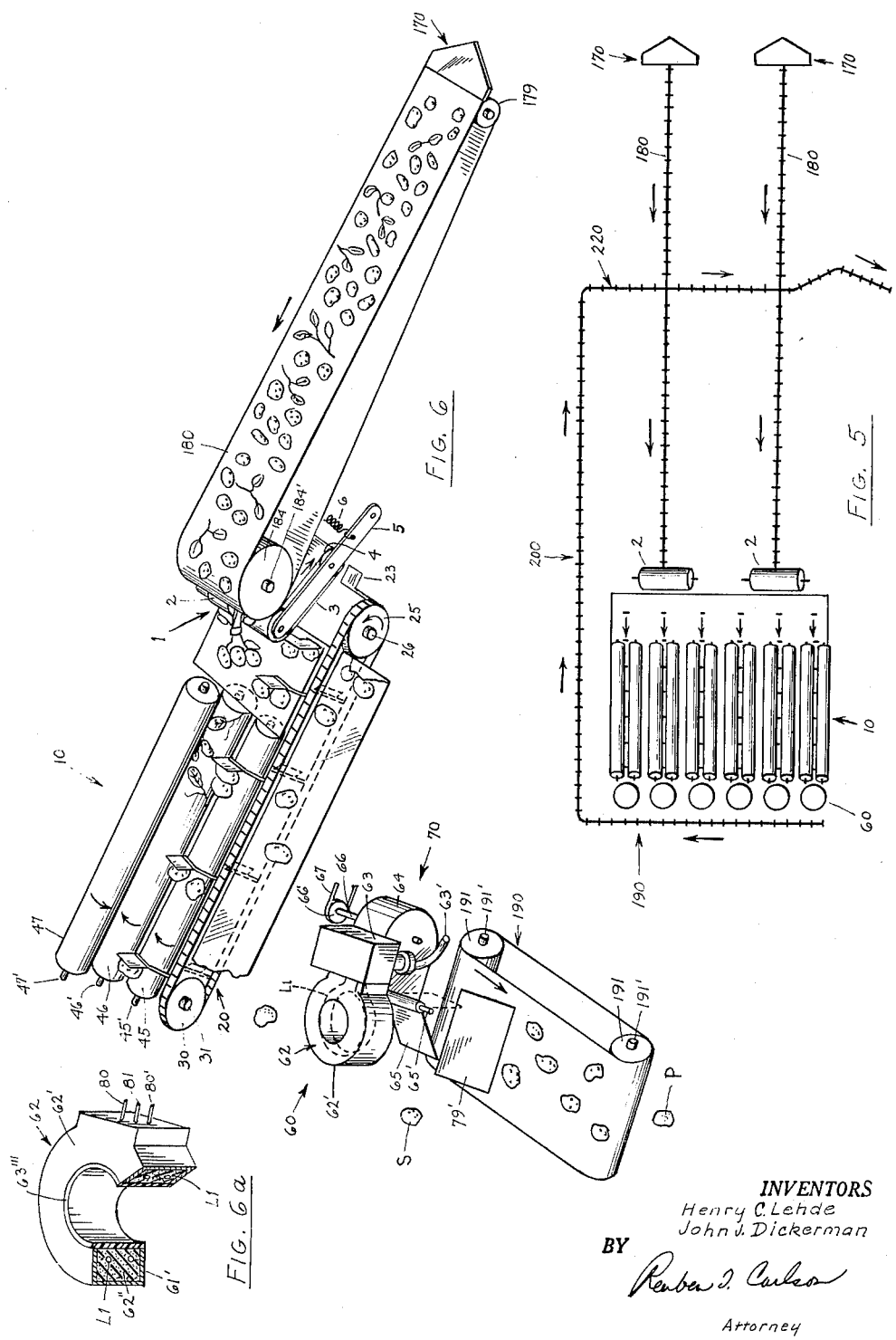

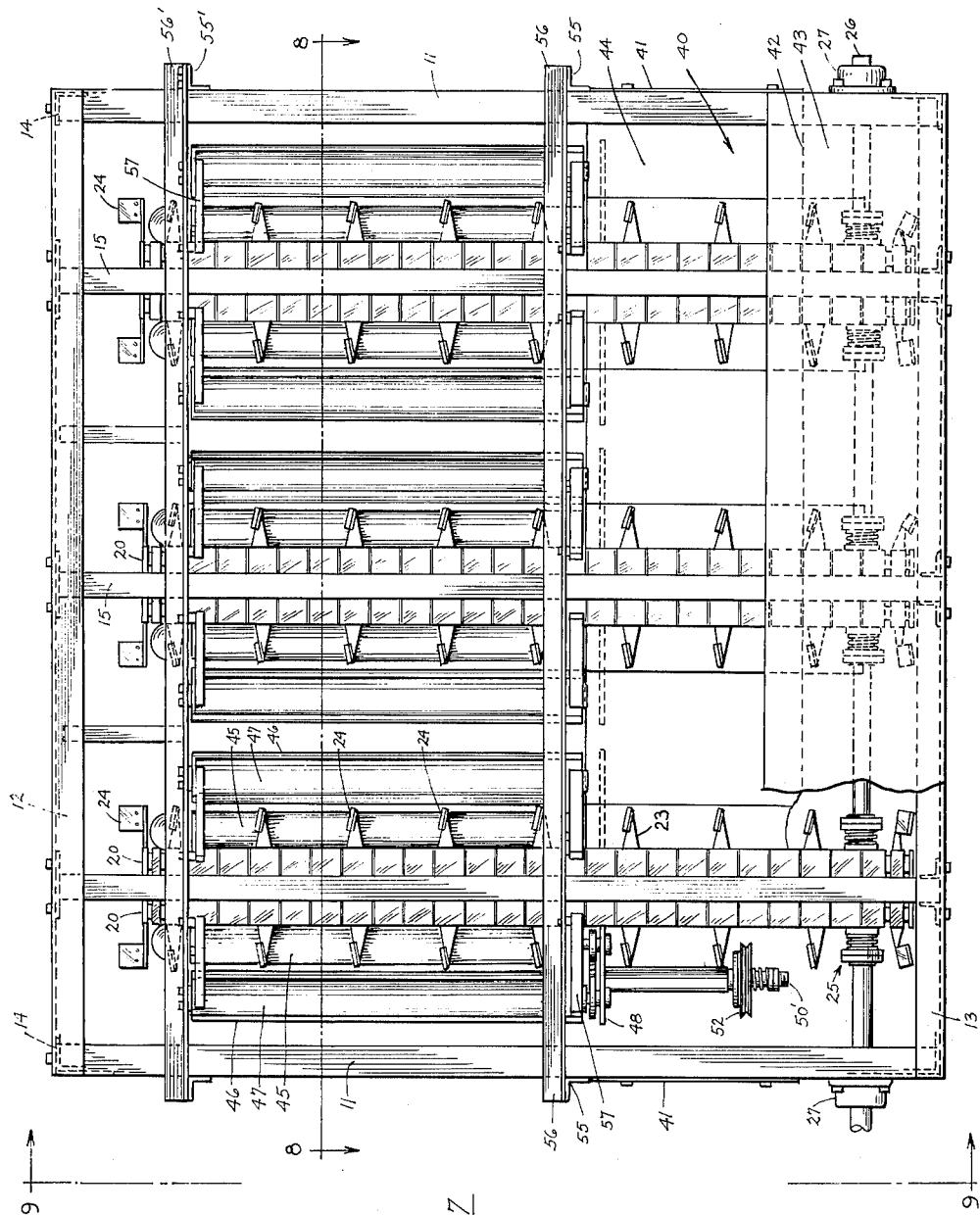

Aug. 17, 1965    H. C. LEHDE ETAL    3,200,888
POTATO HARVESTER
Filed Feb. 15, 1960    26 Sheets-Sheet 7

INVENTORS
Henry C. Lehde
John J. Dickerman
BY
Reuben J. Carlson
Attorney

Aug. 17, 1965  H. C. LEHDE ETAL  3,200,888
POTATO HARVESTER
Filed Feb. 15, 1960  26 Sheets-Sheet 8

INVENTORS
Henry C Lehde
John J. Dickerman
BY
Reuben J. Carlson
Attorney

INVENTORS
Henry C. Lehde
John J. Dickerman

BY

Attorney

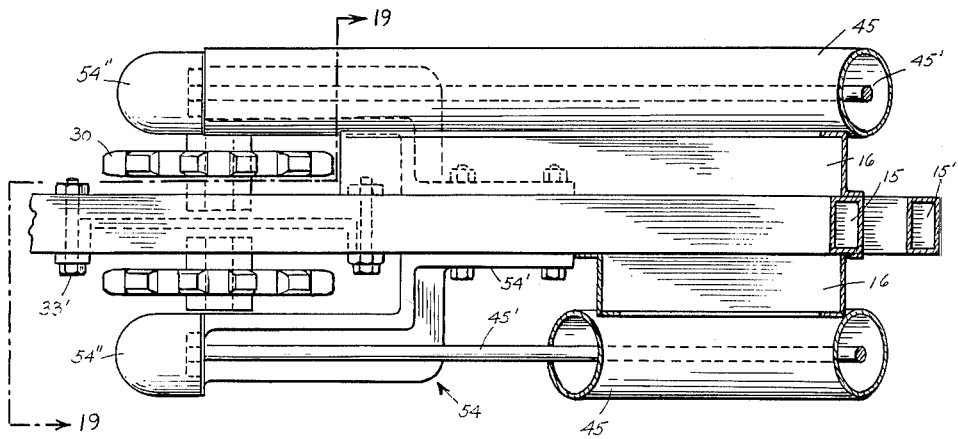
FIG. 16
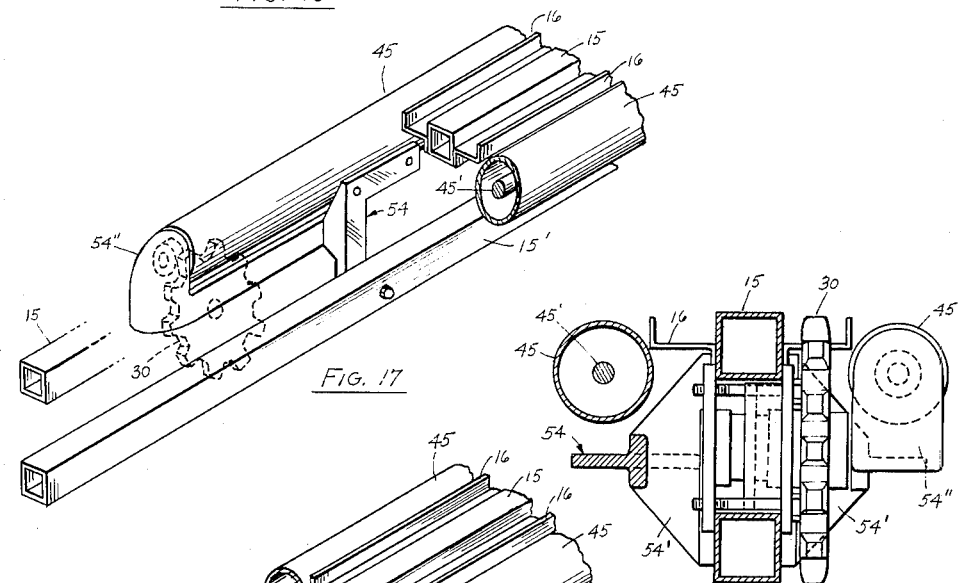
FIG. 17
FIG. 19
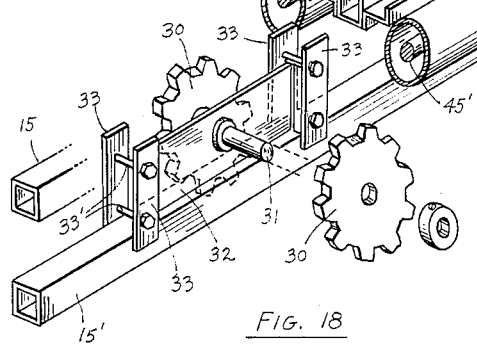
FIG. 18
INVENTORS
Henry C. Lehde
John J. Dickerman
BY
Reuben O. Carlson
Attorney INVENTORS
Henry C. Lehde
John J. Dickerman
BY
Reuben I. Carlson
Attorney INVENTORS
Henry C. Lehde
John J. Dickerman
BY
Reuben J. Carlson
Attorney

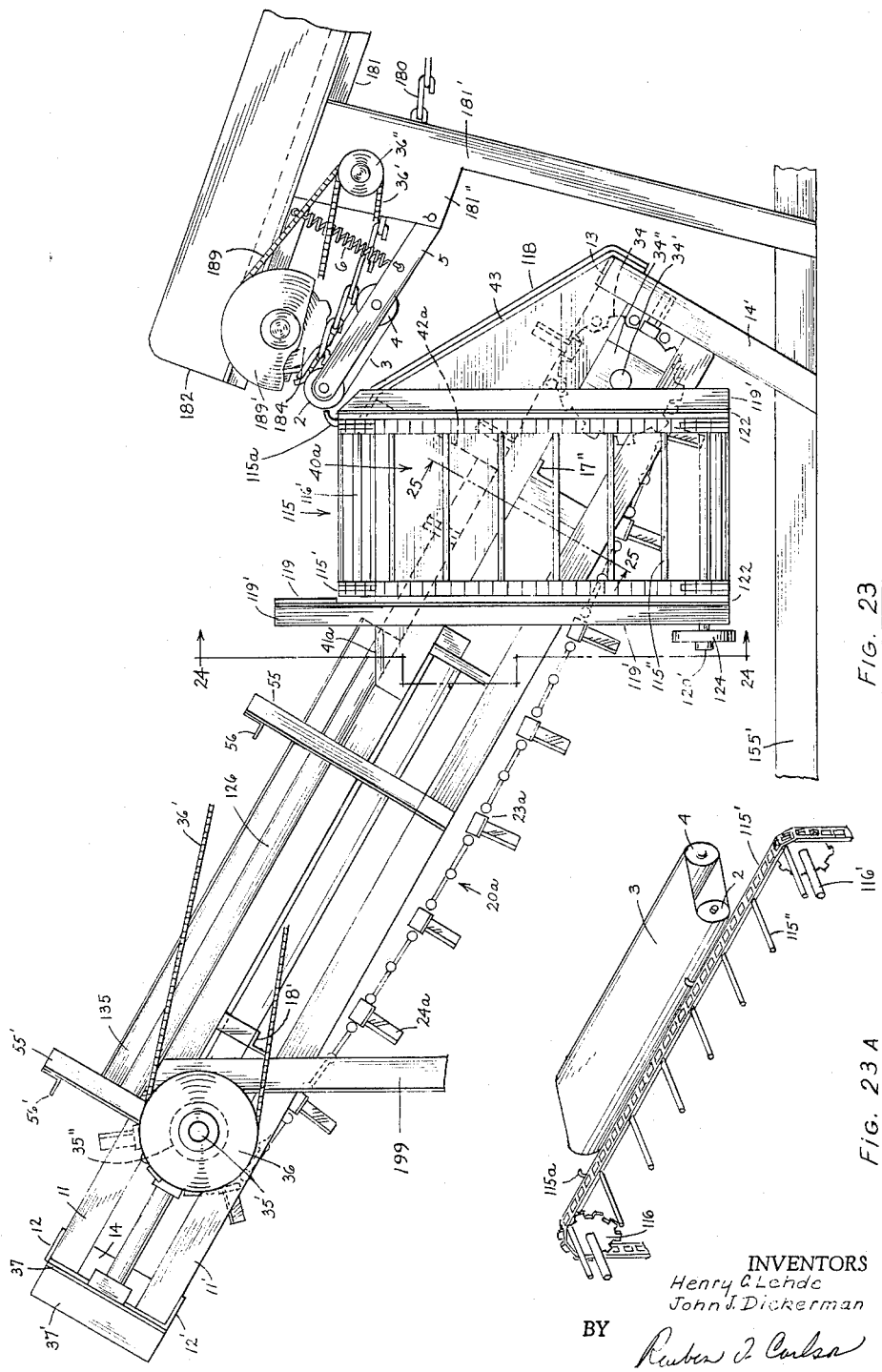

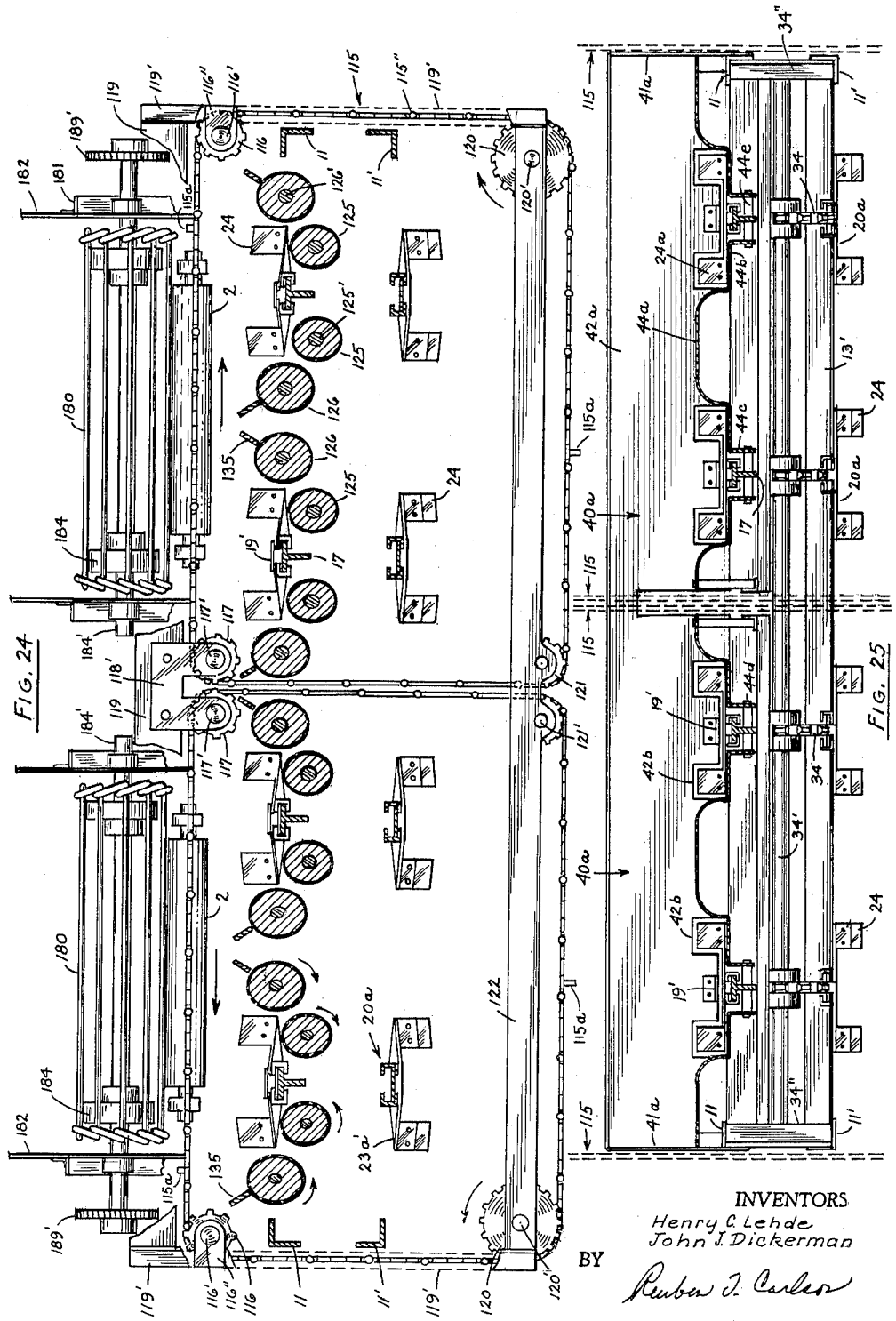

INVENTORS
Henry C. Lehde
John J. Dickerman
BY

Attorney

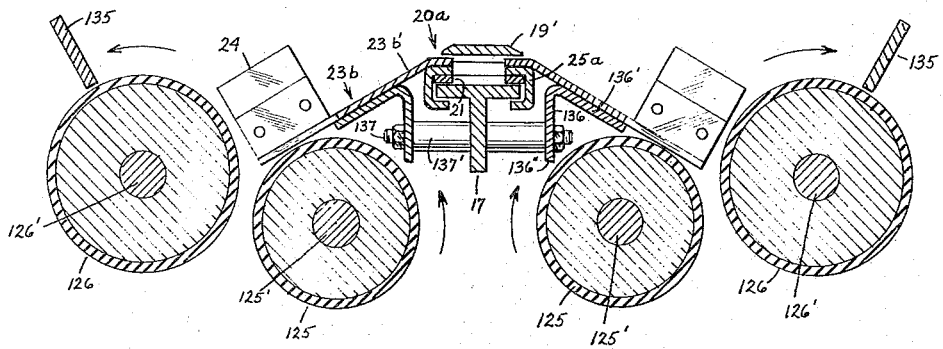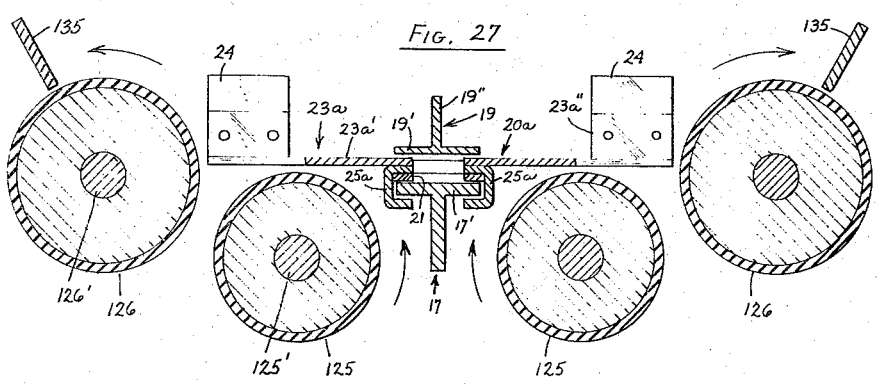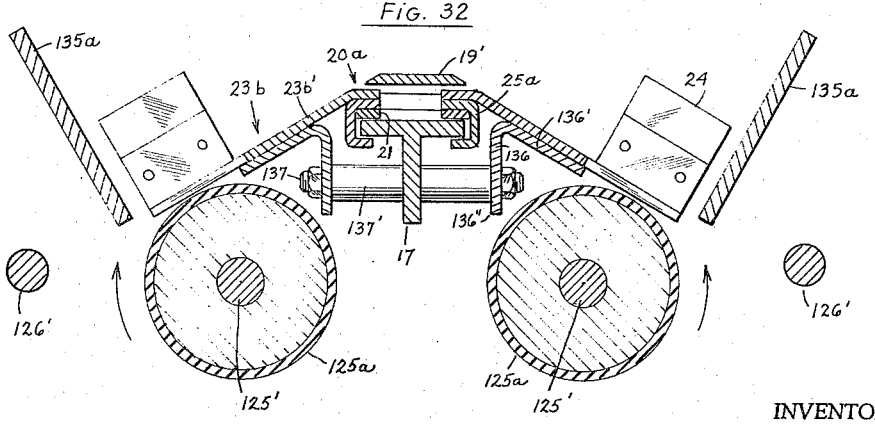

Aug. 17, 1965  H. C. LEHDE ETAL  3,200,888
POTATO HARVESTER

Filed Feb. 15, 1960  26 Sheets-Sheet 18

INVENTORS
Henry C. Lehde
John J. Dickerman
BY
Reuben J. Carlson

Attorney

Aug. 17, 1965     H. C. LEHDE ETAL     3,200,888
POTATO HARVESTER
Filed Feb. 15, 1960     26 Sheets-Sheet 19
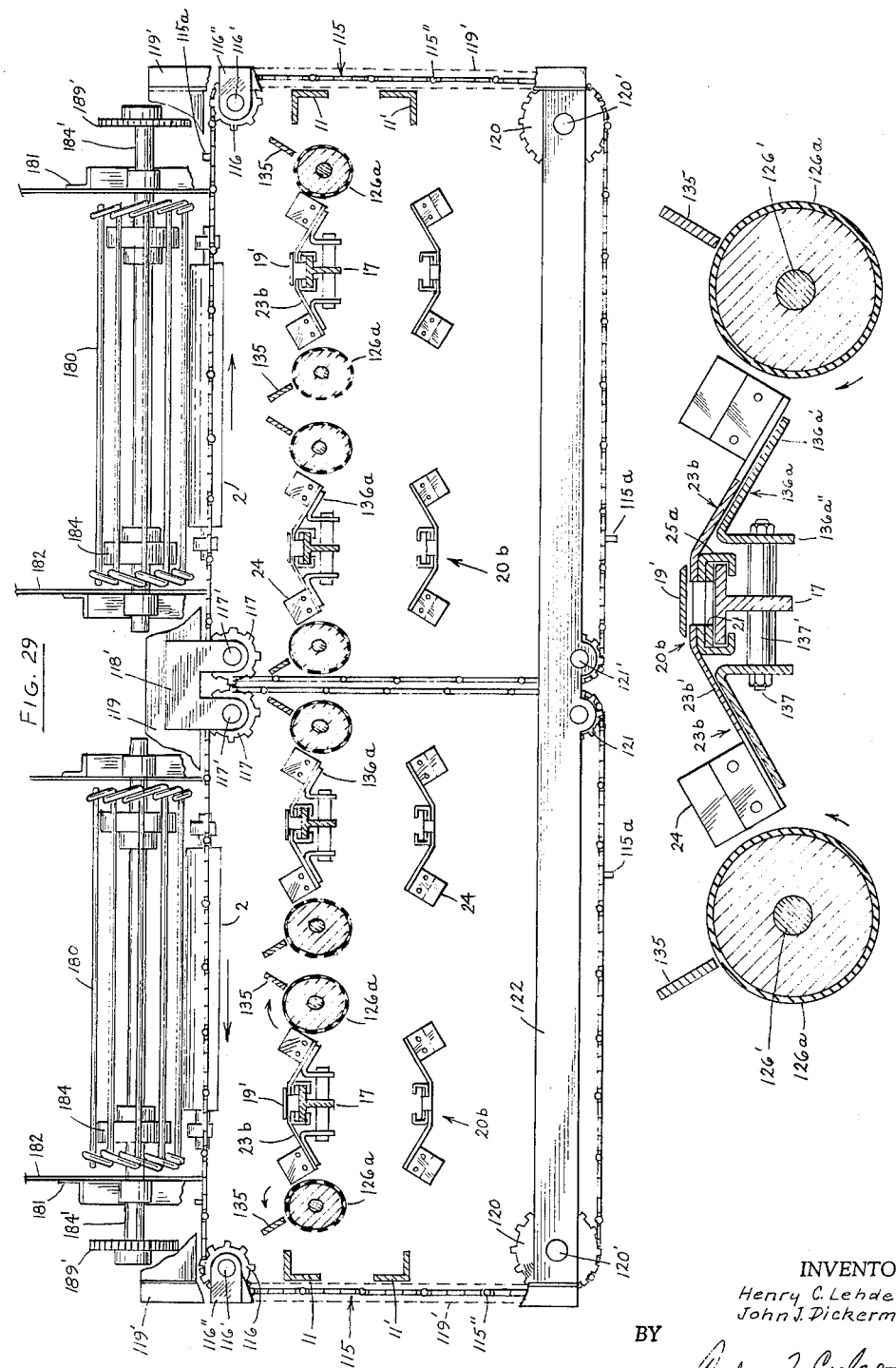
INVENTORS
Henry C. Lehde
John J. Dickerman
BY
Attorney

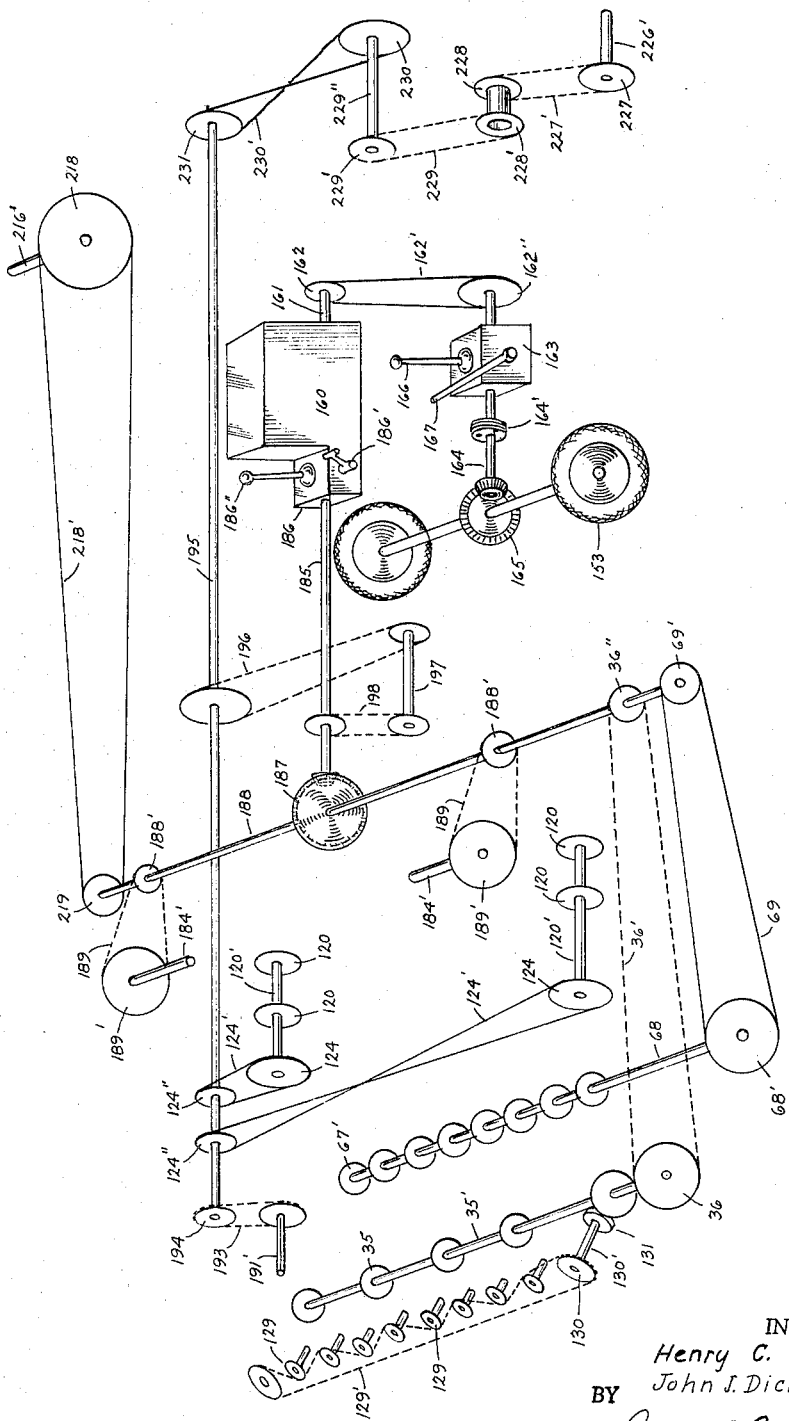

INVENTOR.
Henry C. Lehde
John J. Dickerman
BY
Attorney

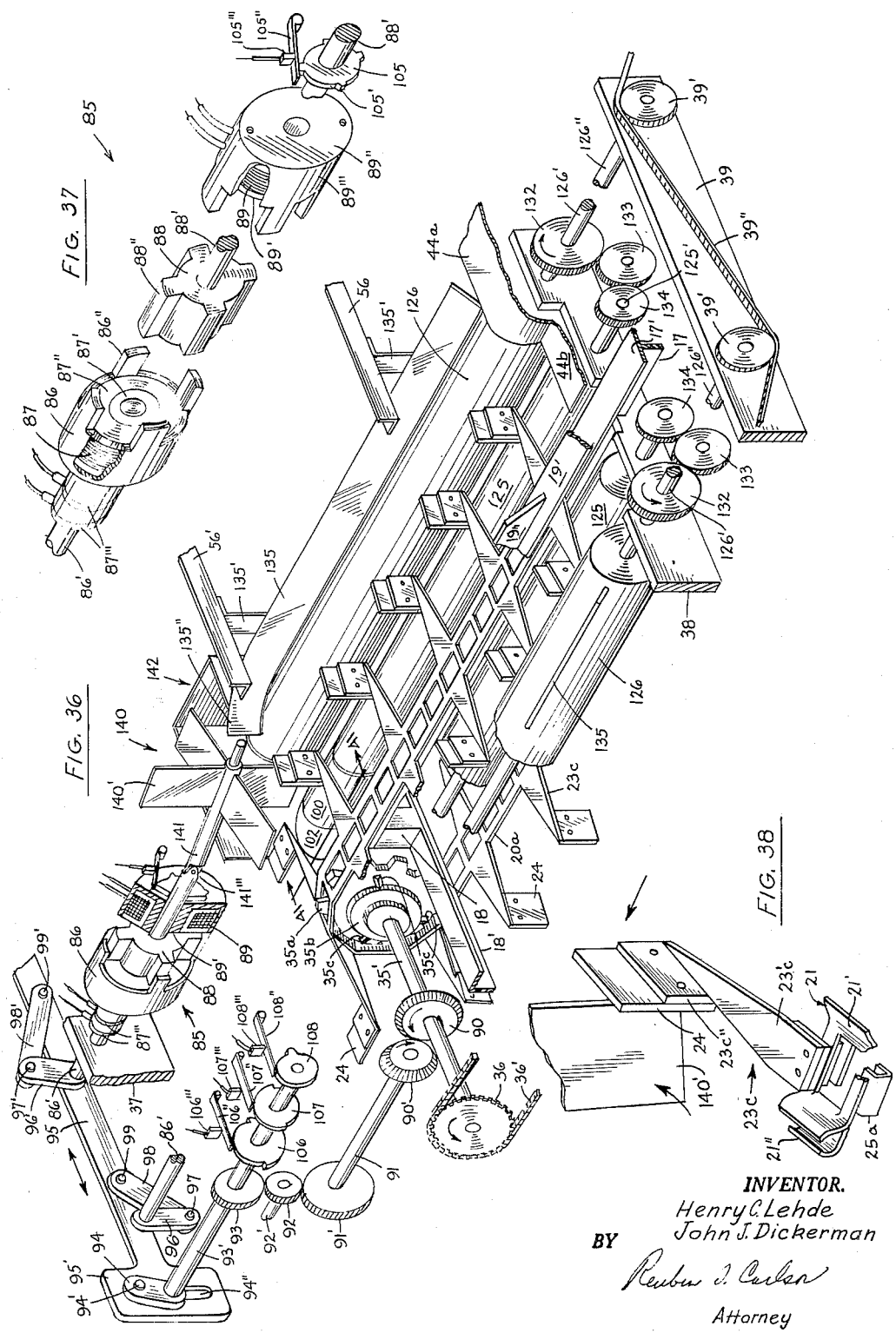

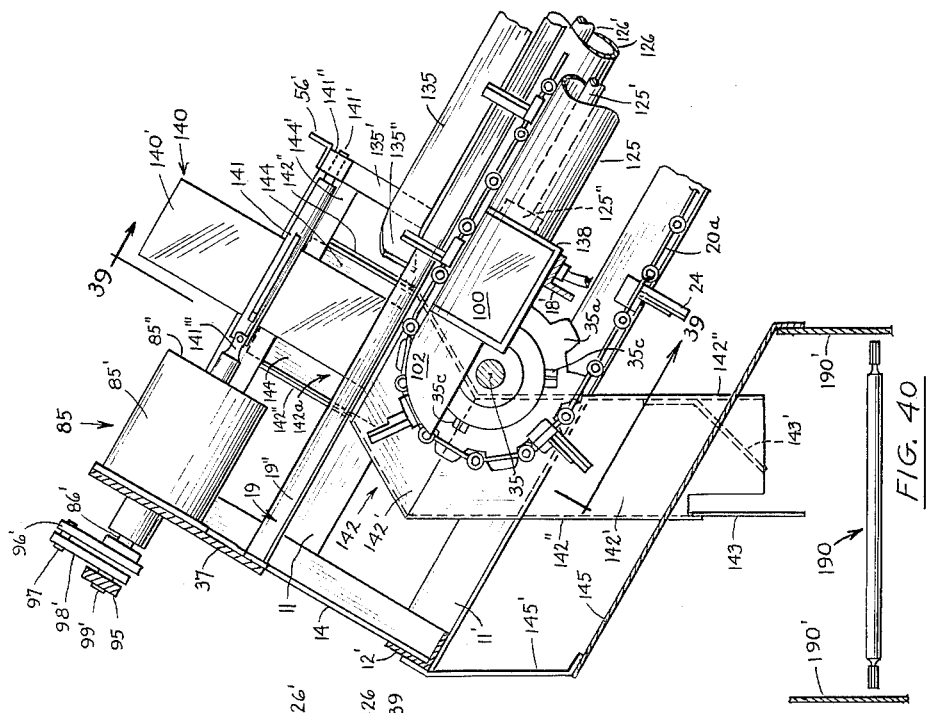

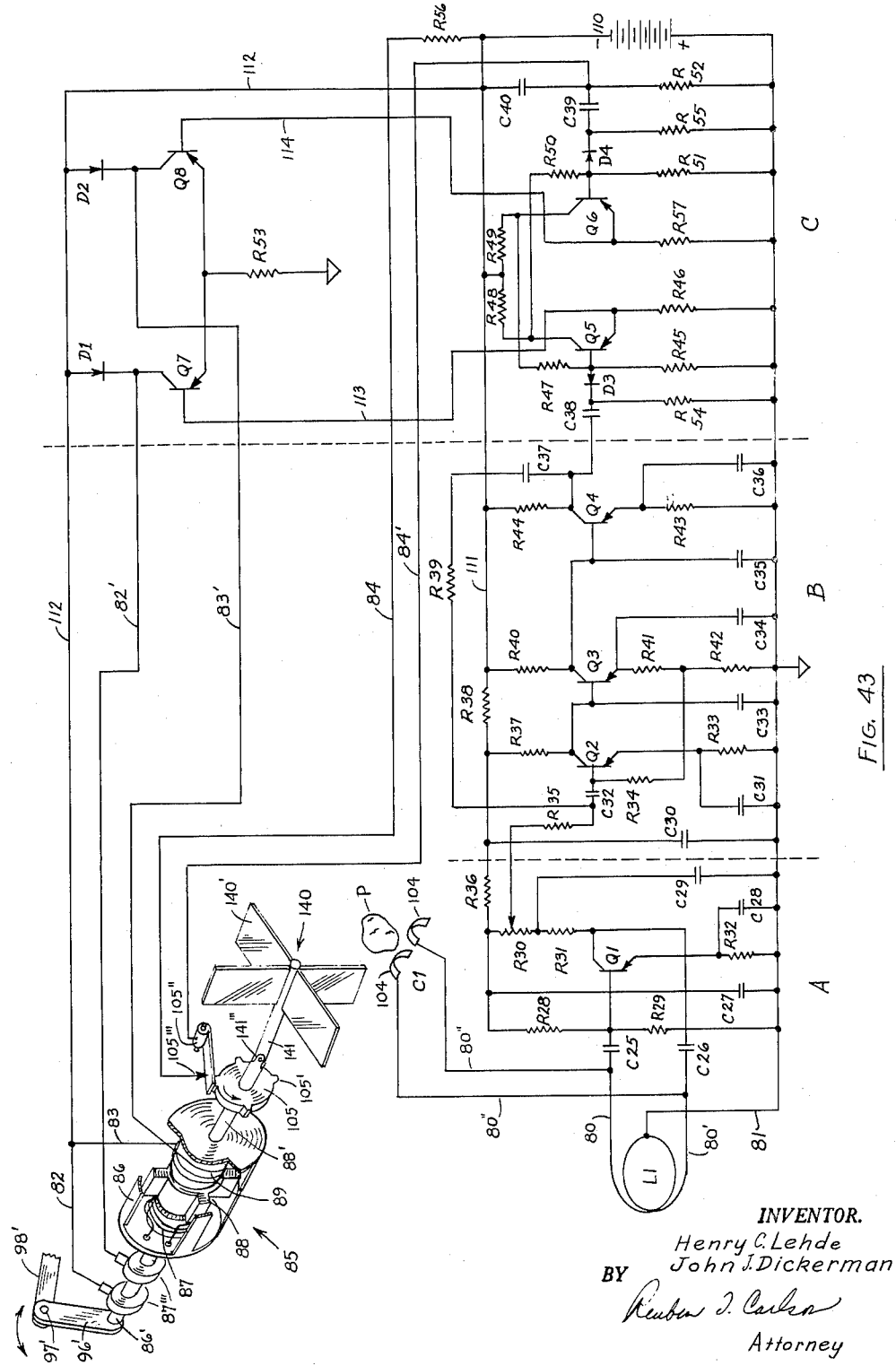

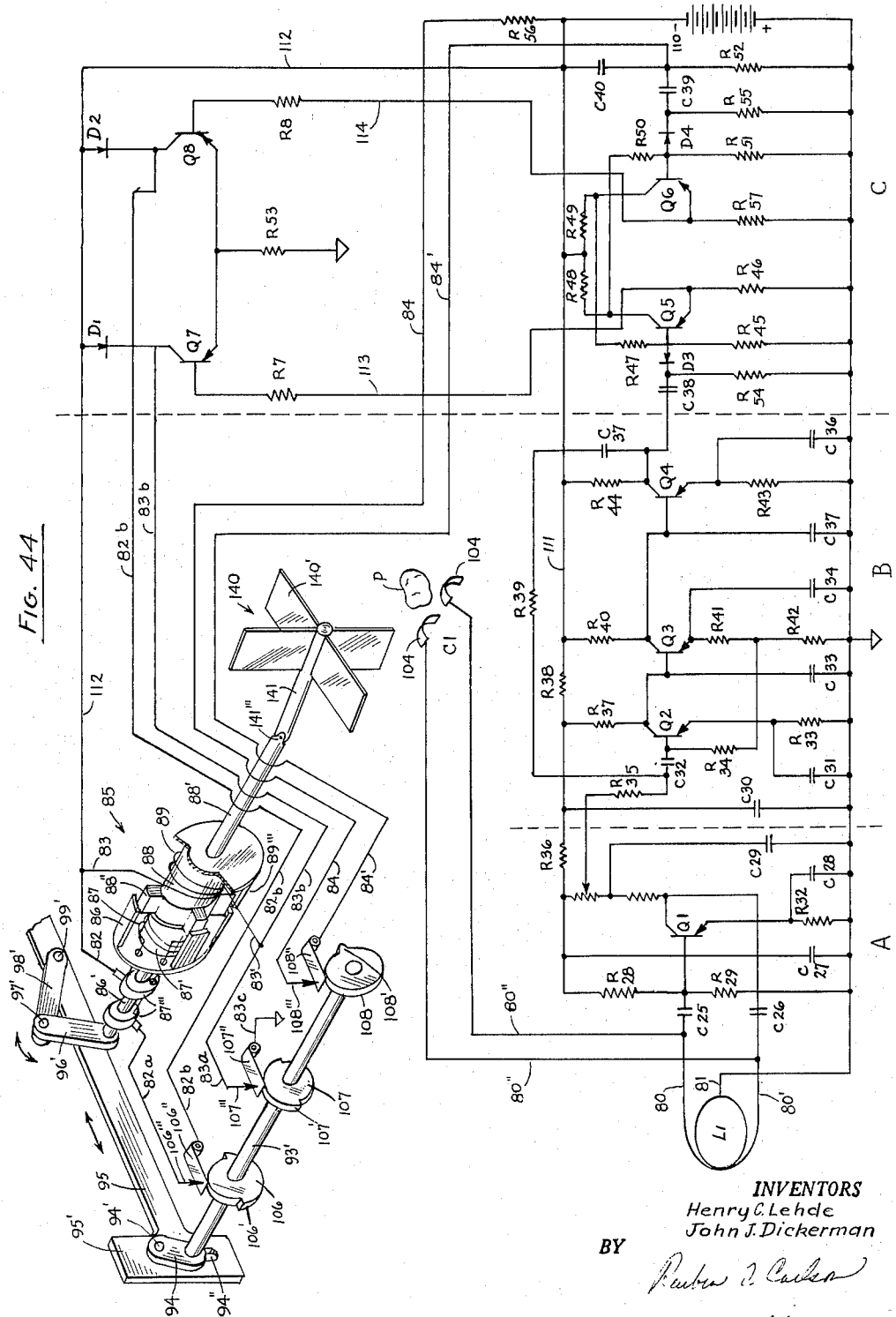

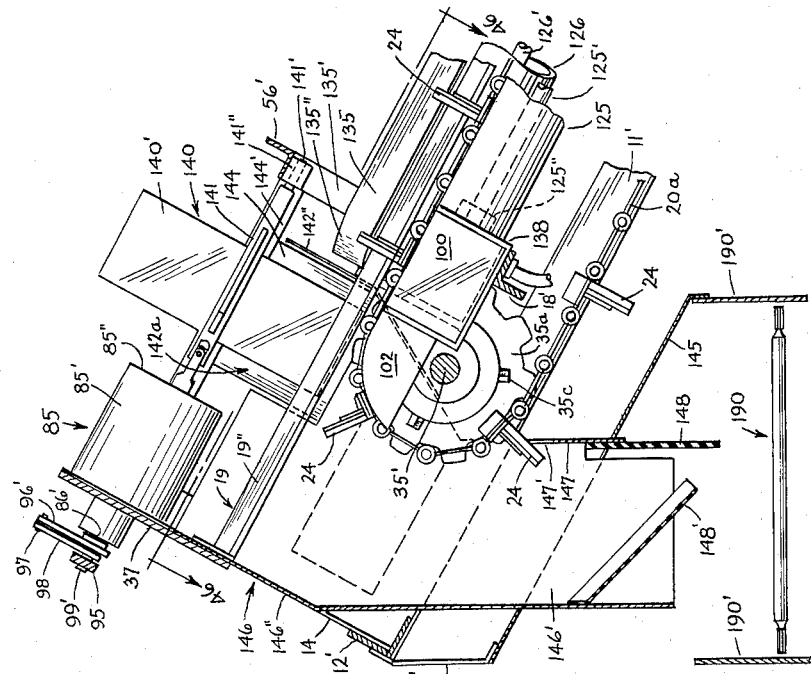
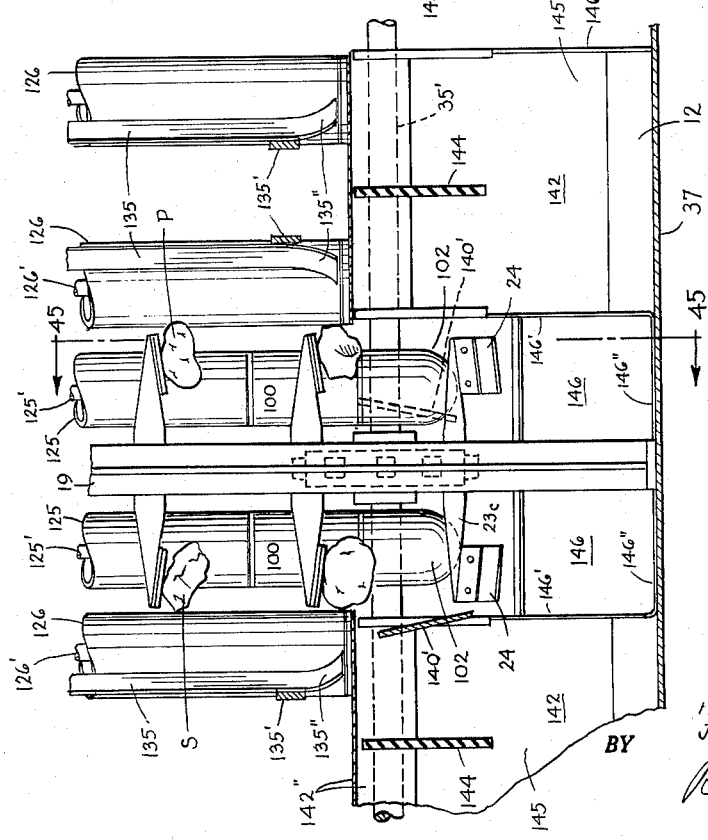

3,200,888
POTATO HARVESTER
Henry C. Lehde, Box 212, and John J. Dickerman,
22 Oak St., both of Northport, N.Y.
Filed Feb. 15, 1960, Ser. No. 8,649
24 Claims. (Cl. 171—14)

This invention relates to potato harvesters, and more particularly to a self-propelled potato harvester operative to dig potatoes under substantially all field conditions and to automatically separate and eliminate from the potatoes substantially all soil, vines, sods, clods and stones during the digging operation, so that only clean potatoes free of debris are discharged into the hauling vehicle traveling alongside the potato harvester.

The harvesting of potatoes in an economical manner by machine operation presents numerous difficult and varied problems, resulting from variable field conditions under which the mechanical harvester must operate. Many sandy and gravelly soils especially suitable for potato growing, often contain numerous stones of various sizes which are excavated with the potatoes, and which should be promptly eliminated during the harvesting, to avoid bruising damage to the harvested potatoes. When the harvesting must per performed when the soil is dry and hard, or other unfavorable soil or climatic conditions, soil lumps and clods are often excavated with the potatoes of such hardness that they will not crumble during normal conveyor handling, and should be eliminated during the harvesting process if potato bruising is to be avoided. Many potato fields at the time of harvesting are also contaminated with tenacious sod and weed root growth, which is excavated with the potatoes and which should also be separated and discarded during the harvesting process. In certain types of clay soils, soil lumps will have a tendency to cling to the excavated potatoes which cannot be removed by normal conveyor handling, and which should also be removed during the harvesting operation and before the potatoes are discharged from the harvester into the hauling vehicle. In addition to the above problems, which may differ and vary in degree in different crop fields and under varying soil and climatic conditions, the problem of removing potato vines and above-soil growth is usually present in varying degrees, notwithstanding the application of weed growth and potato vine killing chemicals and/or the use of mechanical vine shredding equipment prior to the harvesting operation.

While various means for the mechanical removal of stones, hard clods, sod and other debris have been proposed, no practical mechanisms have hereto been provided for the mechanical elimination of such debris during the harvesting operation. Potato harvesters presently used are equipped with riding platforms on which four or more workers ride, and who are busily engaged in the manual removal of stones, hard clods, sod, vines and other debris as the potatoes and debris advance from the digging and elevating conveyor to the discharge conveyor. The labor cost involved in the manual elimination of such debris during the harvesting operation, and the extra weight and the extra power required to carry and transport the necessary number of riders, adds materially to the cost of the harvesting operation. In addition, the timely availability of capable machine riding labor during the limited harvesting season, and during those days when weather conditions are favorable to potato harvesting, is a constant and re-occurring problem to potato growers.

It is an object of this invention to provide an improved potato harvester equipped with mechanical mechanisms and devices for automatically separating and eliminating stones, hard clods, sod, vines, above-ground growth and debris during the harvesting operation, so that only clean potatoes of commercial size are loaded from the harvester into the hauling vehicle or truck. Potato harvesters constructed in accordance with the teachings of this invention, eliminate the need for harvester riding attendants to manually eliminate stones, clods, sod and other debris from the potato stream, with resultant substantial economies in harvesting costs.

In addition, the potato harvester of this invention permits the successful harvesting of potato crops under such adverse soil, weather and ground conditions as would prevent the use of potato harvesters as presently constructed. Since the self-propelled harvester of this invention requires at most only one riding attendant for observation, in addition to the driver, full advantage can be taken of the limited number of days or hours in which the harvesting operation can be performed under preferred climatic conditions, without dependence upon the availability of a rider crew.

Harvesters made in accordance with this invention can be drawn by a tractor, but are preferably self-propelled. The harvester comprises a chassis frame mounted on rubber tire wheels and supporting a combustion engine, and which may provide the traveling power as well as power required to operate the various conveyors, mechanisms, and devices of the potato processing system of the harvester. This harvester may be provided with only a single excavating shoe, but is preferably provided with at least two excavating shoes, each having an elevating conveyor extending therefrom, and whose operation is under the control of the harvester driver. Each elevating conveyor comprises a continuous cross-bar type conveyor whose cross-bars are so spaced as to retain all potatoes of commerical size thereon, but permit soil, stones and debris of smaller size than the retained potatoes, to sift therethrough to ground. The excavated material as discharged from the upper end of the elevating conveyors will comprise commercial size potatoes, as well as stones, clods and sod debris of commercial potato size or larger.

A primary deviner assembly is mounted at the discharge end of each of the elevating conveyors, and is operative to grip and remove the vines and above-ground growth from the flow stream of potatoes and debris as discharged from the upper end of the elevating conveyors. Substantially all of the vines and above-ground growth will be drawn off and eliminated as the flow stream discharges from the upper end of the elevating conveyors.

A sifting conveyor is positioned directly below the discharge end of the elevating conveyors and associated primary deviners, and which preferably comprises a continuous bar-type conveyor which extends transversely of the harvester. The sifting bars of the transverse sifting conveyor are so spaced as to permit the potatoes, as well as the stones, clods and sod which are no larger than the corresponding largest size of retained potatoes, to drop through the upper reach of the sifting conveyor and into a receiving bin positioned between the upper and lower reaches thereof. The bars of the transverse sifting conveyor are so spaced as to nevertheless support and convey for discharge at the side of the harvester, such stones, clods and sod which are larger than the commercial size potatoes being harvested. The operation of the transverse sifting conveyor is also under the constant control of the driver.

The transverse sifting conveyor also supports one or more projecting elements or fingers which travel directly adjacent to the primary deviner roll or rolls, and which operate to loosen and scrape off such vines and above-ground growth which may become enwrapped around the deviner roll or rolls during the harvesting operation.

The product stream sifted through the upper reach of the transverse sifting conveyors and deposited in the receiving bin therebelow, will comprise the commercial size potatoes to be harvested, and only such stones, clods and sod of corresponding size, which have not been previously eliminated during travel on the elevating conveyors or by the primary deviners, or which have not been eliminated by the transverse sifting conveyors.

The harvester of this invention incorporates mechanism for conveying and marshalling the potatoes and remaining stones, clods and sods of similar size from the receiving bin to the rear end of the harvester, in a series of single file columns, and in a manner which permits the selective elimination of the remaining stones, clods and sods from the potato stream. The marshalling system includes a series of columnized advancing paddles connected to and advanced by one or more driven chains or belts. The paddles in each paddle column are arranged in linear spaced relation, and each paddle presents an object advancing face designed to positively advance only a single potato, stone or clod in an upwardly inclined longitudinal direction toward the rear end of the harvester.

One or more potato tumbling rolls are arranged in operative association with each paddle column, and which provides partial or total support for the objects advanced by the linearly spaced paddles. Each of the columnized advancing paddles operates to withdraw one or more potatoes, stones, clods or objects from the receiving bin, and advance the same in tumbling contact with the associated rotating marshalling roll or rolls. Each columnized advancing paddle is so shaped and dimensioned as to support only a single potato, stone or clod on the advancing face thereof as the paddle reaches the upper end of its travel. If more than one potato, stone or clod is initially engaged by an advancing paddle, the extra potato, stone or clod is tumbled laterally from the advancing influence of the paddle for return to the receiving bin for subsequent pick-up. The tumbling movement to which the potatoes are subjected during their columnized upward travel through the marshalling system, serves to break off any soil which may still cling to the potatoes.

Where only a single marshalling roll is employed in association with each paddle column, the marshalling roll may be positioned directly under the line of travel of the columnized paddles to provide tumbling support for the objects advanced thereby. Alternatively, the marshalling roll may be positioned to extend along the extremity of the line of travel of the columnized paddles, to effectuate tumbling of the potatoes, with a stationary supporting plate positioned under the paddles to provide support for the paddle advanced objects. Alternatively, a pair of tumbling rolls may be associated with each paddle column to provide tumbling support for the paddle advanced objects. Longitudinally extending baffle plates may be provided to assist the channelization of the advancing objects into linearized columns. Where vines and other growth debris is so prolific that the same cannot be adequately eliminated by the primary deviner, a secondary devining roll in riding association with the tumbling roll may be provided to insure complete removal of remaining vine and growth debris.

Mechanism is provided for the selective separation and elimination of remaining stones, clods and sods from the potatoes when these objects have been arranged in spaced relationship in single file columns by the combined action of the advancing paddles and marshalling rolls. This mechanism comprises a mechanically driven potato selector and stone, clod and sod eliminating device, positioned adjacent the discharge end of each paddle column, and which device is operatively controlled by a sensing circuit.

In one form of the invention, potatoes and remaining stones and clods are individually discharged by the several columns of successive advancing paddles into corresponding drop tubes, each of which terminates in a sensing ring containing a sensing coil which is responsive to conductive materials such as a potato dropping therethrough, but which is relatively non-sensitive to less conductive stones or earth clods. The sensing coil forms part of a sensing oscillator or detecting circuit, and the pulsations produced therein by the passage of a potato through the sensing ring, are amplified by an amplifying circuit which controls a switching circuit, and which in turn controls the operation of a clutch and brake mechanism. The clutch and brake mechanism is operative to manipulate a pivotally mounted deflecting plate which is positioned to deflect stones and clods to ground, and is also manipulated by the sensing circuit to permit the potatoes to drop from the sensing ring to a transverse potato conveyor therebelow.

In another form of this invention, the sensing circuit, the amplifying circuit, and the switching circuit are compactly contained in a casing whose upper arcuate surface forms a linear continuation of the upper end of a marshalling roll in each single file column. The successive potatoes, stones and clods are separately advanced by the marshalling paddles into proximity with the sensing device which operates to manipulate a clutch and brake device which is operatively connected to a deflecting paddle or paddle wheel adjacent the terminal end of the upper reach of the traveling object advancing paddles. This potato selecting and stone eliminating mechanism is so constructed and arranged as to either deflect the advancing potatoes in a drop tube or chute, or to deflect the advancing stones and clods into a discharge chute for discharge to ground.

The parts and components of the sensing device in both forms of this invention are constructed and designed for compact assembly in a casing of very small size and weight, and requires very little power to operate. The deflecting paddles or plates in both forms of the invention can each be effectively operated under approximately forty-five volts of input power, so that the voltage converting power source for these potato sensing and stone deflecting mechanisms may be energized by the storage battery associated with the combustion engine.

The composite mobile potato harvester of this invention may be operatively assembled to occupy a cubic space substantially equivalent to that of the standard type of potato harvester presently used, has a total weight which is only slightly more than the presently used potato harvesters without riders. Since it need carry only the driver and one observation attendant, its operating weight is substantially lighter than the operating weight of presently used potato harvesters having the necessary number of riders to manually remove stones, clods, vines and debris. The mobile potato harvester of this invention is universally adapted to operate under substantially all field conditions presented by different potato growing areas, and overcomes many of the drawbacks of potato harvesters as presently made and used.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof in which:

FIG. 5 is a flow diagram illustrating the direction of travel of the potatoes and debris materials processed along and through the various components of the harvester;

FIG. 6 is a diagrammatic view in perspective of the basic processing components of the harvester, such as the digging shoe and elevating conveyor, primary deviner, potato marshalling and secondary deviner assembly, one type of potato selecter and stone eliminator unit, and the transverse conveyor leading therefrom;

FIG. 6a is a fragmentary perspective view of the sensing coil containing ring associated with each of the potato selector and stone eliminator units shown in FIG. 6;

FIG. 7 is a plan view showing further details of the potato marshalling and secondary deviner assembly which is only generally shown in FIG. 3, certain parts being broken away to reveal further details;

FIG. 8 is a transverse section taken through the potato marshalling and secondary deviner assembly as the same would appear when viewed along line 8—8 of FIG. 7;

FIG. 9 is a side elevational view of the potato marshalling and secondary deviner assembly as the same would appear when viewed along line 9—9 of FIGS. 7 and 8;

FIG. 16 is a fragmentary plan view showing a part of the lower marshalling rolls and supporting framework, the paired sprockets for the marshalling chains and the roll supporting brackets;

FIG. 17 is a fragmentary perspective view showing a pair of the lower marshalling rolls, and adjacent marshalling chain supporting chanels therebetween, also one of the marshalling roll supporting brackets, and also one of the marshalling chain supporting sprockets in phantom lines;

FIG. 18 is a further fragmentary perspective view showing the lower pair of marshalling rolls and marshalling chain supporting channels; this view also showing the marshalling chain supporting sprockets and connecting stationary shaft, and also the stationary shaft supporting bracket which may be adjusted to maintain the marshalling chains at proper tautness;

FIG. 19 is a transverse view, partly in section, of one pair of lower marshalling rolls and supoprting brackets and framework as the same would appear when viewed along line 19—19 of FIG. 16;

Figure 20:
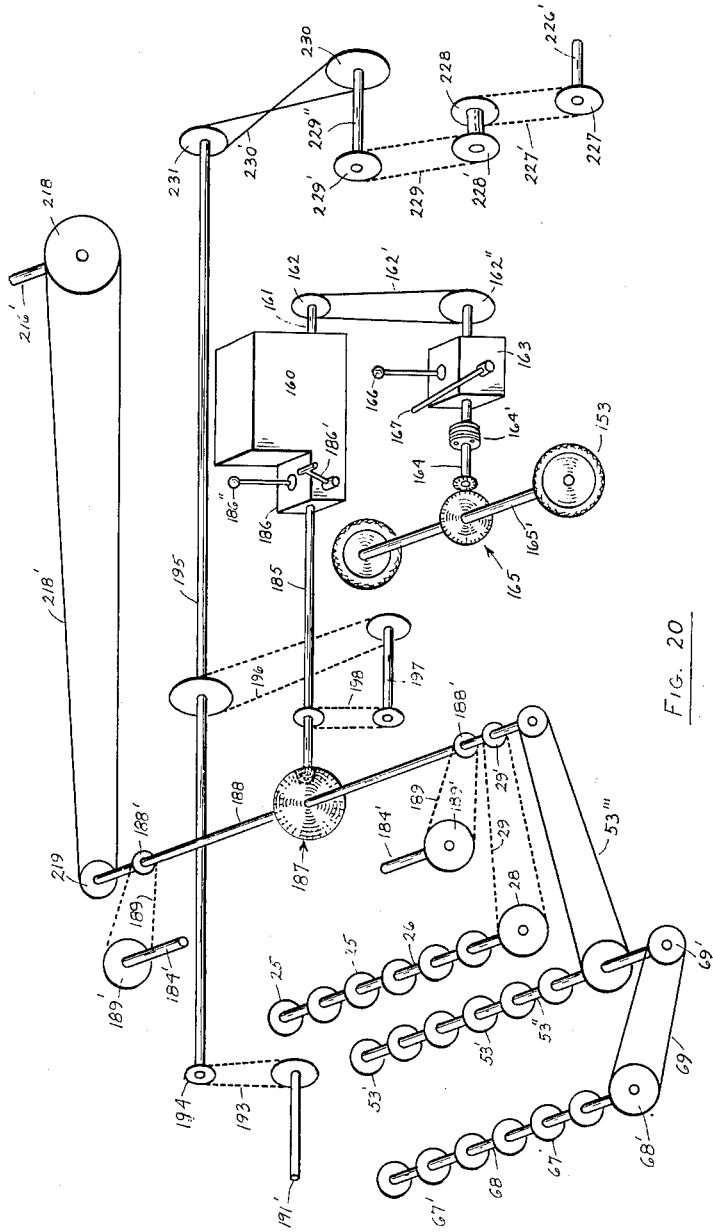
Figure 21:
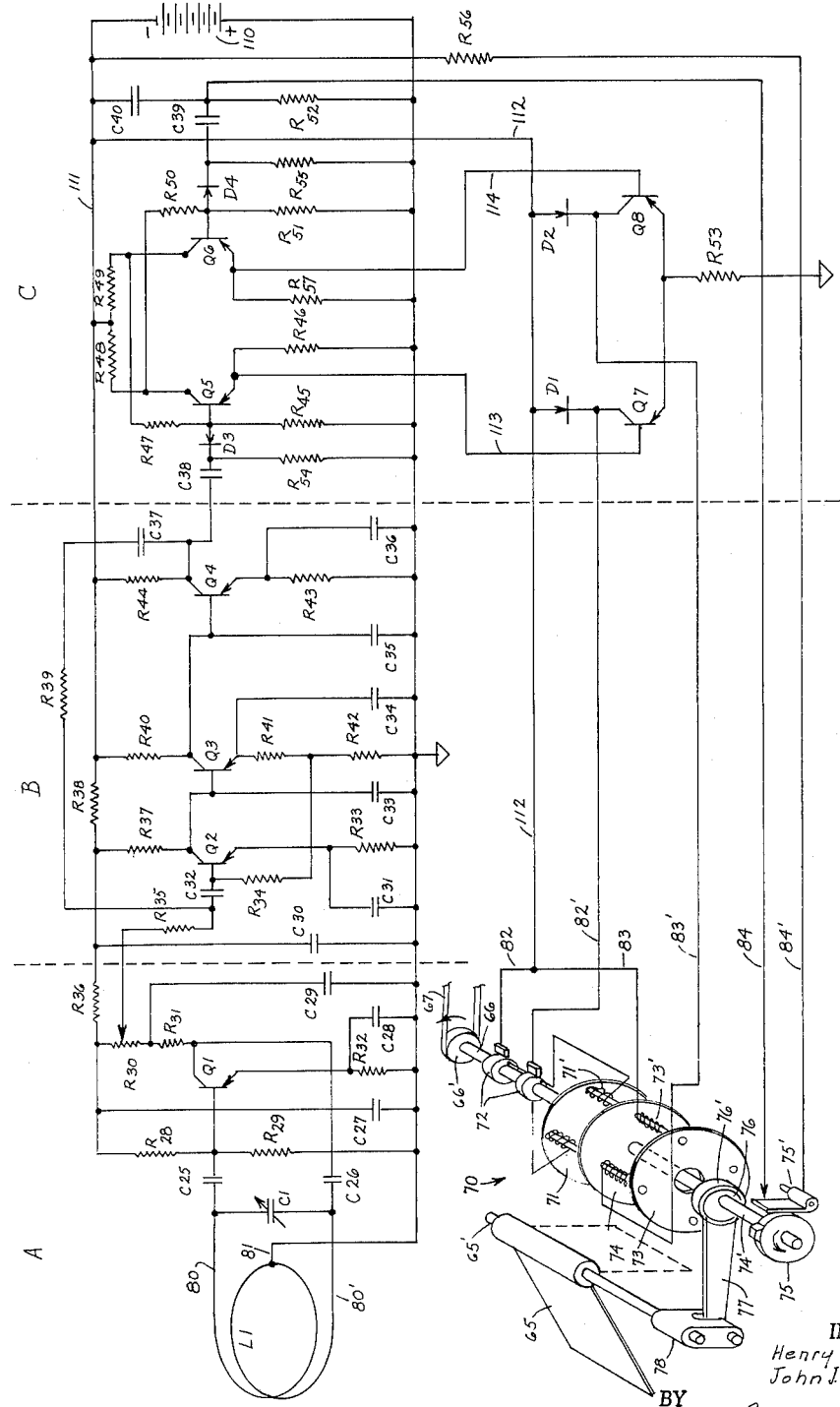
Figure 22:
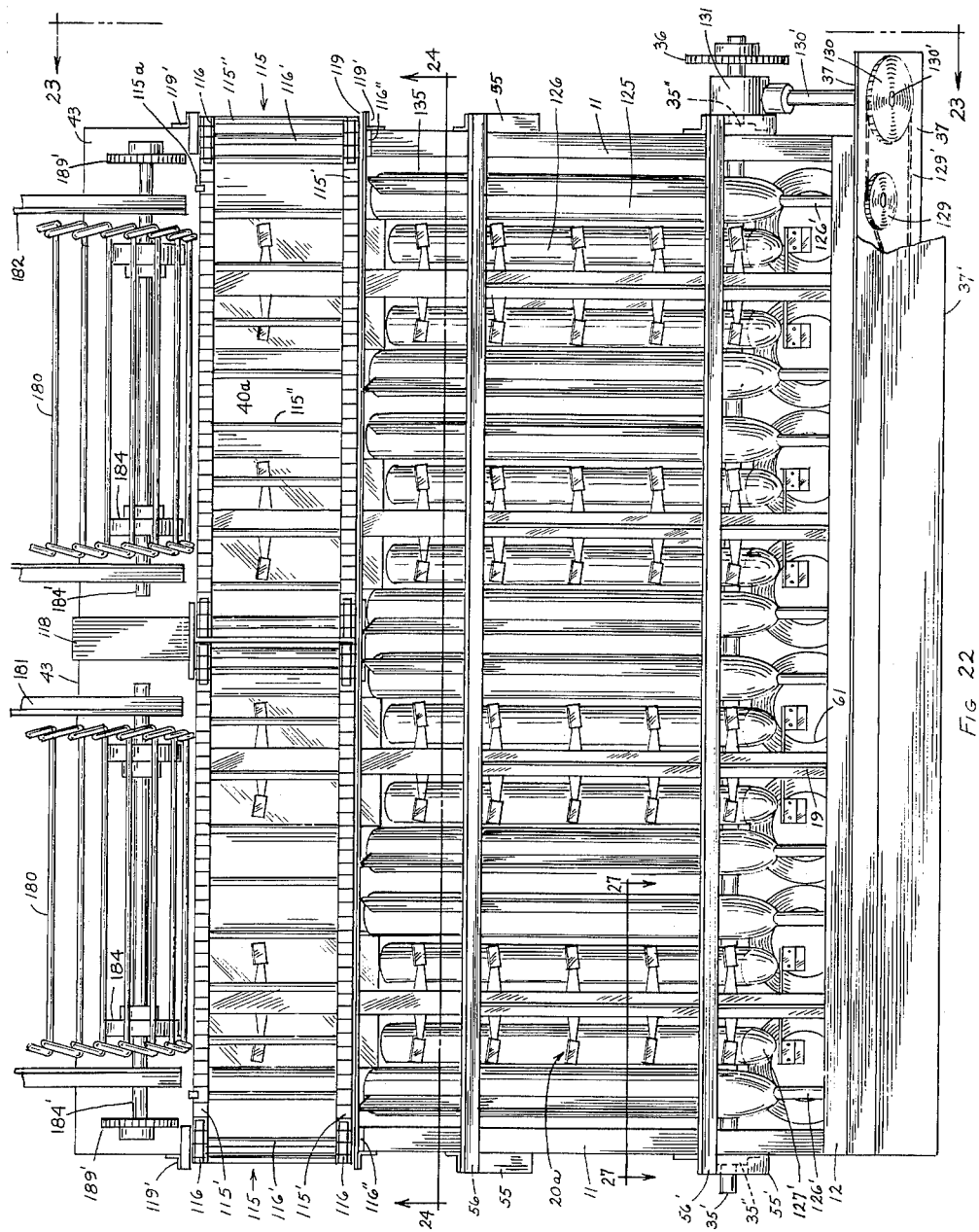
Figure 26:
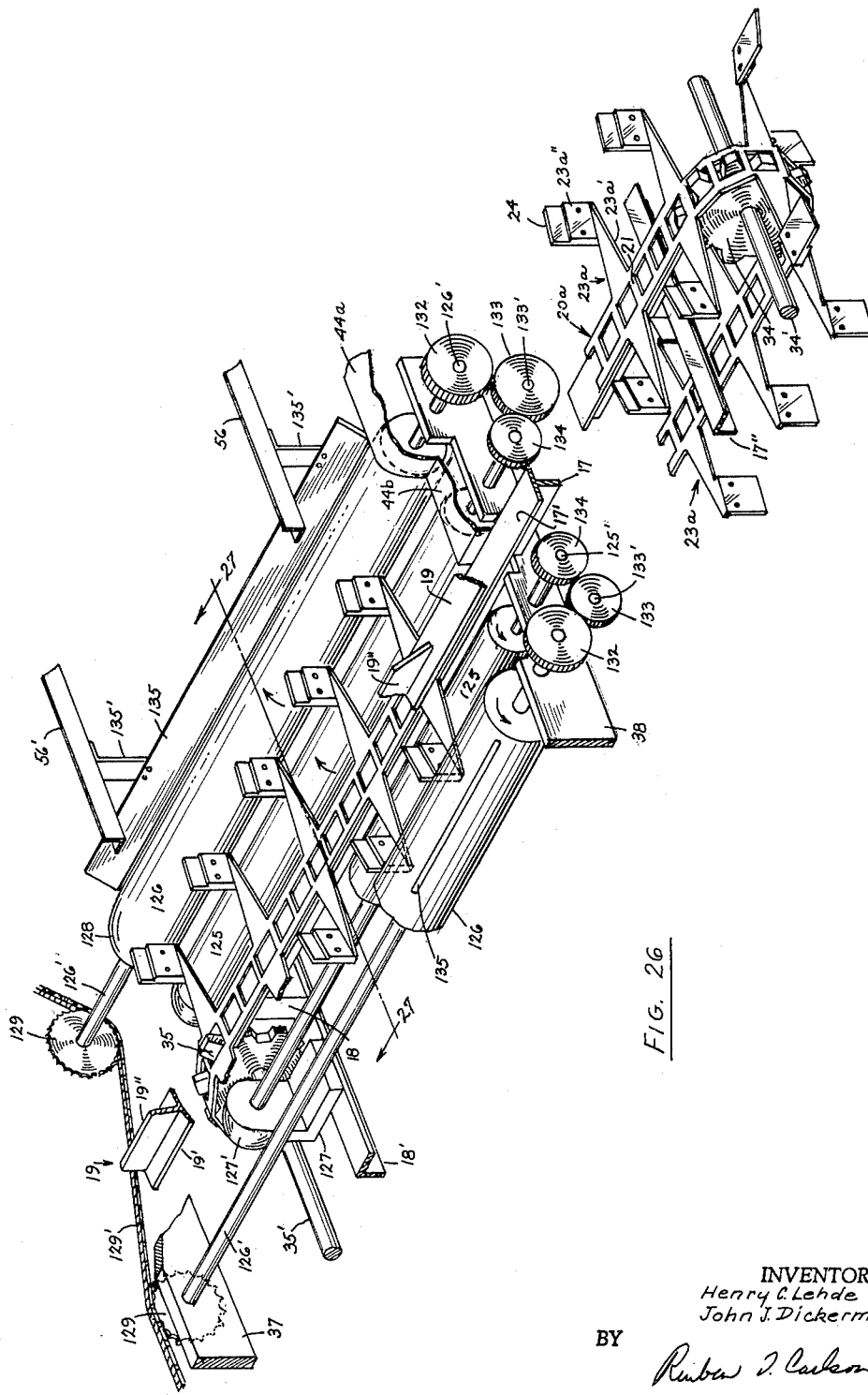
Figure 28:
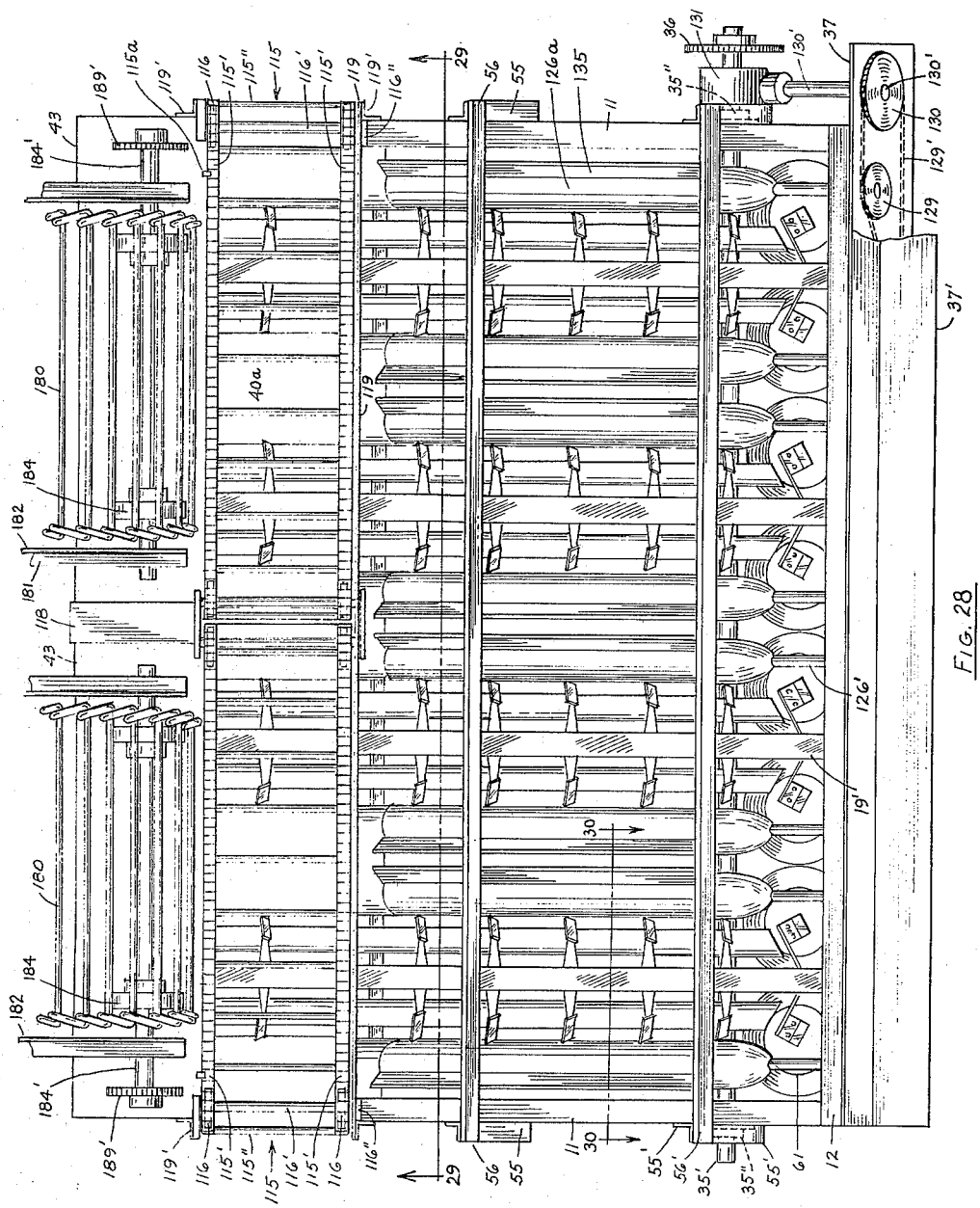
Figures 34, 35:
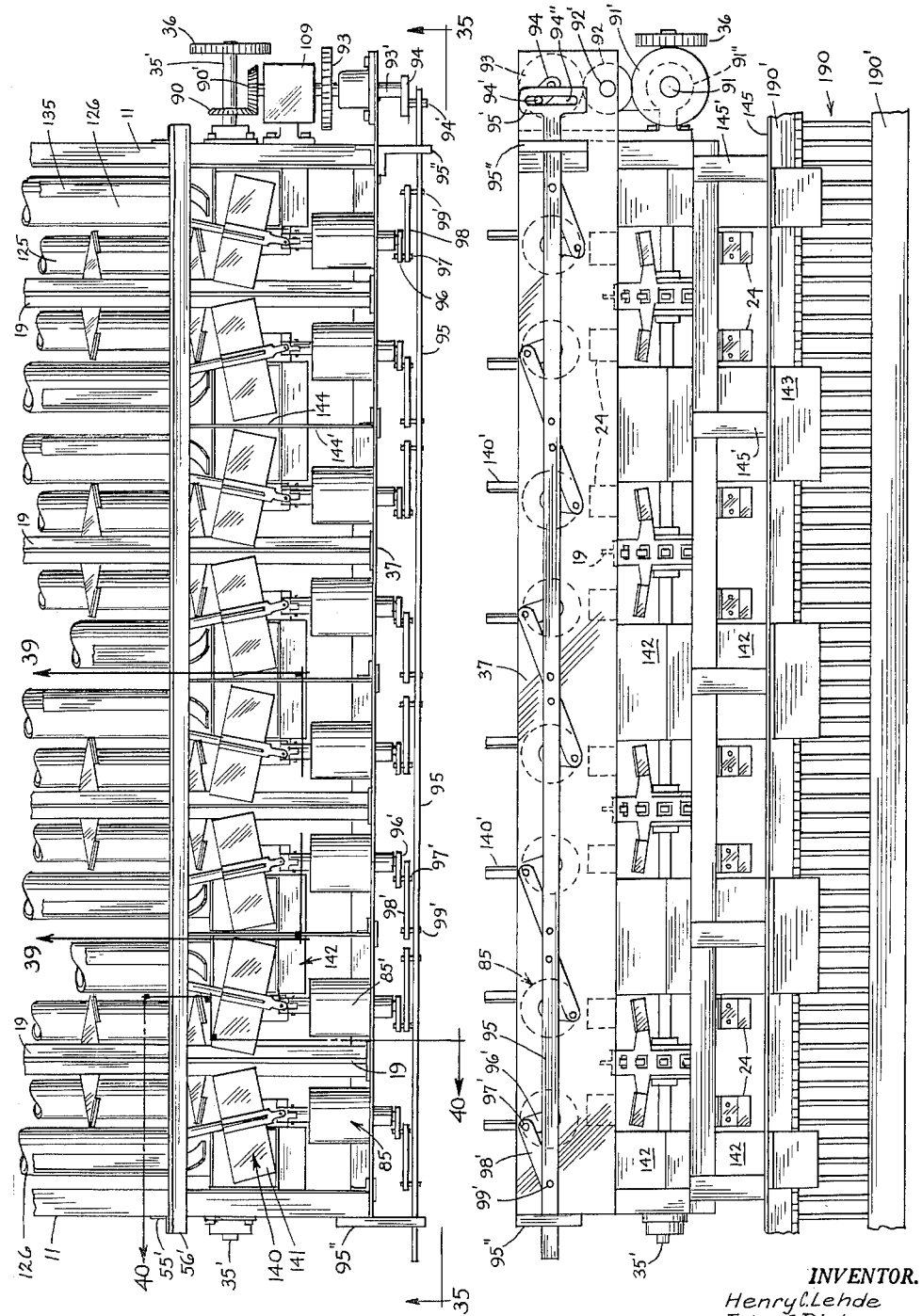

FIG. 20 is a schematic diagram illustrating the major power drives for the combustion engine, including the driving connection for the rear wheels, the driving connections for the digging conveyors, the driving connections for the potato marshalling chains, the driving connections for the potato marshalling and secondary deviner rolls, the driving connections for the potato selector units, the driving connection for the rear transverse conveyor, the driving connection for the side conveyor, and the driving connection for the cantilever loading conveyor;

FIG. 21 is a schematic diagram of one of the potato selector and stone eliminator units and its associated transistor circuit which includes the sensing oscillator, multistage amplifier and switching circuit for controlling the operation of the selector and eliminator unit;

FIG. 22 is a plan view showing an alternative form of potato marshalling and tumbling assembly which embraces four duplex paddle equipped potato advancing chains driven from the upper ends thereof and designed to advance, marshall and tumble eight columns of potatoes between eight sets of paired marshalling and tumbling rolls which are also driven from the upper ends thereof; this alternative assembly also incorporating a pair of oppositely directed transversely driven conveyors which remove sod, vines and debris and sift out the potatoes for feeding to the lower ends of the marshalling and tumbling paddles and rolls;

FIG. 23 is a side elevational view of the alternative form of potato marshalling and tumbling assembly as viewed along line 23—23 of FIG. 22; this view also showing a fragmentary part of the upper end of the digging conveyor and associated primary deviner, a side view of the transverse sod eliminating and sifting conveyor, the potato receiving drop bin, and the drive means at the upper end of the potato marshalling and tumbling assembly;

FIG. 23a is a fragmentary perspective view of the primary deviner and the transverse sod eliminating and sifting conveyor shown in FIGS. 22, 23, 24, 28 and 29, to which is attached one or more scraping prongs or cutting edges which move in close proximity to the primary deviner and remove therefrom any excess accumulation of vines and weeds which may adhere to or wrap around the primary deviner;

FIG. 24 is a vertical transverse section taken along line 24—24 of FIGS. 22 and 23 and showing the discharge ends of the digging conveyors, a rear elevational view of the transversely driven sod and debris sifting conveyors, transverse sections of the paddle equipped potato advancing chains, and paired sets of adjacent marshaling and tumbling rolls as arranged in cooperating relation to the potato advancing paddles;

FIG. 25 is a vertical transverse section taken along line 25—25 of FIG. 23 and showing the drop bin which receives the potatoes discharged from the transverse sod removing and shifting conveyors, the lower ends of the marshalling chains and associated potato advancing paddles, and the supporting sprockets therefor;

FIG. 26 is a fragmentary perspective view which illustrates further details of one of the similar duplex paddle equipped potato advancing chains and the two adjacent pairs of cooperating marshalling and tumbling rolls as incorporated into the assembly shown in FIG. 22;

FIG. 27 is an enlarged transverse section taken along line 27—27 of FIGS. 22 and 26 and which shows in further detail the construction of one of the similar paddle equipped potato advancing chains and the two adjacent sets of paired marshalling and tumbling rolls which cooperate therewith;

FIG. 28 is a plan view showing a further alternative form of potato marshalling and tumbling assembly which embraces four upwardly moving potato advancing chains driven from the upper ends thereof, each chain being equipped with two laterally spaced columns of downwardly inclined potato advancing paddles, each paddle column extending over a downwardly inclined potato supporting plate and positioned in cooperative relation to a single tumbling roll driven from the upper end thereof; this alternative assembly also incorporating transversely driven sifting conveyors which remove sod, vines and debris and sift out the potatoes which are dropped into a receiving bin and then fed to the lower ends of the cooperating marshalling and tumbling paddles and rolls;

FIG. 29 is a vertical transverse section taken along line 29—29 of FIG. 28, and showing the discharge ends of the digging conveyors, a rear elevational view of the transversely driven sod and debris sifting conveyors, and transverse sections of the potato advancing chains, each chain being equipped with two columns of inclined potato advancing paddles and positioned in inclined relation to underlying potato supporting plates and adjacent tumbling rolls;

FIG. 30 is an enlarged transverse section taken along line 30—30 of FIG. 28 and showing in further detail the construction of one of the similar potato advancing chains and associated inclined paddles positioned in cooperating relation to the inclined potato supporting plates and adjacent tumbling rolls;

FIG. 31 is an enlarged transverse section showing the construction of a further modified form of paddle equipped potato advancing chain and adjacent sets of marshalling and tumbling rolls which are generally similar to that shown in FIG. 27 and designed for use in the assembly shown in FIGS. 22 and 24; except that the associated paddles of this FIG. 31 are inclined and cooperate with inclined potato supporting plates similar to that shown in FIG. 30; and except that the two sets of associated marshalling and tumbling rolls of this FIG. 31 are similar to those shown in FIGS. 22 and 24 after the rolls of FIGS. 22 and 24 and have been adjusted in position to accommodate the adjacent inclined potato advancing paddles;

FIG. 32 is an enlarged transverse section showing the construction of a further modified form of a paddle equipped potato advancing chain and tumbling roll assembly which is generally similar to that shown in FIG. 30 and designed for use in the assembly shown in FIG. 28, the individual tumbling rolls of this FIG. 32 being similar to those shown in FIGS. 28 and 30 after the rolls and baffle plates of FIGS. 28 and 30 have been adjusted in position to directly support the paired potato columns, with the rolls driven in the opposite direction from that shown in FIG. 30;

FIG. 33 is a schematic diagram showing the major power drives from the combustion engine to the rear drive wheels, the digging conveyors, the rear transverse conveyor, the side conveyor and the cantilever loading conveyor which are similar to the corresponding drives shown in FIG. 20, but with the addition of a series of alternative power drives which provide the driving connections for the transverse sod removing and sifting conveyors shown in FIGS. 22, 23, 23a, 24, 28 and 29, the driving connections for the horizontal shafts of the potato selector and stone eliminator units, the upper end drives for the alternative forms of potato marshalling chains shown in FIGS. 22–32, and the upper end drives for the alternative forms of potato marshalling and tumbling rolls shown in FIGS. 22–32;

FIG. 34 is a fragmentary plan view of the rear end of a potato marshalling and tumbling assembly generally similar to that shown in FIG. 22, but equipped with an alternative form of stone and clod separating mechanism, which includes a potato sensing unit located at the end of one of the marshalling rolls in each advancing column, and a paddle wheel responsive to the potato sensing unit, and operative to separate the potatoes from the stones and clods as they individually arrive at the upper end of the advancing column and to deflect the same into separate receiving chutes;

FIG. 35 is a rear elevational view of the marshalling and selector assembly as viewed in the direction of the arrows along line 35—35 of FIG. 34, this view showing the mechanism for driving the potato deflecting paddle wheels, the potato receiving chutes, and the transverse conveyor which receives the potatoes discharged from the chutes;

FIG. 36 is a fragmentary perspective view which illustrates further details of the duplex paddle equipped advancing chain shown in FIGS. 34 and 35, with two adjacent pairs of cooperating marshalling and tumbling rolls, with a potato sensing unit adjacent to the upper end of one of the paired rolls and contoured to the roll outline, and the potato deflecting paddle wheel and associated driving clutch and brake unit which is operatively responsive to the sensing unit to selectively separate the potatoes from the stones and clods;

FIG. 37 is an exploded perspective view of the electromagnetic clutch and brake unit which intermittently drives the deflecting paddle wheel in synchronism with the potato advancing paddles and in selective response to signals from the sensing unit;

FIG. 38 is a perspective view of one of the modified advancing paddles associated with the advancing chain shown in FIG. 36, and a portion of the deflecting paddle wheel, which illustrates by arrows the relative motions of the advancing paddle and the synchronized deflecting paddle which cooperate to laterally deflect the advancing potato or stone from the end of the marshalling channel without interfering with the movement of the advancing paddle;

FIG. 39 is a fragmentary transverse section, taken along line 39—39 of FIGS. 34 and 40, this view showing the delivery end of the marshalling chain as shown in FIG. 36, its supporting sprocket, and associated duplex advancing paddles, and two of the deflecting paddle wheels, and portions of two adjacent potato receiving chutes and a stone receiving chute therebetween;

FIG. 40 is a fragmentary longitudinal section taken along line 40—40 of FIGS. 34 and 39, and showing the delivery end of the marshalling and selecting mechanism of FIG. 34, the electromagnetic clutch and brake unit which drives the deflecting paddle wheel, the potato sensing unit, the potato chute, the transverse potato conveyor, and the stone and clod deflecting cover extending over the transverse potato conveyor;

FIG. 41 is a longitudinal section of a representative form of potato sensing unit as viewed along line 41—41 of FIGS. 36 and 42, and showing the general components of the sensing unit and its mounting support, the adjacent end of the potato tumbling roll and the rounded discharge nose associated therewith;

FIG. 42 is a transverse section of the potato sensing unit as viewed along line 42—42 of FIG. 41, and showing the general arrangement of its components, its contoured insulating cover, and the adjacent potato spinning roll;

FIG. 43 is a schematic diagram of the electrical connections to the magnetic clutch and brake unit which manipulates the potato deflecting paddle wheel shown in FIG. 36, and the associated sensing and transistorized control circuit;

FIG. 44 is a schematic diagram showing the electrical connections to the magnetic clutch and brake unit, arranged to operate the paddle wheel in a manner to laterally deflect stones and clods instead of the potatoes, and the associated sensing and transistorized control circuit;

FIG. 45 is a fragmentary longitudinal section taken along line 45—45 of FIG. 46, and generally similar to the section shown in FIG. 40, but modified to provide for lateral deflection of the stones and clods and straight line discharge of the potatoes into a receiving chute in line with the advancing paddles when the deflecting paddle is operated by the energy system shown in FIG. 44; and FIG. 46 is a fragmentary plan view of the rear end of the harvester as the same would appear when viewed along line 46—46 of FIG. 45, and modified to provide for lateral deflection of the stones into a lateral chute and discharge of the potatoes into a receiving chute in line with the advancing paddles.

Similar reference characters refer to similar parts throughout the several views of the drawings and specification.

Mobile carriage structure

The self-propelled potato harvester of this invention includes a mobile carriage structure 150 of any desired design, a suitable type of carriage being shown for purpose of illustration in FIGS. 1, 2, 3 and 4 of the drawings. The carriage structure here shown includes a sturdy front axle 151 supported by suitable front wheels 152 which may be equipped with heavy load supporting ground grip tires. The dual rear wheels 153 are preferably larger than the front wheels 152, and are also equipped with heavy load supporting ground grip tires which support the rear axle as contained in the rear axle housing 154.

The front axle 151 and the rear axle housing 154 support a chassis framework which generally comprises a pair of longitudinally extending inner frame members 155 suitably connected to the front and rear axles, the inner frame member 155 having rear end extensions which project a substantial distance to the rear of the rear axle housing 154. The chassis frame also includes a pair of longitudinally extending outer frame members 155' which are secured to the inner frame members 155 by cross bracing, the outer frame members 155' also having rear end extensions which project for a substantial distance to the rear of the rear axle housing 154. The side frame members 155' also support various transverse members which provide support for certain parts of the processing equipment of the harvester which overhang the ends of the rear wheel axle.

The front wheel steering assembly 156 includes a hydraulic steering cylinder 157 which is controlled by a steering handle 158' mounted on a control post 158 within convenient reach of the driver's seat 159. The driver's seat 159 is suitably supported at an adjustable elevation by a seat supporting bracket 159' suitably connected to the chassis framework.

Figure 1:
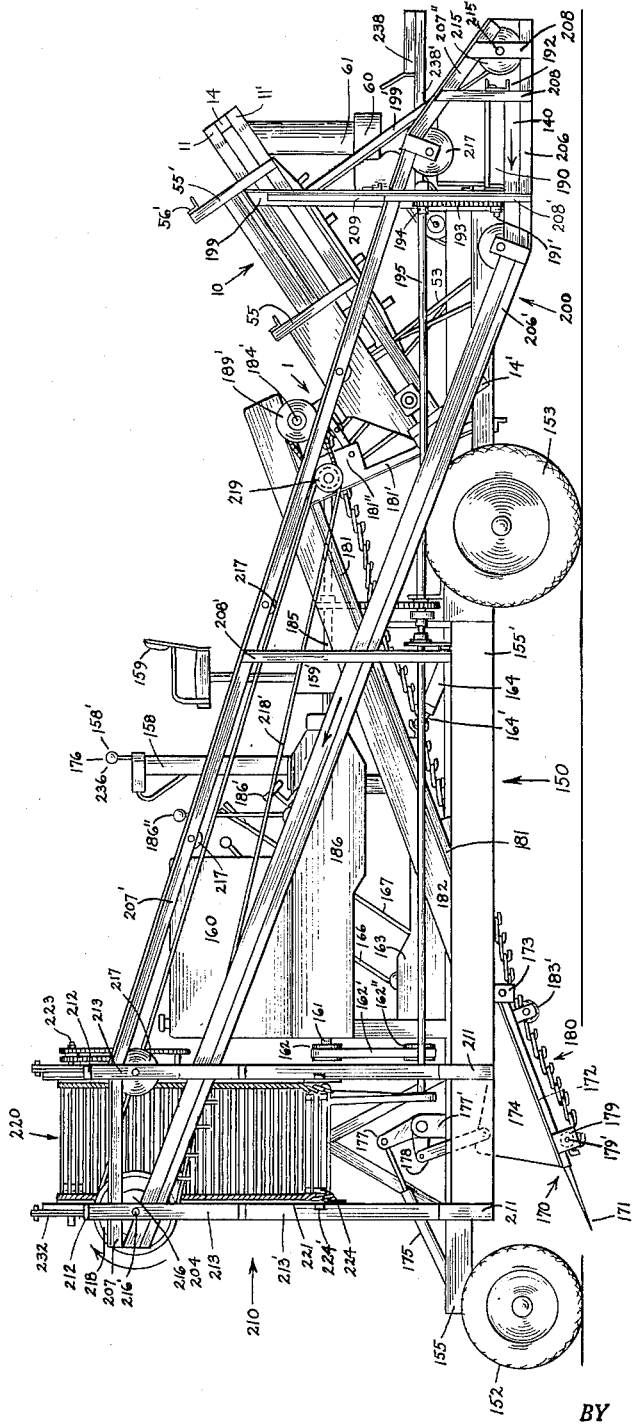
FIG. 1 is a side elevational view illustrating the general structure of a typical potato harvester made in accordance with this invention.
Figure 2:
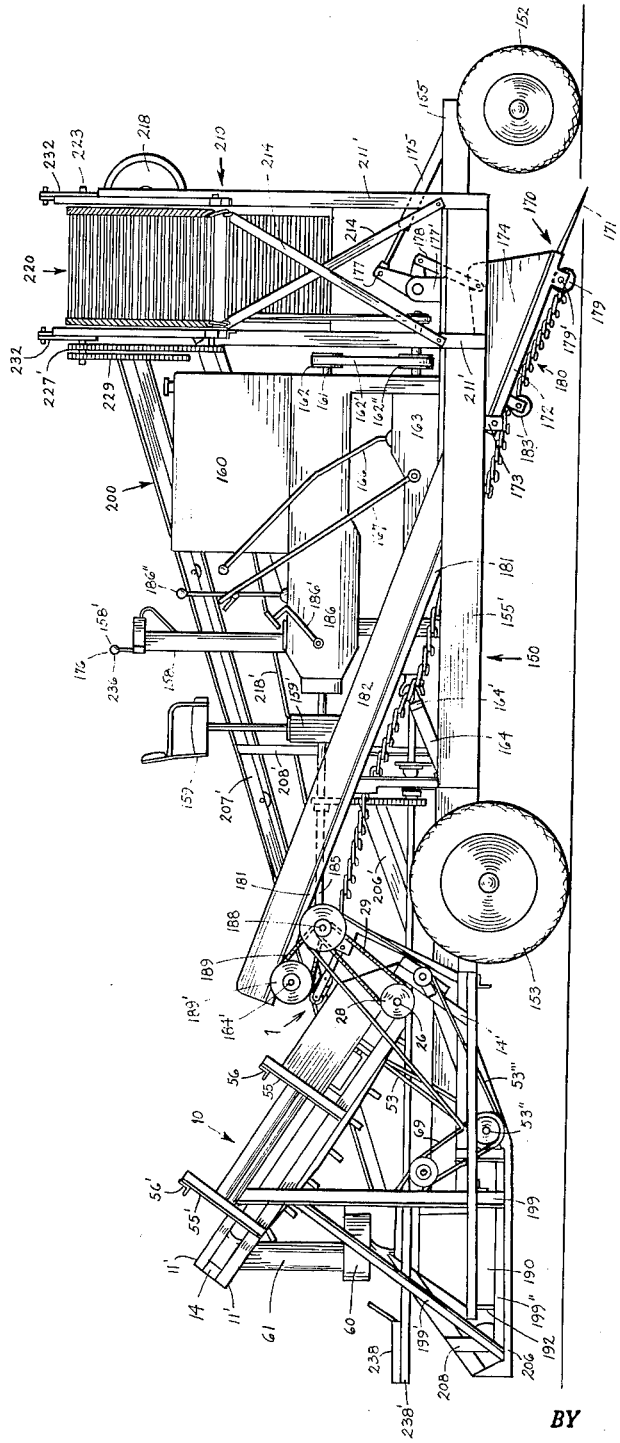
FIG. 2 is an elevational view showing the opposite side of the harvester illustrated in FIG. 1.
Figure 3:
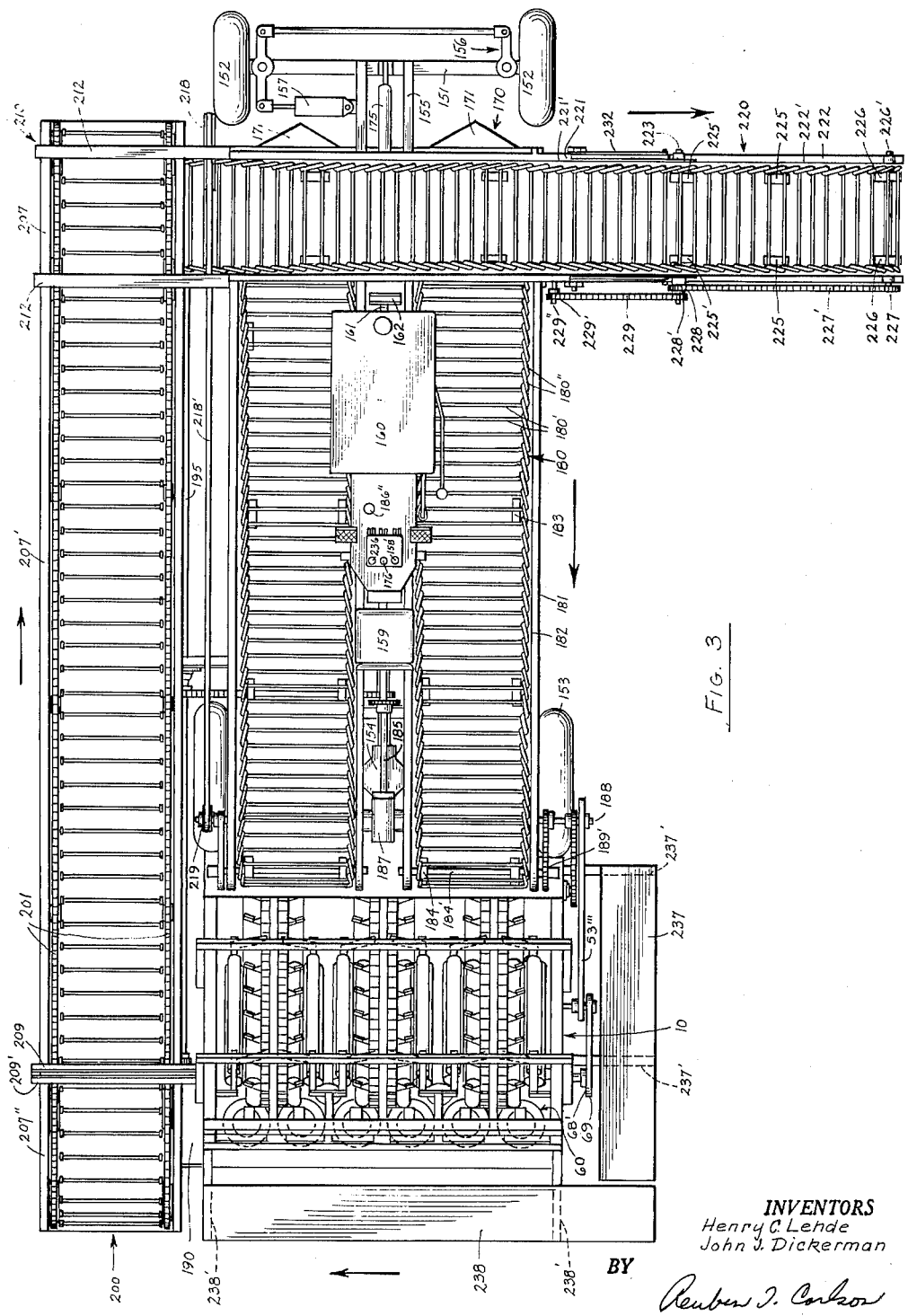
FIG. 3 is a general plan view of the harvester illustrated in FIGS. 1 and 2.

The mobile carriage structure and all operating components of the harvester may be driven from a single internal combustion engine 160 as shown in FIGS. 1, 2 and 3, fueled by either gasoline or diesel oil. The front end of the engine shaft 161 as shown in FIGS. 1, 2, 3 and 20, has a driving connection to the rear wheel axle. This driving connection preferably includes a sturdy take-off pulley 162 rather than a drive sprocket, which is fixed to the front end of the main engine shaft 161. The engine driven pulley 162 is connected as by a sturdy V-belt 162' and pulley 162" to the power input shaft of a variable speed transmission unit 163 which has a universal joint connection 164' to the drive shaft 164 leading to the differential gearing 165 connected to the rear wheel axle 165' as shown in FIG. 20. The variable speed transmission 163 is equipped with a gear shift lever 166 and a drive clutch lever 167, within convenient reach of the driver's seat 159, and whereby the traveling speed of the mobile harvester may be regulated by the driver.

Digging and conveyor system

The digging and elevator system of this harvester is diagrammatically illustrated in FIG. 5 and may include only a single hinged digging scoop 170 and associated elevating conveyor 180, but preferably includes at least two digging scoops and elevating conveyors so that at least two rows of potatoes may be harvested simultaneously.

Each digging scoop 170 as shown in FIGS. 1, 2 and 3, and only diagrammatically shown in FIGS. 5 and 6, includes a digging shovel or blade 171 which is generally triangular in form and preferably slightly concaved and of sufficient width to shovel up all of the potatoes in the row. Each digging blade 171 is rigidly fixed to the lower end of a supporting frame presenting side frame members 172. The upper ends of the side frame members 172 are pivotally supported by a pair of hinge brackets 173, suitably secured to the inner and outer chassis frame members 155–155'; so that the digging point of the blade 171 may be elevated or lowered as desired. A pair of spaced side plates 174, which may be generally triangular in outline as shown in FIGS. 1 and 2, are fixed to the adjacent side frame members 172.

A hydraulic device is provided to vertically adjust the elevation of each digging blade 171 and which may comprise a hydraulic cylinder 175 whose operation is controlled by a control lever 176 mounted on the control post 158, previously referred to. The hydraulic cylinder 175 is connected to one arm of a bell crank lever 177 supported by a suitable pivot bracket 177' fixed to the chassis framework. The other arm of the bell crank lever 177 is pivotally connected to a pair of connecting links 178 which are in turn pivotally connected to the side plates 174 of the digging blade. By a proper manipulation of the blade adjusting control lever 176, the digging points of the blades may be vertically adjusted and rigidly held at any selected digging depth or above ground when traveling to and from the potato field.

The potatoes, vines, soil, sod clumps and stones as shoveled up by each digging blade 171 are pushed on to an inclined power driven elevating conveyor 180. The elevating conveyor 180 is supported in major part by a fixed frame structure which includes a pair of spaced and inclined side frame members 181, each having a chute forming side wall plate 182 secured thereto as shown in FIGS. 1, 2 and 3. The side frame member 181 is suitably held in inclined position by bolts and supporting struts fixed to the chassis framework.

The traveling elevator conveyor 180 is formed by a series of spaced and transversely extending cross rods 180' each having hooked end portions 180" which are flexibly hooked to the next adjacent cross rod as shown in FIG. 3. The lower end of the elevating conveyor 180 is trained around a pair of cone-shaped rollers 179 rotatably mounted on roller supporting brackets 179' fixed to the side frame members 172 of the digging blade frame as shown in FIGS. 1 and 2. The upper reach of the elevating conveyor 180 is supported by a series of paired rollers 183 as shown in FIG. 3, which are rotatably supported by the adjacent inclined side frame members 181 of the fixed conveyor frame section. To prevent the lower reach of the elevating conveyor 180 from dragging along the ground, a pair of underslung rollers 183' also may be provided to support the lower end of the lower reach of the elevating conveyor, each underslung roller 183' being supported by a suitable bracket fixed to the adjacent side frame member 172 of the digging blade frame.

The upper end of the elevating coveyor 180 is supported by a pair of spaced sprockets 184 whose tooth lugs are spaced to engage the cross rods 180' of the conveyor. The upper conveyor supporting sprockets 184 are fixed to a sprocket shaft 184' rotatably journaled and supported by the upper ends of the side frame members 181 of the fixed conveyor frame section. The conveyor shafts 184' are positively driven from a main power shaft 185 operatively connected to the combustion engine by means of a variable speed transmission unit 186 as indicated in FIG. 20. The main power shaft 185 is controlled by a foot clutch 186' and a gear shift lever 186" associated with the transmission unit 186 and positioned within convenient grasp of the driver's seat 159. The main power shaft 185 is connected as by a speed reducing bevel gear assembly 187 to a transversely extending power shaft 188. The transverse power shaft 188 has driven sprockets 188' which drive the chains 189 which in turn are trained around slip sprockets 189' fixed to one end of the driven elevating conveyor shafts 184.

In the potato digging operation, each digging blade 171 digs up the vines, soil, sod, stones and other debris along with the potatoes, and during the advance movement of the harvester all this material is shoveled on to the upper reach of the traveling elevator conveyor 180. During upward travel of this material, most of the soil, smaller stones, sods and clumps, small potatoes for discard, as well as some of the loosened vines, are dropped out between the cross rods 180' of the elevating conveyor 180 as the upper reach of the conveyor moves upwardly towards the mid-section of the harvester. The larger stones, sod, hard clumps and clinging vines, which are not sifted out by the elevating conveyor 180, are then processed by the primary deviner 1, and the secondary deviner rolls 47 of the potato marshalling and secondary deviner system 10 as shown in FIG. 6. As hereafter explained, the potato marshalling and secondary deviner system also operates to break up many of the larger clumps and sod, remove dirt clinging to the potatoes during their travel therethrough, and pulls off such vines as are still connected to the upwardly tumbling potatoes. As the potatoes leave the marshalling and secondary deviner system, substantially all vines and sod have been removed, leaving only the larger stones and larger clumps yet unbroken by previous treatment for elimination from the potato product stream.

As shown in FIGS. 5 and 6, the substantially clean potatoes, large stones and unbroken large clumps, are marshalled into upwardly traveling columns by the paddle equipped potato advancing and marshalling chains 20 of the potato marshalling and secondary deviner system 10, and each column is discharged into a drop tube of an electronic potato selector and stone eliminator unit, fall Each of these selector units 60 is equipped with an oscillator sensitive to the differential electrical conductivity of potatoes as compared to stones and earth clumps, which creates activating pulses as the potatoes drop therethrough, and which pulses activate the selector which selectively separates the stones and clods from the potato stream, as more fully hereinafter described. The downwardly moving columns of potatoes, which leave the electronic potato selector and stone eliminator unit, fall by gravity into cushioning box 79 shown in FIGS. 4 and 13 equipped with cushioning baffles to prevent bruising and thence direct the potatoes to the upper reach of a transverse conveyor 190 positioned at the rear end of the harvester.

The transverse rear end conveyor 190 as shown in FIGS. 1, 2, 3, and 4, and diagrammatically shown in FIGS. 5 and 6, may comprise a continuous rubber impregnated fabric belt, or a rod type conveyor similar to the elevating conveyor 180 previously described. This transverse conveyor is supported at each end thereof by suitable rollers 191, or by suitable sprockets where a cross rod type of conveyor is used. The roller shafts 191' are rotatably supported by suitable transversely extending side frame members 192. One of the roller supporting shafts 191' has a drive sprocket fixed thereto which is driven by sprocket chain 193 as shown in FIG. 1. Sprocket chain 193 is trained around a driving sprocket 194 fixed to a conveyor drive shaft 195 which extends longitudinally along one side of the harvester as shown in FIG. 1 and diagrammatically illustrated in FIGS. 20 and 33. The longitudinal extending shaft 195 has a chain and sprocket connection 196 to a supplemental shaft 197 which in turn has a chain and sprocket connection 198 to the main power shaft 185 coupled to the engine 160 by the variable speed transmission 186. The supporting structure for the side frame members 192 of the transverse conveyor 190 may comprise a pair of inverted Y frames, each comprising a vertical post 199 and an inclined post 199' fixed to the rear extensions of the outer chassis frame members 155'; the lower ends of the posts 199–199' being joined by horizontal bracing members 199" as shown in FIG. 2.

Figure 4:
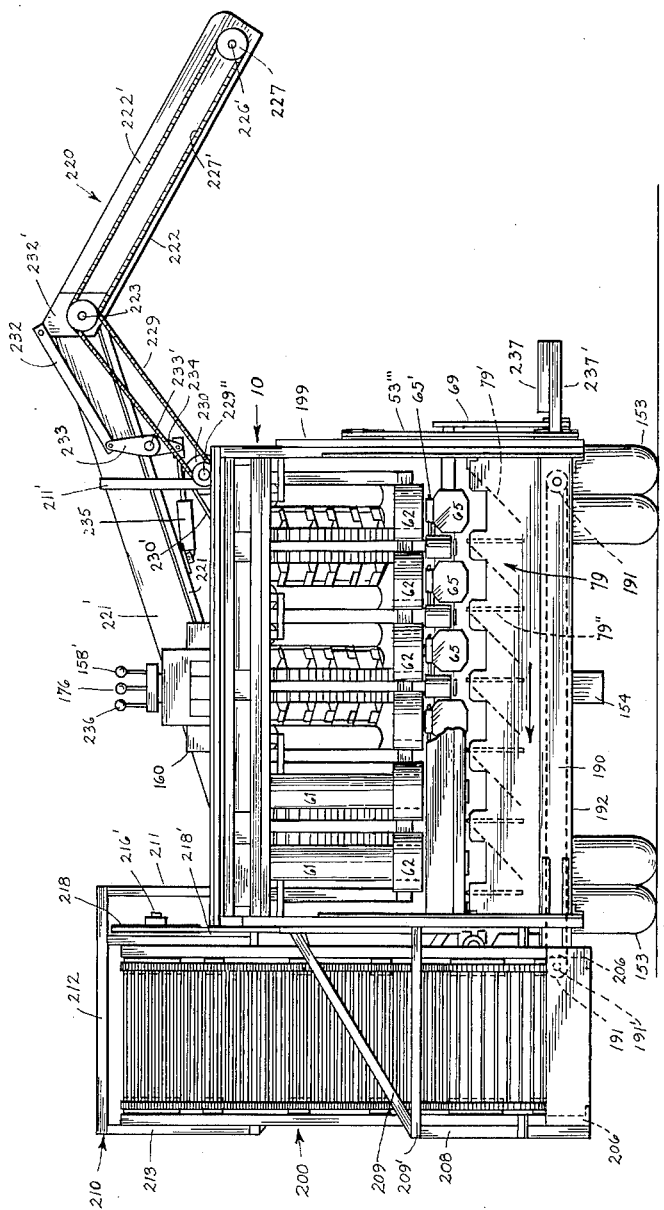
FIG. 4 is a general elevational view of the rear end of the harvester illustrated in FIGS. 1, 2 and 3; four of the six drop tubes leading to the potato selector units being removed to illustrate further details of one type of potato selector unit which may be used.
Figure 10:
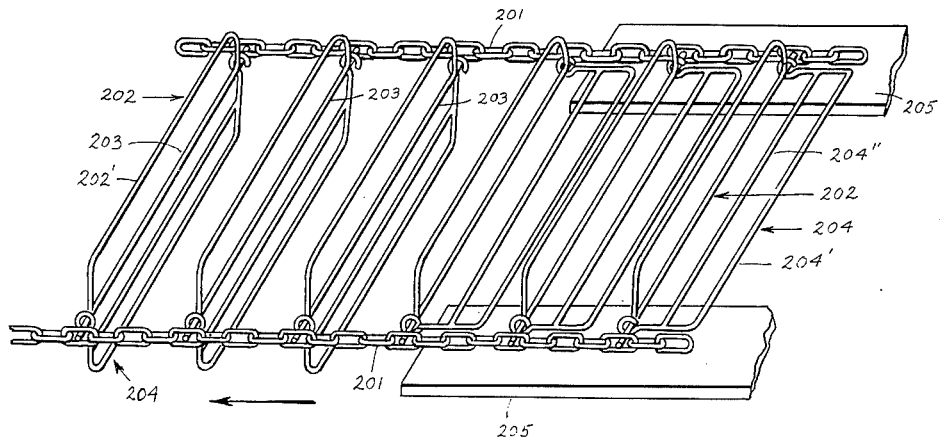
FIG. 10 is a detailed view in fragmentary perspective of the dump racks forming parts of the side conveyor which leads from the cross conveyor to the discharge conveyor as shown in general outline in FIG. 1, in the upper part of FIG. 3 and on the left-hand side of FIG. 4.

The potatoes are conveyed by the transverse conveyor 190 to the lower rear end of a side conveyor 200 as shown in FIGS. 1, 3 and 4. The side conveyor 200 is formed by a pair of spaced link chains 201, as shown more particularly in FIG. 10, which support a series of dump racks therebetween. Each dump rack is composed of a fixed vertical rack section 202 and a drop rack section 204 hinged to the vertical section. A series of spaced cross rods 203 are fixedly secured at the ends thereof as by weldments to the adjacent links of the spaced conveyor chains 201. Each vertical rack section 202 presents a vertically arching rod 202' whose ends are welded to the fixed cross rod 203 adjacent the chains 201 so that the series of vertical rack sections 202 remains in fixed vertical position and in spaced relation to one another as shown in FIG. 10. Each hinge rack section 204 presents an arched rod 204' whose terminal ends are shaped in the form of eyelet portions which embrace the adjacent cross rod 203 and are swingable thereon. A spanner rod 204" extends between and is secured to the legs of the arch rod 204'. The series of cross rods 203, together with the arch rod 204' and spanner rod 204" of the successive hinge rack sections 204 together present a series of substantially uniformly spaced conveyor rods when the hinge rack sections 204 are swung into the plane of the paired link chains 201 as indicated in FIG. 10.

The hinge rack sections 204 are supported in substantially coplanar position with respect to the link chains 201, during the major travel of the lower reach of the side conveyor 200, by means of a pair of slide plates 205 associated with the conveyor framework. However, the paired slide plates terminate short of the upper end of the lower reach of the side conveyor 200 to permit the hinged rack sections 204 to gravity drop into vertical position, as indicated at the left-hand end of FIG. 10, to thereby dump the potatoes traveling up the lower reach of the side conveyor 200 on to the cantilever loading conveyor 220 hereafter described. During upward travel of the potatoes on the lower reach of the side conveyor 200, any remaining loosened soil and small particles of debris, not previously removed by the preceding cleaning systems, are thereby sifted out so that a flow of potatoes, cleaned to commercial grade, are dumped on to the cantilever loading conveyor.

The side conveyor 200 is supported by a framework as shown in FIGS. 1, 3 and 4, of any suitable design. This framework may comprise a pair of spaced side rail sections 206 at the rear end of the harvester which extend horizontally approximately one foot above ground level, but below the discharge end of the transverse conveyor 190. The forward ends of the horizontal side rail sections 206 are joined to a pair of inclined side rail sections 206'. The horizontal side rail sections 206 and the inclined side rail sections 206' provide support for the rack supporting slide plates 205. This side conveyor framework also includes overhead side rail sections 207 at the front end of the harvester which extend substantially horizontally and which are in turn connected to a pair of overhead inclined side rail sections 207' whose lower ends are joined to a pair of more steeply inclined side rail sections 207" which are in turn joined by rear connecting struts 208 to the lower horizontal side rail sections 206 at the rear end of the harvester. The inclined overhead side rail sections 207' and the inclined lower side rail sections 206' are also connected by a series of vertically extending connecting struts 208' supported by the chassis framework as shown in FIG. 1.

As shown in FIGS. 1, 3 and 4, the lower end of the side conveyor framework is secured to the vertical post 199 of the adjacent inverted Y frame which provides support for the adjacent end of the transverse conveyor 190. The lower end of the side conveyor framework is additionally supported by a generally triangular frame formed by an inclined strut 209 and a horizontal strut 209' fixed to the adjacent vertical post 199, with the adjacent intermediate connecting strut 208' suspended from this triangular frame. The upper end of the side conveyor framework is supported by the stanchion framework 210, as shown in FIGS. 1, 3 and 4, which also provides the support for the cantilever loading conveyor 220 as hereafter described.

The stanchion framework 210, as shown in FIGS. 1, 2, 3 and 4, may generally comprise two pairs of spaced vertical posts 211 and 211', each pair of posts being fixed to and supported by the outer side frame members 155' of the chassis framework. The paired posts 211 adjacent the side conveyor have a pair of transverse overhead struts 212 secured to the upper ends thereof as shown in FIGS. 3 and 4. The outer ends of the transverse struts 212 are secured to the upper ends of the pair of vertically suspended struts 213, the lower ends of the suspended 213 being joined to a pair of downwardly extending and inwardly inclined struts 213' whose lower ends are secured to the adjacent vertical posts 211 are shown in FIG. 1. The opposite pair of vertical posts 211' may be stiffened by cross bracing 214 as shown in FIG. 2. As thus constructed, the paired inclined side rail sections 206' and the overhead horizontal side rail sections 207 of the side conveyor framework, may be rigidly secured by bolts or brackets to the adjacent vertical posts 211 and suspended struts 213 of the stanchion framework 210.

The paired link chains 201 of the side conveyor 200 are trained around a pair of rear chain sprockets 215 fixed to a sprocket shaft 215' which may be journaled on the rear end connecting strut 208 of the side conveyor 200. The upper end of the paired link chains 201 of the side conveyor 200 are trained around a similar pair of chain sprockets 216 fixed to a sprocket shaft 216' journaled on the adjacent vertical posts 211 and suspended struts 213 of the stanchion framework 210. The upper reach of the side conveyor 200 is additionally supported by a series of spaced rollers 217 as shown in FIG. 1. The head sprocket shaft 216' has a V-belt pulley 218 fixed thereto and around which a V-belt 218' is trained as shown in FIGS. 1 and 4. As diagrammatically illustratd in FIG. 20, the V-belt 218' is trained around another V-belt pulley 219 fixed to the main transverse shaft 188 of the harvester drive assembly.

The cantilever loading conveyor 220 as shown in FIGS. 1, 2, 3 and 4, comprises a continuous conveyor which may be formed similar to the continuous elevating conveyor 180 previously described, and which may be composed of a series of spaced U-shaped bars whose leg terminals are provided with hooked portions which are flexibly connected to the adjacent U-shaped cross bar. The loading conveyor 220 is supported by a framework which comprises a fixed frame section to which a hinged frame section is swingably connected.

The fixed frame section presents a pair of spaced side frame members 221 having chute forming side wall plates 221' secured thereto, the side frame members 221 being secured to the adjacent vertical posts 211–211' of the stanchion framework positioned adjacent the front wheels of the harvest. The hinged frame section comprises a pair of spaced side frame members 222 having chute forming side wall plates 222' secured thereto. The side wall plates 222' of the hinged frame section are pivotally connected as by pivot shaft 223 to the adjacent overlapping ends of the corresponding side wall plates 221' of the side frame members 221, with the ends of the pivot shaft 223 extending through the adjacent overlapping ends of the side wall plates 221' and 222'; the projecting ends of the pivot shaft 223 are supported by suitable bearing bushings fixed to the reinforcing plates 232', so that the hinged frame section and that portion of the cantilever conveyor which it supports, may be swung in a vertical direction and thus accommodate the discharge end of the loading conveyor to the truck body into which the harvested potato produce is discharged.

The lower end of the cantilever loading conveyor 220 is trained around a pair of idler sprockets 224 rotatably journaled on the stub shafts 224' fixed to the lower end of the side wall plates 221' of the fixed frame section. The upper reach of the loading conveyor 220 may be additionally supported by a series of paired idler rollers 225 supported on suitable stub shafts fixed to the side wall plates 221' of the fixed frame section and the side wall plates 222' of the hinged frame section, as shown in FIG. 3. The upper reach of the loading conveyor is guided over the pivot shaft 223 by means of similar idler rollers 225' which are rotatably journaled on the pivot shaft 223. The discharge end of the cantilever loading conveyor 220 is supported on a pair of driven sprockets 226 fixed to a transverse head shaft 226' journaled in suitable bearing bushings fixed to the discharge end of the side wall plates 222' of the hinged frame section.

The cantilever loading conveyor 220 is driven from the discharge end thereof by a driving sprocket 227 which is fixed to the projecting end of the head shaft 226' at the discharge end of the conveyor. The driving sprocket 227 carries a drive chain 227' which is trained around a sprocket 228 journaled on the adjacent projecting end of the pivot shaft 223. The sprocket 228 is fixed to a companion sprocket 228', and the two sprockets 228 and 228' idle on the projecting end of the pivot shaft 223. The companion drive sprocket 228' supports and is driven by a secondary drive chain 229 which is in turn trained around a sprocket 229' attached to a stub shaft 229" supported by a suitable bearing bracket which is connected to the adjacent vertical post 211' of the stanchion framework.

A drive pulley 230, as shown in FIGS. 4 and 20, is fixed to the shaft 229". The drive pulley 230 supports a crossed V-belt 230' which is trained around a driving pulley 231 fixed to the adjacent end of the longitudinal driving shaft 195 as previously described and shown in FIGS. 1 and 20.

The cantilever loading conveyor 220 is manipulated to present the discharge end thereof in any desired loading position by means of a hydraulic lift as shown in FIG. 4. The hydraulic lift may comprise a pair of side arms 232, pivotally secured to the upper end of a pair of reinforcing plates 232' fixed to the hinge ends of the side frame members 222' of the hinged frame section of this conveyor. The opposite end of each side arm 232 is fixed to the upper end of a lever arm 233 which is in turn fixed to a transverse shaft 233' journaled in suitable bearing blocks secured to the underside of the side frame members 221 of the fixed frame section of this conveyor. A second lever arm 234 is secured to the transverse shaft 233' and extends downwardly below the side frame members 221. The lower end of the second lever arm 234 is connected to a hydraulic cylinder 235 which is manipulated by a hand lever 236 mounted on the control post 158 positioned adjacent the driver's seat.

This improved harvester eliminates the need for a number of riding workmen which have been customarily assigned to the task of removing large stones, sod, hard clumps and clinging vines mixed with the potatoes moving along the rear and side conveyors. However, in operating the harvester of this invention, it is desirable to have one riding operator stationed at the rear end of the harvester to watch over the material flow, and so that this operator can signal the forwardly facing driver in the event that any clogging or impediment to the harvesting operation should result. For the convenience of this operator, a walk platform 237 supported by cross bars 237' fixed to the chassis framework, is positioned along one side of the harvester as shown in FIG. 3. In addition, a walk platform 238 extends transversely along the rear end of the harvester and is fixed to support bars 238' connected to the chassis framework.

*Primary deviner*

Debris material discharged from the upper ends of each of the elevating conveyors 180 usually includes a varying quantity of vines, and some of these vines have potatoes attached thereto which must be separated from the vines and the vines eliminated as rapidly as possible. A primary deviner 1 is positioned directly adjacent the discharge end of each of the elevating conveyors 180, as shown in FIGS. 1, 2, 6, 23, 23a, 24 and 29. The primary deviner 1 includes a free riding deviner roll 2 whose shaft extends parallel to the adjacent supporting shaft 184' of the elevating conveyor 180 as shown more particularly in FIG. 6. The deviner roll 2 is covered with a vine gripping material, such as rubber, and is positioned under but slightly to the rear of the upper conveyor shaft 184' so that the potatoes, vines and other debris must drop on the upper surface of the deviner roll 2. The rubber covered surface of the deviner roll 2 may be in the form of a rubber belt 3 which travels in the direction of the arrows as shown in FIG. 6. A lower belt tensioning roller 4, extending under and spaced from the lower reach of the elevating conveyor 180, may be provided to support the other end of the belt 3.

The deviner roll 2 is flexibly supported so that its rubber covered surface normally makes pressure contact with the elevating conveyor 180 as it moves around the upper conveyor supporting roll or sprockets 184. This support may be provided by a pair of pivot arms 5, shown more clearly in FIGS. 6 and 23, in which the shafts of the deviner roll 2 and lower belt guiding roll 4 are journaled. The lower ends of the supporting arms 5 are pivotally connected to suitable brackets 181'' which form part of the upper ends of the elevator frame supporting struts 181'. Suitable resilient means, such as springs 6, connected to the support arms 5 and side frame members 181, maintain the rubber covered surface of the deviner roll 2 in pressure contact with the elevating conveyor 180 as it travels along the underside of the upper conveyor supporting sprockets 184.

By the use of a rubber covered deviner roll 2, rotating in the direction of the arrow shown in FIG. 6, the major quantity of vines which are dumped with the potatoes and other debris from the discharge end of the elevator conveyor 180 on to the deviner roll 2, are caught between the deviner roll 3 and the underside of the elevating conveyor 180, and thence dragged downwardly and toward the front end of the harvester for discharge to ground. Any potatoes which cling to the vines are also stripped from the vines by this process. Any small quantity fraction of the vines which have escaped removal by the primary deviner 1, are eliminated and removed by the secondary deviner rolls associated with the potato marshalling and secondary deviner system 10 which will now be described.

*Potato marshalling and secondary deviner assembly*

The potatoes with accompanying debris, such as large stones, clods and any remaining vines, drop from the primary deviner above described into a drop bin 40 positioned at the lower end of a potato marshalling and secondary deviner assembly 10 which is arranged in upwardly inclined position with the lower end thereof directly under the primary deviner as generally shown in FIGS. 1, 2, 3 and 4.

In general structure, the marshalling and secondary deviner assembly 10 includes the drop bin 40 as shown in FIGS. 7, 8 and 9, from which the potatoes and remaining debris materials are upwardly advanced at an angle of about thirty degrees from ground level by a series of paddle equipped potato advancing and marshalling chains 20, operating in cooperative relation to a series of rolls, including a tumbling roll 45 by means of which the potatoes are spun or tumbled during upward advance, and an associated secondary spinner roll 46 and floating deviner roll 47 by means of which any remaining vines are removed.

The potato marshalling and secondary deviner assembly 10 includes a suitable supporting framework which may comprise a pair of upper side frame members 11 and a pair of lower side frame members 11' extending longitudinally of the harvester at an inclined angle; the upper and lower side frame members 11-11' being joined by transversely extending upper and lower head frame members 12-12' and upper and lower tail frame member 13- 13', thereby providing a pair of vertically spaced frames of generally rectangular form which are joined by vertically extending corner struts 14, as shown in FIGS. 1, 2, 7, 8 and 9. The upper end of this assembly framework may be rigidly supported in an inclined position by connecting the same to the adjacent vertical posts 199 and associated inclined bracing posts 199' which provide the support for the framework of the transverse rear end conveyor 190 as previously described. The lower end of this assembly framework may be supported by inclined struts 14' fixed to the chassis framework as generally shown in FIGS. 1 and 2.

The marshalling and secondary deviner assembly 10 as shown in FIGS. 3, 4, 6, 7, 8 and 9 is equipped with six marshalling chains 20, each having a column of spaced paddles extending laterally therefrom and together providing a series of six paddle columns. However, it will be appreciated that any desired number of marshalling chains and associated potato advancing paddles may be used as required. Each column of potato advancing paddles is associated with a set of triple rolls which includes a potato tumbling roll 45, a secondary spinner roll 46 and a cooperating floating deviner roll 47.

The potato advancing chains 20 are supported by three longitudinally extending upper tubular frame members 15 whose ends are secured to the upper head frame member 12 and the lower tail frame member 13 respectively, and by a corresponding number of lower tubular frame members 15' whose ends are respectively supported by the lower head frame member 12' and the lower tail frame member 13' as shown in FIGS. 7 and 8, each set of upper and lower tubular frame members 15-15' being in vertical alignment. Each of the upper tubular frame members 15 has a longitudinally extending bar 16 of Z-shaped cross-section secured to each side face thereof as shown in FIG. 8. Each Z bar 16 provides a supporting channel in which the upper reach of a potato marshalling chain 20 may travel.

Figures 11, 12:
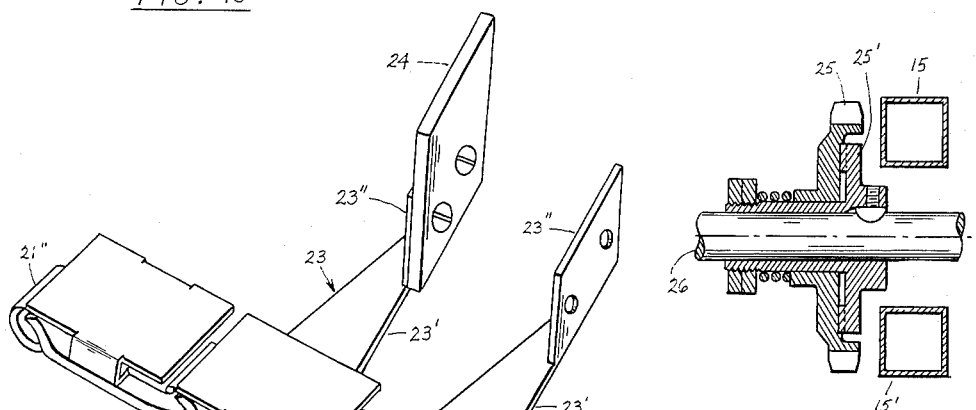
FIG. 11 is an enlarged fragmentary perspective detail of one of the advancing chains and associated advancing paddles which form a part of the potato marshalling assembly generally illustrated in FIG. 7.
FIG. 12 is a transverse section of the clutch sprocket associated with the shaft which drives the potato marshalling chains and paddles and as the same would appear when viewed along line 12—12 of FIG. 9.

Each of the paddle equipped potato advancing chains 20 is assembled from a series of hingedly connected chain links 21 as shown in FIG. 11, which are joined together to provide a continuous chain. Each link 21 may be stamped from a generally rectangular plate of sheet metal to provide a generally rectangular link frame having a transverse leg section 21' at one end thereof, and an underslung curvilinear grip lip 21'' formed to encircle the transverse leg 21' of the next adjacent link, the curvilinear grip lip 21' being cut from the plate which forms the link to provide a generally rectangular hole therein. Each link may be provided with a link covering platform 22 formed of sheet metal which presents wing tabs 22' secured to the longitudinal legs of the link frame as by weldments.

A series of potato advancing paddles arranged in columnar alignment, are secured in uniformly spaced relation to one side of the adjacent chain links. Each paddle 23 includes a laterally extending arm section 23' secured as by weldments to the adjacent link 21, and a paddle section 23'' extending upwardly therefrom and slightly rearwardly inclined with respect to the center link of the link chain as shown in FIG. 11. Each paddle section has secured thereto a paddle plate 24 which may be made from rubber impregnated fabric of substantial thickness and stiffness, but sufficiently flexible to avoid bruising the potatoes in tumbling contact therewith.

The upper reach of each continuous potato advancing chain 20 is pocketed in the guide channel formed by a Z bar 16 attached to the adjacent upper tubular frame member 15, with the upper surface of the link covering platforms 22 of the chain lying in substantially the same horizontal plane as the upper surface of the adjacent tubular frame member 15, as shown in FIG. 8. The lower end of each potato advancing chain 20 is trained over a tail sprocket 25 positioned under the primary deviner rolls 1. Each tail sprocket 25 is connected to a slip clutch 25' as shown in FIGS. 7 and 12, which is connected to a transverse supporting shaft 26 as shown in FIGS. 7, 9, 14 and 20. The transverse shaft 26 on which all of the tail sprockets 25 and associated slip clutches 25' are connected, is supported at the ends thereof by bearing blocks 27 secured to the adjacent upper and lower side frame members 11–11' of the potato marshalling and assembling framework, as shown in FIGS. 7, 8 and 9. A driving sprocket 28, as shown in FIG. 2, is secured to the projecting end of the tail sprocket supporting shaft 26. A driving chain 29, as shown in FIGS. 2 and 20, is trained around the driving sprocket 28 and is in turn trained around a sprocket 29' fixed to the main transverse drive shaft 188 of the harvester as shown in FIG. 20.

The upper discharge ends of the potato advancing and marshalling chains 20, adjacent the rear end of the harvester, are each supported by an idler sprocket 30, as shown in FIGS. 9, 16, 17, 18 and 19. The six idler sprockets 30 for the assembly shown in FIG. 7 are arranged in pairs, and positioned on opposite sides of the upper and lower tubular frame members 15–15' positioned therebetween, with the two sprockets 30 in alignment with the respective channel formations of the chain supporting Z bars 16. Each pair of adjacent idler sprockets 30 are journaled on a short shaft 31 as shown in FIG. 18. The short shaft 31 extends through and is rigidly fixed to a vertical metal plate 32 of substantial stiffness which rests upon the adjacent lower tubular frame member 15'. The vertical metal plate 32 is supported by two pairs of clamp plates 33 secured as by clamp bolts 33' to each end thereof, with the upper and lower ends of the paired clamp plates 33 positioned to frictionally grip the opposite sides of the upper and lower tubular frame members 15–15' extending therebetween. By adjusting the position of the paired sprocket supporting plates 33 and fixedly securing the same to the upper and lower tubular frame members 15–15' as by tightening the clamp bolts 33', the potato advancing chains 20 may be drawn to proper tautness.

The potatoes and remaining debris dropping from the deviner rolls 1 cascade into a drop bin 40 therebelow, which forms a part of the potato marshalling and secondary deviner assembly 10, as shown more particularly in FIGS. 7, 8 and 9. The drop bin 40 comprises a pair of side wall plates 41 secured to the adjacent upper frame members 11 of the assembly, and a transverse rear wall plate 42 suitably secured to the lower ends of the side wall plate 41 of the bin. The transverse rear wall plate 42 presents paddle entry cut-outs 42' as shown in FIG. 8 through which the potato tumbling paddles 23 may advance when they have passed over the upper half of the tail sprockets 25 which support the lower end of the potato advancing chains 20.

The entry side of the paddle entry cut-outs 42' of the transverse wall plate 42 may be provided with a vestibule housing 42'' formed of sheet metal as shown in FIG. 9, to prevent wedging of potatoes between the entry cut-outs 42' and the paddles 23. A downwardly inclined deflection plate 43, extending over the tail sprockets 25 and associated slip clutches 25', and secured to the upper end of the rear wall plate 42 and adjacent upper tail frame member 13, provides protection for the chain supporting and driving mechanism therebelow.

The floor of the drop bin 40 may be formed of a series of sheet metal floor plates 44, each extending between and secured to the right and left hand Z bars 16 of adjacent potato advancing chains 20 as shown in FIGS. 7 and 8. The channel formations of the Z bars 16 and the upper face of the tubular frame member 15 extending therebetween are not covered by these floor plates 44. Each floor plate 44, comprising a pair of relatively flat floor sections 44' and an intermediate upwardly arching section 44'', extends between the rear wall plate 42 of the bin 40 and the adjacent lower ends of the adjacent tumbling rolls 45, and spinner rolls 46. The upper ends of the arched sections 44'' of these four plates are shaped to slightly overlap the lower ends of the two spinner rolls 46 as shown in FIG. 8.

The stones and hard clods discharged from the primary deviner into the drop bin 40, are eliminated from the potato stream by a series of electronic potato selector and stone eliminator units 60 at the rear end of the harvester, each equipped with a drop tube 61; six such units being shown in FIGS. 3 and 4. For more effective operation, the potatoes, stones and hard clods are marshalled in separated and single file columns for discharge into the upper ends of the drop tubes 61 by the potato advancing and marshalling chains 20 and associated paddle plates 24, operating in cooperation with a series of potato tumbling rolls 45 and spinner rolls 46 which extend from the upper ends of the floor plates 44 of the drop bin 40 to the upper ends of the drop tubes 61 of the selector units 60.

Each column of potato advancing paddle plates 24, passing through the drop bin 40, picks up potatoes, stones and clod materials and pushes the same into the lower ends of the troughs as defined between each tumbling roll 45 and the adjacent spinner roll 46, the rolls 45–46 being upwardly inclined at an angle of approximately thirty degrees. As shown in FIGS. 7 and 8, a tumbling roll 45 is positioned directly beneath each column of paddle plates 24, and a spinner roll 46 is positioned adjacent the outer edge of each column of paddle plates 24 at a slightly higher elevation than the tumbling roll 45 shown in FIG. 8. Each tumbling roll 45 and the adjacent spinner roll 46 is separated a distance of approximately three-fourths to one inch, and thus provides a trough in which the potatoes and stones may travel as pushed towards the rear end of the harvester by the aligned paddle plates 24. The potatoes and stones advanced by the paddle plates 24 and contained in the troughs as confined between each tumbling roll 45 and adjacent spinner roll 46 are tumbled during advance by the rolls 45 and 46 which are driven in the direction indicated by the arrows shown in FIG. 8.

While two or more potatoes or stones may be pushed by each paddle plate 24 from the drop bin 40, the upwardly inclined movement of each paddle plate 24, together with the rotation of the adjacent tumbling rolls 45 and 46 on which the potatoes and stones are supported, results in the elimination of potatoes and stones which are not directly engaged by the paddle plates 24. Two nonspherical objects tumbling in contact with each other will result in the ejection of one, as projections on one or the other strike the adjacent object. Retention of a single potato or stone in contact with each of the columnized paddle plates 24 is facilitated by making the pushing faces of the columnized paddle plates 24, as shown in FIG. 7, rearwardly inclined at a slight angle from lines perpendicular to the center line of travel of the upper reach of the marshalling chain 20.

The potatoes or stones not directly engaged by the columnized paddle plates 24 during upward inclined travel thereof, spill laterally onto the link covering platforms 22 of the marshalling chains 20, or onto the substantially coplanar upper surface of the adjacent upper tubular frame member 15, and then tumble by gravity back towards the drop bin 40, until again engaged by a paddle plate 24. As thus operated, a single potato or stone is carried by each paddle plate 24 for separate discharge into the upper end of the adjacent drop tube 61 of the selector unit 60.

Each of the paired tumbling rolls 45 and 46 preferably has a roughened peripheral surface of soft rubber to thereby spin or tumble the potatoes in contact therewith without bruising them. The lower ends of the arched sections 44'' of the floor plates 44 provide walls which channel the potatoes and stones into the troughs defined between adjacent tumbling rolls 45–46, and each roll 46 and superimposed floating deviner roll 47 also serves to channel the potatoes and stones into these troughs, and prevent their escape between adjacent floating rolls 47.

Figure 15:
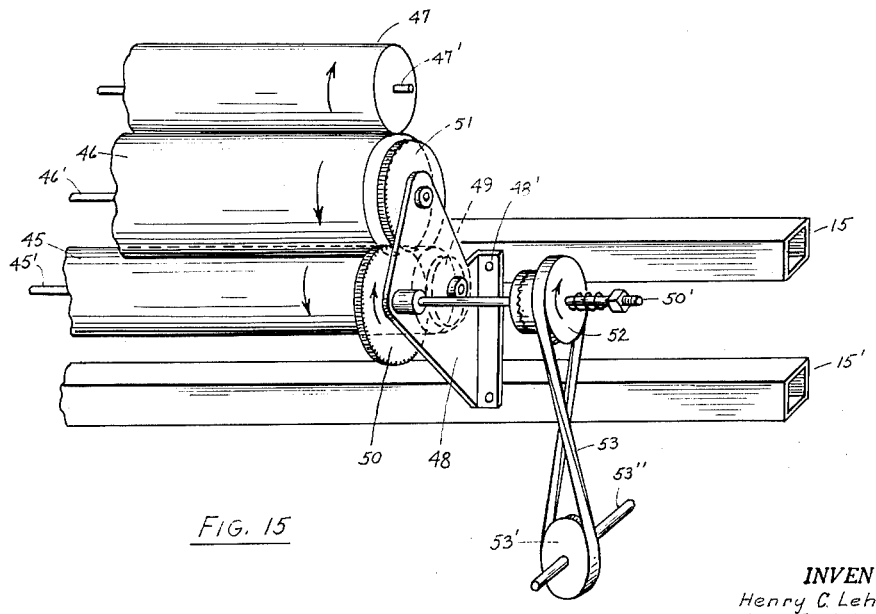
FIG. 15 is a fragmentary perspective view of one set of potato marshalling and secondary deviner rolls which is driven from the intermediate transverse shaft shown in FIG. 14, and which drive is further partly shown in FIG. 7.

Each tumbling roll 45 as shown in FIGS. 7, 8 and 15–19 is supported on a shaft 45′ and each companion roll 46 is also supported on a shaft 46′ as shown in FIGS. 7, 8 and 15. Positioned above each companion roll 46 and normally in floating contact therewith is a floating roll 47 which is also supported on a shaft 47′. Each floating roll 47 has riding contact with the adjacent companion roll 46, is rotated thereby in the direction indicated by the arrows in FIG. 8, and cooperates therewith to engage and withdraw therebetween any vines, vine fragments or sod not theretofore removed by the primary deviners 1.

As shown in FIGS. 7, 8 and 15, the lower end of each tumbling roll shaft 45′ and companion roll shaft 46′ is supported by a plate bracket 48 having an attaching flange 48′ which is secured as by bolts to the adjacent upper and lower tubular frame members 15–15′. The tumbling roll shaft 45′ carries a gear 49 which meshes with a driving gear 50 fixed to an extension 50′ of shaft 45′ and rotatably journaled on the bracket plate 48 as shown in FIG. 15. The driving gear 50 also meshes with a gear 51 fixed to the companion roll shaft 46. The gears 49–50–51 are so ratioed that the tumbling roll 45 and companion roll 46 are driven at the same peripheral speed. The gears 49–50–51 may be contained within a suitable gear housing 48″ which is fixed to and supported by the plate bracket 48 as indicated in FIG. 8.

Figure 14:
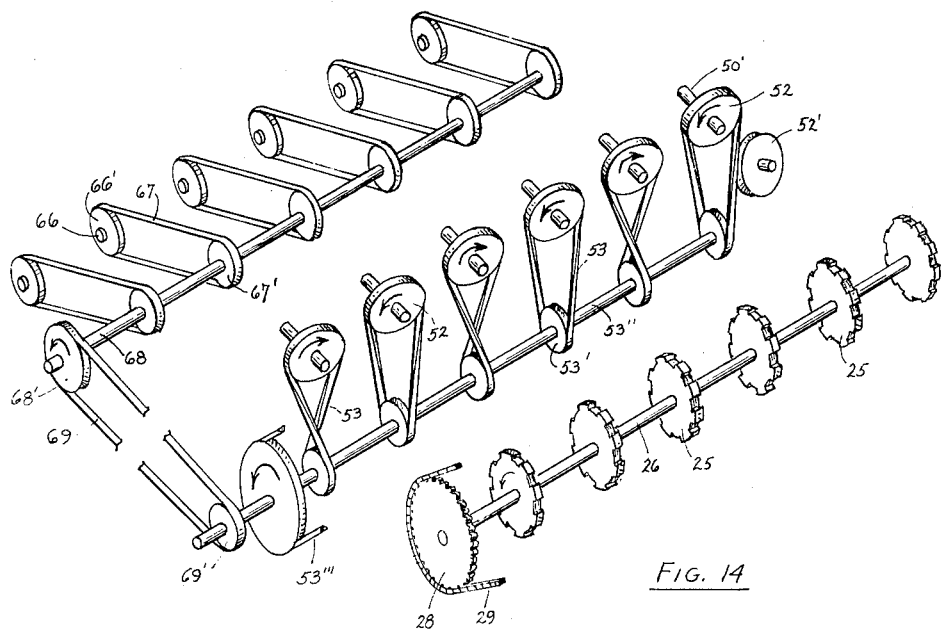
FIG. 14 is a diagrammatic perspective view of the sprocket assembly which drives the marshalling chains and paddles, and adjacent thereto the pulley and V-belt assemblies which drive the potato marshalling and secondary deviner rolls, and also the continuously driven shafts of the potato selector units.

The driving gear shaft extension 50′ is driven by means of a slip clutch pulley 52, attached thereto, and which supports a drive belt 53 trained around a drive pulley 53′ fixed to the transverse drive shaft 53″ of the harvester as shown in FIGS. 14, 15 and 20. Since the rolls defining adjacent marshalling troughs are positioned on opposite sides of the tubular frame members 15–15′, and rotate in opposite directions, adjacent drive mechanisms of the type shown in FIG. 15 should be designed for opposite rotation. Reversal of rotation may be obtained by twisting alternate V belts 53′ in opposite directions, as shown in FIG. 14. Guide pulleys such as 52′ may be employed to aid in directing belts 53 from pulleys 53′ to pulleys 52, and to guide belts 53 around obstructions.

The upper end of each tumbling roll shaft 45′ is supported by a bracket 54 terminating in a pair of leg portions 54′ which are secured as by bolts to the adjacent upper and lower tubular frame members 15–15′. Each bracket 54 terminates in a rounded section 54′ which may be shaped in a hemispherical form as shown in FIGS. 16 and 17, and which provides a cover for the upper end of the tumbling roll 45 so that the potatoes and stones may slide smoothly thereover and into the ajacent drop tube 61 of the adjacent selector unit 60. Each rounded end section 54″ has an inner well which rotatably supports the upper end of the tumbling roll shaft 45′.

The lower and upper ends of each floating roll shaft 47′ are supported by an overhead structure, as shown in FIGS. 7, 8 and 9, which includes a pair of lower vertical struts 55 and a pair of upper vertical struts 55′ fixed to the upper and lower side frame members 11–11′ of the potato marshalling framework as previously described. Each pair of vertical struts 55–55′ are joined by a transverse bar 56–56′, as shown in FIGS. 8 and 9. Each end of the floating roll shaft 47 is pivotally suspended by means of an angular leg 57 whose upper end is pivotally connected and suspended from the adjacent transverse bars 56–56′, the lower ends of each angular leg 57 providing journaled support for the adjacent projecting end of the floating roll shaft 47′. Each floating roll 47 rests by gravity weight on its associated spinner roll 46 therebelow, and is separated from the spinner roll only when a vine or sod is gripped therebetween. The upper end of each spinner roll shaft 46′ is fixedly suspended from the upper cross bar 56′ by means of a downward suspended strut 58 fixed thereto, the lower end of the suspension strut 58 providing journaling support for the upper end of the spinner roll shaft 46′.

In operation, the rearwardly inclined and vertically extending paddle plates 24 serve to push potatoes, stones and hard clods from the floor 44 of the drop bin 40 into the troughs defined between each adjacent pair of rotating tumbling and spinner rolls 45–46. As the potatoes and stones are pushed into these troughs by the columnized pusher paddle plates 24, individual potatoes and stones not in direct contact with a paddle plate 24 are pushed laterally onto the cover platforms 22 of the marshalling chains and roll back towards the bin 40 by gravity, until again picked up by the paddle plates 24. During upwardly inclined travel of the marshalled or columnized potatoes and stones as advanced by the individualized and columnized paddle plates 24, each potato or stone is given a tumbling action which serves to remove any clinging soil therefrom. Any remaining vines or sod are caught during tumbling between the adjacent spinner roll 46 and floating roll 47 and drop to ground between adjacent spinner rolls 46. As the individual potatoes and stones, each separately advanced by a paddle plate 24, reach the upper end of the tumbling rolls 45, they are separately dropped without obstruction, and one by one in rapid sequence, into the upper ends of the drop tubes 61 of the adjacent selector units 60. Soil build-up or wrapping of vines on the rolls 45 and 46 is prevented by the fact that the longitudinal movement of the paddles 24 adjacent the rotating rolls produces a spiral wiping action which serves to remove any accumulations from the rolls.

*Potato selector and stone eliminator units*

The marshalled and coulmnized potatoes and stones are each separately pushed by an individual paddle plate 24 into a position to influence the operation of an electronic potato selector and stone eliminator unit 60. In one form of this invention, a drop tube 61 is provided for each trough as formed by a tumbling roll 45 and adjacent spinner roll 46 as shown in FIGS. 1, 2, 3 and 4. Each drop tube 61 may be made of tubular sheet metal, lined with suitable cushioning material such as rubber to prevent bouncing or spiralling of the potatoes as they drop through the tube, which would interfere with the uniform spacing of the potatoes and stones as they drop through the tube; and to also avoid bruising of the potatoes as they separately fall therethrough. Each drop tube 61 is approximately four to six inches in diameter, with a preferred diameter of about five inches, and may be from two to three feet long to give the falling objects adequate spacing as they reach the sensing area.

Each drop tube 61 extends vertically downward and is connected at the lower end thereof to a doughnut shaped sensing ring 62 shown in FIGS. 4, 6 and 6a. The sensing ring 62 comprises a ring shaped metal casing 62′ of U-shaped cross-section formed of metal, packed with insulating material 62″ such as a foamed type of plastic and in which a sensing oscillator coil L1 is imbedded. The inner tubular wall 62′″ of the oscillator ring 62 is formed of a plastic material having low dielectric loss, secured to the metal casing section 62′, and has an internal diameter conforming to the inside diameter of the drop tube 61. The sensing oscillator coil L1 presents two end terminals 80 and 80′ and a center tap terminal 81 which emerge from the oscillator ring 62 as shown in FIG. 6a.

An electronic control housing 63 as shown in FIG. 6 is bolted to the sensing coil casing 62′ and has a power cable connection 63′ containing a number of conductor wires supplying current to the various electronic devices contained therein. The electronic control housing 63 is in turn connected to the sealed housing 64 of the magnetic clutch and brake mechanism. The sealed housing 64 may contain a disc type magnetic clutch and brake mechanism 70 as shown in FIG. 21, and in this case the housing 64 would present its longitudinal axis in a substantially horizontal plane.

The housing 64 which contains the magnetic clutch and brake mechanism 70 is provided with a journal which supports a stub shaft 65' to which a kicker plate 65 is secured as indicated in FIGS. 4, 6 and 21. Each kicker plate 65 may be normally held at an inclined angle directly under the inner wall of the sensing ring 62, and in this position operates to laterally deflect any object as dropped through this ring. However, the sensing coil L1 as contained within the sensing ring 62 is influenced by the electrical conductivity of the object dropping through the ring. Since stones and hard clods have relatively insignificant electrical conductivity as compared to potatoes, the kicker plate 65 remains in the inclined position shown in FIGS. 6 and 21 when a stone or hard clump is dropped therethrough, so that the stone or clod is thus deflected to ground discharge. However, when a potato of substantially higher electrical conductivity drops through the sensing coil L1 contained in ring 62, the sensing coil L1 promulgates an electrical impulse through the circuit hereinafter described, which in turn provides instantaneous coupling force to the clutch and brake mechanism 70, which then operates to manipulate the stub shaft 65' of the kicker plate 65 to swing the kicker plate 65 into a vertical position as shown in phantom lines in FIGS. 6 and 21 so that the potato dropping through the sensing coil containing ring 62 may drop downwardly past the kicker plate without deflection, for discharge onto the transverse rear end conveyor 190 as shown in FIGS. 1–6.

Figure 13:
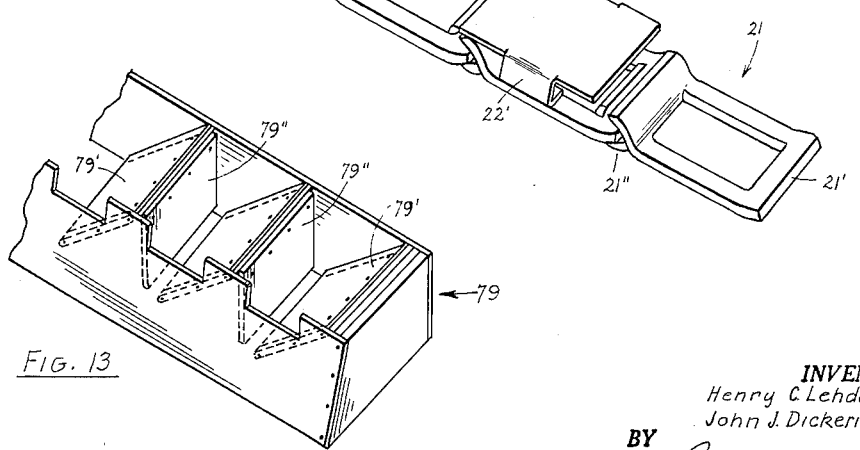
FIG. 13 is a fragmentary perspective detail of the cushioning box which cushions the fall of the potatoes as dropped from the potator selector units generally shown in FIG. 4.

The potatoes falling through the sensing rings 62 without obstruction by the kicker plates 65 therebelow are dropped directly into a cushioning box 79, as shown in FIGS. 4 and 13, which is positioned directly above the transverse rear end conveyor 190. The cushioning box 79 is equipped with a series of inclined rebound baffles 79', which may be made of loosely stretched gum rubber or like cushioning material, the baffles 79' being positioned directly under the respective sensing rings 62. The potatoes as dropped in successive order onto the rebound baffles 79' are deflected laterally against the adjacent freely suspended curtain baffle 79" made from a cushioning material such as sponge rubber. The curtain baffles 79" absorb the lateral velocity of the successive potatoes bounding thereagainst and thus serve to cushion the fall and gently deposit the potatoes on the transverse rear end conveyor 190.

The disc type magnetic clutch and brake mechanism 70 shown in FIG. 21 forms no part of this invention and is therefore only diagrammatically illustrated. The disc type clutch and brake mechanism 70 presents a rotor 71 which is continuously driven by a horizontal shaft 66 fixed thereto. Each rotor shaft 66 has a pulley 66' fixed thereto, as shown in FIG. 14, which is continuously driven by a V-belt 67 trained around a drive pulley 67' fixed to a transverse shaft 68 of the harvester, the transverse shaft 68 supporting all of the pulleys 67' which drive all of the magnetic rotor shafts 66. The transverse shaft 68 of the harvester, diagrammatically shown in FIGS. 14 and 20, has a main drive pulley 68' fixed thereto which carries a V-belt 69 trained around a drive pulley 69' fixed to a secondary transverse shaft 53" which is driven by a connecting belt and pulley assembly 53"' to the transverse drive shaft 188 of the harvester which also drives the tumbling and spinner rolls 45–46 as previously described.

Where a disc type clutch and brake mechanism 70 is used, the longitudinal axis of its containing housing would be arranged in horizontal position. The clutch and brake mechanism 70, as diagrammatically illustrated in FIG. 21, is relatively small in size and may be sealed within a compact housing 64 as shown in FIG. 6, which need be approximately only six inches in external diameter and approximately ten inches long. The control circuits associated with the sensing ring 62, more fully hereafter described, and which operates the clutch and brake mechanism 70, may also be compactly contained within a sealed box housing 63 as shown in FIG. 6, which need be approximately only four inches by four inches by six inches. Thus the sensing ring 62, control circuit box 66 and associated clutch and brake housing 64 together occupy only a small cubic volume adjacent the lower end of each drop tube 61.

As generally illustrated in FIG. 21, the continuously driven disc type rotor 71 of the disc type clutch and brake mechanism 70 carries a series of direct current electromagnets 71' whose current lead wires are connected to slip rings 72 mounted on its rotor shaft 66. Flowable magnetic fluid particles are contained within the housing 64 of the clutch and brake mechanism, and in surrounding relation to the disc 74. Energization of the electromagnets 71' of the disc type rotor 71 serves to magnetize the magnetic particles positioned in the gap between the disc type rotor 71 and an adjacent clutch disc 74, so that the clutch disc 74 is driven by the continuously driven disc type rotor 71 when its electromagnets 71' are energized. A series of braking electromagnets 73' are mounted on a normally stationary braking disc 73 positioned on the opposite side of the clutch disc. Energization of the braking magnets 73' serves to magnetize the magnetic particles in the gap space between the clutch disc 74 and the brake disc 73 to thereby apply an instantaneous braking force to the clutch disc 74 when the clutching electromagnets 71' of the disc rotor 71 are de-energized.

The clutch disc 74 has a stub shaft 74' extending therefrom to which a switch cam 75 is fixed as shown in FIG. 21. The switch cam 75 operates a switch element 75', closing an electrical contact in the control circuit as hereinafter described, with each revolution of the switch cam 75. The lower end of the disc clutch shaft 74' also has an eccentric 76 fixed thereto which is surrounded by an eccentric bearing 76' which is fixed to a lever arm extension 77 and which is in turn connected to a secondary lever arm 78 directly attached to the stub shaft 65' which supports the kicker plate 65. The kicker plate 65 is thus activated to make a downswing and an upswing to the inclined position with each rotation of the clutch disc 74.

The disc type clutch and brake mechanism 70, as diagrammatically illustrated in FIG. 21 and above generally described, provides highly effective means for manipulating the kicker plate 65, and may be used in association with a transistor circuit as diagrammatically illustrated in FIG. 21. The clutch and brake mechanism 70 is also characterized by a very low moment of inertia of the clutch disc 74, extremely rapid and smooth clutching and braking action, and smooth absorption of load shocks without wear or damage of the brake and clutch mechanism. The clutch and brake mechanism 70 is completely sealed within the sealed housing 64 to provide an integral unit which may be readily detached from the harvester and a replacement clutch and brake unit quickly installed in event such replacement is required.

The kicker plate manipulating clutch and brake mechanism 70 is very efficient in regard to consumption of electric and mechanical power. Average consumption of mechanical power supplied to the rotor shaft 66 of the mechanism 70 is about one-sixth horsepower, while the electrical power consumption in the brake and clutch electromagnets is about twenty watts only. While at the beginning of the movement of the kicker plate 65, some slight amount of energy may be lost by clutch disc slippage, substantially no energy is lost during reversal of the movement of the kicker plate 65 to a normally inclined position, since the kinetic energy stored in the kicker plate during its return to normal inclined position, is returned to the rotor shaft 66.

The clutch and brake mechanism 70 is substantially superior in performance, reliability, power economy, speed of operation and efficiency over kicker plates manipulating means which are hydraulically or pneumatically operated, and which do not return any of the kinetic energy of the kicker plate to the power system. The kicker plates 65 should be made sufficiently strong to withstand the impact of objects weighing up to several pounds and falling about three feet.

*Electronic control circuits*

An electric control circuit is provided to instantaneously energize and de-energize the clutching and braking electromagnets of the clutch and brake mechanism 70 so that the clutch and brake mechanism operates to manipulate the kicker plates 65 in a manner to kick out relatively non-conductive stones and hard clods as successively dropped through the sensing ring 62, but permits the more conductive potatoes to drop into the cushioning box 79 without obstruction by the kicker plates 65.

The electronic control circuit is activated by the sensing coil L1 contained in the sensing ring 62 as previously described. The sensing coil L1 carries a high frequency alternating current, of the order of approximately twenty-five megacycles, whose amplitude is instantaneously reduced by the presence of a conducting object passing therethrough. A reduction of the amplitude of the high frequency alternating current in the sensing coil L1, is reflected by an increase in the direct current supply to an oscillator circuit. The direct current pulse in the oscillator circuit is amplified to a voltage sufficient to operate a switching circuit which controls the clutching and braking magnets of the clutch and brake mechanism. It is thus seen that the electronic control circuit fundamentally comprises a sensing oscillator or detector circuit A, an amplifying circuit B, for substantially amplifying the pulse of the detector circuit, and a switching circuit C which controls the operation of the clutch and brake mechanism.

The electronic control circuit may comprise a transistor type circuit as shown in FIG. 21, which may be connected in circuit with the disc type clutch and brake mechanism 70. The disc type clutch and brake mechanism 70 shown in FIG. 21 presents a pair of wire leads 82–82′ extending from its slip rings 72 which supply direct current to the electromagnets 71′ of its rotor disc 71. The disc type clutch and brake mechanism 70 presents a pair of series connected wire leads 83–83′ which supply direct current to the braking electromagnets 73′ of its disc brake member 73. In addition, the disc type clutch and brake mechanism 70 presents a pair of wire leads 84–84′ in association with the switch element 75′ which is manipulated by the switch cam 75 fixed to the shaft of the clutch disc 74. The direct current leads 82–82′ and 83–83′ and the contact leads 84–84′ are connected at the output end of the sensing and control circuit which at the input end is in circuit with the end terminals 80–80′ and tap terminal 81 of the sensing coil L1.

The transistor type of control circuit as illustrated in FIG. 21, is made practical by the development of reliable transistors or relatively low cost, and may be used in preference to conventional vacuum tube circuits. The advantages of transistor type circuits include a single low voltage supply instead of a multi-voltage supply, lower power consumption, a substantial reduction in size and weight, instantaneous response without warm-up time and substantial freedom from the effects of shock.

The transistor control circuit as shown in FIG. 21 comprises an assembly of junction transistors, capacitors, resistors and diodes of relatively miniature size connected in circuit by fine wires. The transistor circuit per se can be operated on only two to three watts of input power, and the clutch and brake mechanism controlled thereby can be operated on only approximately twenty watts of input power. The sensing oscillator circuit A for the transistor control circuit includes a sensing coil L1 whose end terminals 80–80′ are supplied with high frequency alternating current. The sensing oscillator circuit A may be the Hartley type in which the sensing coil terminals 80–80′ are connected to a shunt tuning capacitor C1 to provide a high Q tank circuit, tuned to a high frequency by the capacitor C1. The sensing coil terminals 80–80′ are also connected to a base coupling capacitor C25 and a collector coupling capacitor C26 to provide base and collector stabilization for the oscillator and to block the D.C. voltage from the tuned tank circuit.

Collector voltage for the first oscillator transistor Q1 is supplied by the minus 45 volt supply 110 through the lead wire 111 and filter resistors R38 and R36. Filtering capacitors C27 and C30 are connected from resistors R36 and R38 to ground, to furnish additional filtering and decoupling for the collector voltage. Resistors R28 and R29 are connected in series to provide a voltage divider across the minus 45 volt supply 110, and are proportioned so that their junction with the base of the first transistor Q1 will establish the proper operating potential at the base of the transistor. In conjunction with an emitter resistor R32, the voltage divider resistors R28 and R29 operate to establish the current level for the operation of the first transistor Q1. A capacitor C28 provides a high frequency by-pass for resistor R32.

Oscillation of the circuit A of FIG. 21 is produced by collector to base coupling through the collector coupling capacitor C26, sensing coil L1 and base coupling capacitor C25. Any random voltage variation on the collector of the transistor Q1 is applied with reversed polarity to the base of transistor Q1, by transformer action of the sensing coil L1, thus creating the condition required for oscillation. The frequency of oscillation, which may be about twenty-five megacycles, will depend on the adjusted value of the tuning capacitor C1, as well as on the inductance of the sensing coil L1.

The direct current flowing in resistors R30 and R31 will increase as the amplitude of the high frequency oscillation decreases. The capacitor C29 is used to by-pass the high frequency to ground, so that direct current alone will pass through resistor R30. Thus a change in the amplitude of the high frequencey will cause a change in the direct current voltage drop across the tapped resistor R30.

The two turn center tapped sensing coil L1 is located within the shielding ring structure 62 of FIG. 6a as previously described. The electromagnetic field generated by sensing coil L1 is confined by its shielding ring 62 to the cylindrical volume within the outer wall and the end planes of the ring. As previously explained, potatoes, stones and clods are marshalled in single file and dropped separately at spaced intervals through the sensing ring 62. When an electrical conductor such as a potato is dropped through coil L1, it lowers the Q of the tank circuit, comprising the sensing coil L1 and tuning capacitor C1, to thereby reduce the amplitude of oscillation and causing the collector voltage to become less negative and the collector direct current to increase. The increased collector current, which results from passage of the potato through the sensing ring 62, causes a potential change or pulse at the junction of resistors R30 and R31. After the potato has dropped through the sensing coil L1, the oscillator circuit A returns to normal, resulting in a higher negative collector potential. The adjustable tap on resistor R30 provides a means for adjusting the amplitude of the output pulse transmitted to resistor R35.

The pulse thus created, is applied to the pulse amplifying circuit B through resistor R35 and capacitor C32 connected between the sensing oscillator circuit A and the amplifying circuit B. The junction of resistor R35 and capacitor C32 is connected to a feed back resistor R39. Capacitor C32 is also connected to the base of a second transistor Q2 and a resistor R34. The collector voltage for the second transistor Q2 is supplied from the minus 45 volt supply 110 by lead wire 111 through the filter combination of resistor R38 and capacitor C30. The operating point of transistor Q2 is determined by the combination of resistors R34, R41, R42 in conjuction with third transistor Q3 and resistors R37 and R40. The direct current feed back through resistor R34 stabilizes the direct current operating point of the second transistor Q2. The resistor R33 in the emitter circuit of second transistor Q2 further stabilizes the direct current operating point of this stage of amplification, by direct current degeneration. A capacitor C31 connected in parallel with resistor R33 serves to adjust the amount of alternating current degeneration in the emitter circuit of second transistor Q2. The current pulse applied to the base of second transistor Q2 through capacitor C32 is amplified by the combination of second transistor Q2, capacitor C31 and resistors R33 and R37. The output voltage pulse across resistor R37 is coupled directly to the base of the third transistor Q3. A by-pass capacitor C33 by-passes the unwanted higher frequencies to ground.

The third transistor Q3 and resistors R40, R41, R42 and capacitor C34 provide the second stage of amplification. The pulse at the base of the third transistor Q3 causes an amplified current to flow through the resistor R40 which is located in the collector circuit of the third transistor Q3. Resistors R41 and R42 stabilize the direct current operation of transistor Q3 by direct current degeneration while capacitor C34 adjusts the alternating current degeneration. The collector voltage is obtained from the minus 45 volt supply 110 through lead wire 111. The signal pulse appearing across resistor R40 is directly coupled to the base of a fourth transistor Q4. A by-pass capacitor C35 by-passes the unwanted higher frequencies to ground.

The signal pulse is further amplified by the combination of the fourth transistor Q4, resistors R43 and R44 and capacitor C36. Resistor R43 stabilizes the direct current operation of transistor Q4 by direct current degeneration, and condenser C36 adjusts the alternating current degeneration. The pulse at the base of the fourth transistor Q4 causes an amplified current to flow through resistor R44. Resistor R39 and capacitor C37 combine to feed-back a portion of the output pulse to the base of the second transistor Q2 through capacitor C32. The feed-back reduces the amplification and stabilizes the operation of the amplifier circuit B and makes it substantially independent of changes in transistor gain.

The amplified pulse that appears at the junction of capacitor C38 and resistor R54 is a negative pulse which passes through the diode D3 to the base of a fifth transistor Q5. The diode D3 serves to prevent any positive pulse from reaching the base of transistor Q5 by diverting it to ground through resistor R54. The fifth and sixth transistors Q5 and Q6 and the resistors R45, R46, R47, R48, R49, R50, R51 and R57 are connected in the switching circuit C known as a flip-flop. This circuit is employed to control the power transistors Q7 and Q8, which in turn switch energizing current to either the clutch coils 71' or the brake coils 73'. When the fifth transistor Q5 is in the "Off" or non-conducting state, and the sixth transistor Q6 is "On" or conducting, then the junction of resistor R57, the emitter of transistor Q6, and the base of the power transistor Q8 are at a high negative potential, whereas the junction of resistor R46, the emitter of the transistor Q5, and the base of the power transistor Q7, are at a low negative potential. When the base of transistor Q8 is at a high negative potential, the transistor Q8 is in the full "On" position, and current flows from ground through resistor R53, transistor Q8, lead wire 83', and the brake coils 73', and returns to the minus side of the storage battery 110 through lead wire 83 and the common negative lead wire 112. At the same time, the base of power transistor Q7 is at a low negative potential, and the voltage drop across resistor R53 raises the potential of the emitter of power transistor Q7 to a higher negative value than its base, so that transistor Q7 is non-conducting and will not send current through the clutch coils 71'.

When a negative pulse appears at the capacitor C38, it passes through diode D3 to the junction of resistors R45, R47, and the base of transistor Q5, and then switches transistor Q5, to "On" position. The resulting current which flows from ground through resistor R46, transistor Q5 and resistor R48 will cause a negative voltage drop at the junction of resistors R48 and R50, and the collector of transistor Q5, which voltage drop is applied through resistor R50 to thereby switch the transistor Q6 to the "Off" position. When the transistor Q6 is in the "Off" position, there is little current flow through the emitter resistor R57 and it is at a low negative voltage, and since the base of power transistor Q8 is connected by lead wire 114 to the emitter of transistor Q6, power transistor Q8 will also be switched to the "Off" position, and will stop current flow through the brake coils 73' and the brake of the magnetic clutch and brake mechanism 70 is released. A high negative potential is simultaneously produced at the junction of resistor R46 and at the emitter of transistor Q5 when transistor Q5 is switched on. This junction is connected by lead wire 113 to the base of power transistor Q7, so that thereby the power transistor Q7 is switched on and current flows through resistor R53, transistor Q7, lead wire 82', clutch coils 71', lead wire 82 and the common negative lead wire 112.

When the clutch coils 71' are energized, the clutch shaft 74' of the clutch and brake mechanism 70 is rotated until the switch cam 75 closes the switch element 75'. Capacitor C40, which is normally charged through resistor R52 to the full voltage of the battery 110, will now partially discharge through resistor R56, lead wires 84–84', and switch element 75', causing a rise in negative potential. This rise in negative potential at the junction of resistors R52 and R56 and capacitors C39 and C40, is conducted through diode D4 to the junction of resistors R50 and R51 and the base of transistor Q6. This negative pulse switches transistor Q6 to the "On" state, and this action in turn switches transistor Q5 to the "Off" state, and transistors Q7 and Q8 exchange conducting states, as explained above, so that the clutch coils 71' are de-energized and the brake coils 73' are energized. The positive pulse which appears when the switch element 75' opens, is blocked by diode D4 and conducted to ground through resistor R55, and will therefore have no effect on the circuit operation.

The diodes D1 and D2 are respectively connected across clutch coils 71' and brake coils 73', and protect transistors Q7 and Q8 from reverse voltage surges caused by the collapse of the inductive fields in the clutch coils 71' and the brake coils 73'.

A transistor circuit as illustrated in FIG. 21 and above described, is provided for each clutch and brake mechanism 70 and for each potato selector and stone eliminator unit 60 of the harvester, except that a common power source 110 may be provided for all of the individual transistor circuits. While a storage battery source of power as indicated in FIG. 21 can be used, it is more convenient to produce the circuit power by means of a dynamotor or other voltage converter capable of delivering approximately forty-five volts when driven by the usual automotive storage battery of the combustion engine 160. When powering the transistor circuits by means of a dynamotor, the dynamotor would be supplied with six volts from a conventional storage battery and generator arrangement driven by the combustion engine 160. Each transistor circuit and associated clutch and brake mechanism 70 and sensing coil L1 requires approximately twenty-five to thirty watts of electrical power.

Each of the transistor circuits may be fully contained and sealed within its control housing 63, and since the transistor circuit is adapted for compact assembly, its sealed housing 63 may be made relatively small in size. By the use of the disc type clutch and brake mechanism 70, which can also be compacted in a small space, its housing 64 can also be made relatively small and compact in size. Thus by the use of compactly sized transistor circuits and compactly sized disc type clutch and brake mechanisms 70, the instrument containing electronic control housings 63 and the clutch and brake mechanism housings 64 can be made very compact and light in weight.

It will also be appreciated that the transistor type control circuit above described, in operative association with the disc type clutch and brake mechanism 70, may be used to manipulate various types of parts, devices and mechanisms whose operations are instigated by a sensing coil or other sensing device, in addition to their application to manipulate the kicker plates 65 of the potato harvester as here specifically illustrated. The electronic control circuits above described are also adapted for other uses than controlling the operation of magnetic clutch and brake mechanisms, and may also be used to operate one or more flip-flop switches used to control numerous other devices and mechanisms.

The transistor type control circuit above described, coupled to a sensing coil or other sensing device and a disc type magnetic clutch and brake mechanism, is very sensitive and responsive to the electrical conductivity of various objects, and will respond to current pulses whose duration is a small fraction of a second, being substantially in excess of the speed of operation required to detect a falling potato or like conducting object. Thus, the element or device to be manipulated, such as the kicker plates 65, can be manipulated in a fraction of a second.

Adjustment of the tapped resistor R39 of FIG. 21, provides a means for controlling the sensitivity. Thus, the sensing coil and its associated circuits can be readily set to any desired sensitivity, to thereby operate the kicker plate only when a potato of a desired minimum size passes through the coil. All potatoes smaller than this minimum will be discarded.

It will also be appreciated that while the sensing coil L1 and the electronic circuits above described will respond to effect manipulation of the kicker plate 65 only when a conducting object passes through coil L1, various other deflecting means and arrangements may be employed in place of the kicker plate 65 normally held in an inclined position when no signal pulse is received. Other deflecting elements or media may be used, or the deflecting means may be employed to deflect the conducting object, as for example, by adjusting the kicker plate 65 so that it is normally in a stationary vertical position and moves to an inclined position when a signal pulse is received.

*Supplemental system for removing large sods, vines and stones*

In harvesting a potato field infested with a substantial quantity of semi-green vines and weeds, stones and sods of substantial size, it is desirable to remove such debris not eliminated by the elevating conveyors 180 and primary deviners 1, at an early stage in the systems flow of the harvester. The larger stones and sods which have not dropped through the elevating conveyors 180, and the vine and weed growth not removed by the primary deviners 1, can be effectively eliminated by the provision of a pair of right and left hand debris removing conveyors 115 as shown in FIGS. 22, 23, 24, 28 and 29. The upper runs of the debris removing conveyors are positioned directly under the deviner rolls 2 of the respective primary deviners, with the upper runs extending transversely from the center line of the harvester in a lateral direction, to discharge the remaining large sods, stones, weeds and vines along the sides of the advancing harvester.

Each of the debris removing conveyors 115, may be formed by a pair of continuous link chains 115' which may be made similar to the link chains 21 shown in FIG. 11, and previously described. The continuous link chains 115' are joined by a series of cross rods 115" which are so spaced that all of the potatoes as discharged from the primary deviner 1 will drop therethrough, with retention thereon of the larger stones, sods, weeds and vines not previously eliminated; the spacing of the cross rods 115" may be in the order of approximately four inches, and each of the debris removing conveyors 115 may have a width of twelve to eighteen inches. The upper run of the right and left hand conveyors 115 extend laterally from the center line of the harvester in a horizontal plane so that all of the material discharged from each primary deviner 1 will drop on to the cross rods 115" of the upper run of the debris removing conveyor 115, with the potatoes dropping through the upper run of the conveyor 115 and into a drop bin 40a positioned between the upper and lower runs thereof.

It will be appreciated that loose soil, smaller stones and sod and some of the vines and weeds have previously been sifted to ground through the elevating conveyors 180, with a substantial amount of the remaining vines and weeds eliminated by the primary deviners 1. However, the debris removing conveyors 115 advantageously serve to further classify the material flow by removing the larger size sod and stones so that only intermediate size sod, clods and stones not previously removed would drop with the potatoes into the drop bins 40a. Much of the remaining intermediate size clods and sods will be substantially pulverized and removed from the processing system by the tumbling action of the marshalling rolls, so that only the intermediate sized stones and very hard clods remain for elimination by the potato selector and stone eliminator units 60.

Both right and left hand debris removing conveyors 115 are supported from the lower end of the inclined potato marshalling framework heretofore described and also shown in FIGS. 22 and 23. As heretofore explained, this framework comprises a pair of upper and lower side frame members 11–11' whose ends are joined by upper and lower head frame members 12–12' and upper and lower tail frame members 13–13', thereby providing upper and lower rectangular frames joined by vertically connecting struts 14.

The upper run of each of the debris removing conveyors 115 is supported by a pair of upper side sprockets 116 which engage the conveyor chains 115', the paired side sprockets 116 being fixed to a sprocket shaft 116' whose ends are journaled in a pair of support brackets 116" fixed to the vertical struts 119' as shown in FIGS. 23 and 24. The inner end of the upper run of each of the debris removing conveyors 115 is also supported by a pair of inner guide sprockets 117 over which the paired conveyor chains 115' are trained, the paired guide sprockets 117 being fixed to a longitudinal shaft 117'. The ends of the longitudinal shaft 117' are journaled on a pair of spaced plate brackets 118–118'. The plate bracket 118 is fixed to the upper frame member 13 of the framework and extends over the inclined plate 43, and the plate bracket 118' is suspended from a transversely extending bar plate 119 whose ends are fixed to vertical struts 119' attached to the adjacent side frame members 11 and 11'.

The paired conveyor chains 115' of the lower reach of each debris removing conveyor 115 is trained over a pair of side driving sprockets 120 fixed to a longitudinal shaft 120', and over a pair of inner chain engaging guide sprockets 121 also fixed to a longitudinal shaft 121'. The longitudinal shafts 120'–121' of each debris removing conveyor 115 are supported by an underslung framework comprising a pair of transverse bars 122 whose ends are fixed to vertical struts 119' attached to the side frame members 11 and 11' of the framework as shown in FIG. 24. The ends of the longitudinal shafts 120'–121', to which the lower sprockets 120–121 are attached, are journaled in suitable journals fixed to the transverse bars 122.

Each of the driven shafts 120' which supports the driving sprockets 120 of the right and left hand debris removing conveyors 115, has a driving pulley 124 fixed to the end thereof which carries a V-belt 124' trained over a driving pulley 124" which is fixed to and driven by the longitudinal drive shaft 195 shown in FIG. 33. Since the two debris removing conveyors 115 move in opposite directions, one of the V belts 124' is crossed to reverse the direction of rotation of its respective pulley 124, as shown in FIG. 33.

The provision of a pair of right and left hand debris removing conveyors 115, each extending from the center line of the harvester in a lateral direction and driven as above described, provide an important adjunct when the harvester is called upon to operate in fields presenting serious sod, weed and large stone conditions. By the provision of the debris removing conveyors 115, this harvester will effectively operate under not only favorable field conditions, but also under adverse field conditions and where the use of harvesters as presently designed, would not be considered practical.

Under some conditions, vines, weeds, etc., have a tendency to wrap around the deviner belt 3, or around the deviner roll 2 if the deviner belt 3 is omitted. Soil accumulations may also build up on the deviner surface. A very simple and effective means of preventing vine or weed wrap-up and soil accumulation is obtained by attaching one or more projecting prongs or hooks 115a to the continuous link chain 115', adjacent the deviner belt 3 or roll 2 as indicated in FIGS. 22, 23, 24, 28 and 29, and shown in detail in FIG. 23a. The spacing between the hooks 115a and the deviner surface may be in the order of one-quarter inch. As vines or weeds wrap up, or soil accumulates on the deviner surface, they will be torn or scraped off by the adjacent projections 115a moving transversely in close proximity to the devine surface. Alternatively, the projections 115a may be omitted, and the chain 115' mounted so as to travel in close proximity to the deviner surface, so as to remove excess vines, weeds and soil from the deviner surface.

*Alternative advancing and marshalling assemblies*

Where the harvester is equipped with a pair of transversely extending debris removing conveyors 115 adjacent the discharge ends of the paired elevating conveyors 180 and paired primary deviners 1, it may be convenient to drive the paddle equipped advancing and marshalling chains from the upper ends thereof and adjacent the rear end of the harvester, because of the space occupied by the debris removing conveyors 115 and the drop bins 40a therebelow. This change in driving arrangement requires certain modifications in the potato advancing and marshalling structure illustrated in FIGS. 7, 8 and 9 and previously described. It is also possible to advance a greater number of columnar rows of potatoes and remaining stones through the advancing and marshalling assembly by providing each advancing chain with two columnized series of advancing paddles extending from opposite sides of each advancing chain.

There is illustrated in FIGS. 22-32 various alternative forms of potato advancing and marshalling assemblies whose drives are provided at the rear end of the harvester, and which are particularly adapted for association with either one or a pair of transverse debris removing conveyors 115 having a drop bin 40a therebelow. In the modification shown in FIGS. 22-27, a series of four paddle equipped advancing and marshalling chains 20a are provided, each of which may be formed by a hingedly connected series of stamped metal chain links 21 similar to the links 21 shown in FIG. 11 and previously described.

Each of the paddle equipped advancing chains 20a is supported by a lower idler sprocket 34 as shown in FIGS. 23, 25 and 26; all sprockets 34 being mounted to freely rotate on a common transverse shaft 34' whose ends are attached to support plates 34" which may be fixed to the lower ends of the adjacent upper and lower side frame members 11–11' of the assembly framework previously described. The upper ends of each advancing and marshalling chain 20a are supported by a driving sprocket 35; all of the driving sprockets 35 being fixed by means of a slip clutch 25', as shown in FIG. 12, to a common sprocket shaft 35' supported by suitable bearing plates 35" fixed to the upper ends of the adjacent side frame members 11–11' of the assembly framework as indicated in FIGS. 22, 23, and 28. The driving shaft 35' for the paddle equipped advancing and marshalling chains 20a is provided with a driving sprocket 36 fixed to one end thereof as shown in FIGS. 22 and 23, which supports a drive chain 36' trained around a driving sprocket 36" which is fixed to the transverse shaft 188 of the harvester as shown in FIG. 33.

Each of the advancing chains 20a is equipped with a series of longitudinally spaced potato and stone advancing paddles 23a extending from each side thereof as shown in FIGS. 22, 24 and 26. Each paddle 23a presents a laterally extending arm section 23a' which may be welded to or otherwise secured to an adjacent chain link 21 of the advancing chain 20a and terminates in an upwardly extending paddle section 23a" which may be formed integral with the arm section 23a', and which carries a relatively soft facing section 24 made from rubber impregnated fabric or the like. Each facing section 24 is so mounted as to incline rearwardly with respect to a line which is perpendicular to the longitudinal axis of the paddle supporting chain 20a as shown in FIG. 26. It is thus evident that each advancing chain 20a, equipped with a series of spaced advancing paddles 23a extending laterally from each side thereof, is operative to advance two columnar rows of potatoes and stones in an upwardly inclined direction. Each columnar row of potatoes may be supported during tumbling and spinning advances by a tumbling roll 125 or 125a, and/or a spinning roll 126 or 126a as hereafter more fully described.

To support the upper run of the respective advancing chains 20a, a longitudinally extending T-shaped supporting bar 17 is provided, whose flat section 17' is positioned directly under the upper run of its associated advancing chain 20a so as to provide a supporting slide surface therefor. The lower end of the support bar 17 is secured to a transverse angle shaped supporting member 17" as shown in FIG. 26 which extends through the lower loop portion of all of the advancing chains 20a, and whose ends are suitably secured to the side frame members 11–11' of the framework assembly. The upper end of each T-shaped bar 17 is supported by pedestal bracket 18 as shown in FIG. 26 which seats upon a transverse angle member 18' which extends through the upper loop portion of all of the advancing chains 20a and whose ends are suitably secured to the upper ends of the adjacent side frame member 11 of the framework assembly as shown in FIG. 23.

It is desirable to maintain the upper run of each advancing chain 20a in smooth sliding contact with the face section 17' of the T-bar 17 therebelow. As shown in FIGS. 24, 25 and 27, each chain link 21 may be provided with a U-shaped guide clip 25a on each side thereof and which respectively telescope over the free side edges of the flat section 17' of the T-bar 17 and maintain sliding contact therewith. These paired guide clips 25a prevent lateral slipping of the upper run of the chain 20a, or tipping of the chain 20a, due to stresses imposed thereon by unbalanced loading of the advancing paddle plates 24.

The upper face of the upper run of each of the advancing chains 20a is covered by the flat section 19' of an upper T-shaped member 19 whose lower end may be secured to the back wall plate 42a of the adjacent drop bin 40a as shown in FIG. 25. The upwardly extending leg 19" of the upper T-shaped member 19 provides a dividing partition which laterally channels the potatoes and stones into advancing engagement with the paired paddles 23a on each side of the advancing chain 20a. It will be noted that the lower end of the upwardly extending leg 19" terminates short of the drop bin 40a as indicated in FIG. 26. The upper end of each of the T-shaped members 19 is fixed to a transverse bearing plate 37 at the rear end of the harvester as shown in FIGS. 22 and 26, with the bearing plate 37 fixed to the upper and lower head frame members 12–12' as shown in FIG. 23.

The drop bin 40a is positioned directly below the upper run of each of the debris removing conveyors 115, and above the upper runs of the advancing chains 20a as shown in FIGS. 22, 23 and 25. Each drop bin 40a presents a pair of side wall plates 41a positioned within but directly adjacent to the vertical runs of the debris removing conveyors 115. Each pair of said wall plates 41a is joined to an inclined back wall plate 42a as shown in FIGS. 23 and 25. Each drop bin 40a is provided with a floor which is composed of a series of floor sections as shown in FIG. 25, each section comprising an arched floor portion 44a extending between the line of travel of an adjacent pair of paddle plates 24a, and presenting a pair of laterally extending flat floor portions 44b which terminate in a pair of downwardly extending flange portions 44c. The downwardly extending flange portions 44c are secured as by means of securing bolts 44d and associated spacing collars 44e to the vertical leg of the adjacent T-bar 17, as shown in FIG. 25.

It will be noted that the flat section 19' of each upper T-shaped member 19 also provides a stationary floor portion within the drop bin 40a and directly over the lower end of the lower T-bar 17, and these floor portions in combination with the arched portions 44a and horizontally extending floor portions 44b above described provide a complete floor for each drop bin 40a. The back wall plate 42a of the drop bin 40a is provided with suitable paddle entry cut-outs 42b through which the paddle sections 24 may advance as shown in FIG. 25. As shown in FIG. 23, an inclined baffle plate 43 fixed to the upper transverse frame member 13 of the assembly framework and to the upper end of the back wall plate 42a of the drop bin 40a, provides a protective housing for the lower idler sprockets 34 of the advancing chains 20a and serves to cascade the vines and other debris as discharged from the primary deviners 1 to ground.

In the modification shown in FIGS. 22 to 32, it will be noted that four advancing chains 20a are provided, each equipped with a pair of horizontally extending aligned rows of advancing paddles 23a as shown in FIG. 27, or paired rows of laterally extending and downwardly bent paddles 23b as shown in FIGS. 30, 31 and 32. The eight rows of advancing paddles 23a or 23b associated with the potato advancing and marshalling assemblies shown in FIGS. 22 and 28, serve to classify the potatoes dug from two planted rows into eight advancing columns. In cases where the crop is highly productive, the marshalling of the potatoes into eight columns, rather than six columns as shown in FIG. 7, insures adequate spacing of the potatoes and stones as discharged into the drop tubes 61, and efficient functioning of the potato selector and stone eliminator units 60. The classification of potatoes and remaining stones into eight advancing columns as shown in FIGS. 22 and 28, is achieved without enlargement of the marshalling framework by providing each of the four advancing chains 20a with a pair of advancing paddles 23a or 23b extending laterally from the opposite sides thereof.

Potato supporting and tumbling means are provided for each row of advancing paddles 23a which extend from the discharge edge of the floor of the drop bin 40a to the upper end of the drop tube 61 of one of the potato selector and stone eliminator units 60, and which serve to support and tumble the potatoes and remaining stones during their upward inclined advance by the adjacent row of advancing paddles 23a. In the form of the invention illustrated in FIGS. 22, 24, 26 and 27, the supporting and tumbling means comprises a rubber covered tumbling roll 125 which is positioned directly under the spaced arm sections 23a' of each row of advancing paddles 23a. Each tumbling roll 125 may be approximately two and one-half to three and one-half inches in diameter, with a preferred diameter of approximately three inches, with the lower end thereof extending slightly under the adjacent flat floor portion 44b of the drop bin floor as indicated in FIGS. 24, 25 and 26.

Each tumbling roll 125 is fixed to a longitudinally extending supporting shaft 125' whose lower end is journaled in a bearing plate 38 extending transversely of the assembly framework, with the ends thereof secured to the lower ends of the upper and lower side frame members 11–11' thereof. The upper end of each tumbling roll shaft 125' is journaled in the vertical leg of an angular supporting bracket 127 whose horizontal leg may be secured to the transverse angle member 18', which also supports the upper end of the T-shaped bar 17 extending under the upper run of the advancing chain 20a, as previously described and as shown in FIG. 26. The angular shaft supporting bracket 127 presents a hemispherical or dome-shaped section 127' fixed thereto which provides an end cover for the tubular roll 125 and terminates directly adjacent the upper end of a drop tube 61 as shown in FIG. 22.

In the modification shown in FIGS. 22, 24, 26 and 27, a spinning roll 126 is positioned adjacent to and in operative association with each tumbling roll 125. The spinning roll 126 in this modification is preferably covered with rubber or like gripping material, is positioned at a slightly higher elevation than its associated tumbling rolls 125, and has a diameter in the order of three of four inches, with a preferred diameter of approximately three and one-half inches. It will be noted by referring to FIG. 26, that each spinning roll 126 and its associated tumbling roll 125 are spaced apart at their adjacent peripheries for a distance of approximately one-half to one inch, and are both rotated in the same direction, with the upper peripheries thereof rotating in a direction away from the adjacent paddle supporting advancing chain 20a as indicated in FIG. 26.

Each spinning roll 126 is fixed to a longitudinally extending supporting shaft 126' whose lower end is rotatably journaled in the lower bearing plate 38. The terminal end of the adjacent arched floor portion 44a of the drop bin 40a, slightly overlaps the lower end of the adjacent spinning roll 126, as indicated in FIG. 26. The upper end of each spinning roll 126 terminates in a rounded end section 128, through which the shaft 126' extends, and is rotatably supported by a suitable bearing mounted on the upper transverse bearing plate 37, to which the upper end of the upper T-shaped guide member 19 is also fixed as previously described.

Means are provided for positively rotating each of the spinning rolls 126 and adjacent cooperating tumbling rolls 125, so that they are all rotated in unison in the direction indicated in FIG. 26, and at substantially the same peripheral sped. This driving means may comprise a sprocket 129 which is fixed to the upper terminal end of each spinner roll shaft 126' as shown in FIGS. 22 and 26. One run of a continuous drive chain 129' is looped around all of the eight driving sprockets 129 in the manner indicated in FIGS. 26 and 33 to thereby drive the spinner roll shafts 126' in the directions indicated. The continuous sprocket chain 129' is looped around an end driving sprocket 130 whose stub shaft 130' is rotatably journaled in an end extension of the upper bearing plate 37 as shown in FIG. 22. The other end of the stub shaft 130' is connected to a bevel gear assembly 131 as shown in FIGS. 22 and 33, which is driven by the upper sprocket shaft 35' to which the upper drive sprockets 35 which support the advancing chains 20a are secured, as previously described. The continuous sprocket chain 129' and its associated sprockets are enclosed in a shield 37', shown partly cut away in FIG. 22.

The lower end of each spinner roll shaft 126' has a driving gear 132 fixed thereon, as shown in FIG. 26, which meshes with an idler gear 133 whose stub shaft 133' is supported by the lower transverse bearing plate 38. The idler gear 133 meshes with a driven gear 134 fixed to the lower end of the adjacent tumbling roll shaft 125'. Thus the driving chain 129', as driven by the transverse sprocket supporting shaft 35' of the harvester, operates to rotate all of the spinner rolls 126 and associated tumbling rolls 125 in unison.

The potatoes and remaining stones deposited on the floor of the drop bin 40a, are engaged by the respective advancing paddles 23a and pushed in an upwardly inclined direction from the discharge edge of the bin floor, and on the lower ends of the tumbling rolls 125. The vertical leg 19" of the stationary upper T-shaped member 19 serves to divide the flow of upwardly advancing potatoes and stones and push them laterally into supporting contact with the upper periphery of the adjacent rotating tumbling rolls 125, whose upper peripheries rotate in a direction away from the adjacent partition forming vertical leg 19" of the stationary T-shaped divider 19.

The rotative movement of each tumbling roll 125, rolls the potatoes and stones into contact with the upper surface of the adjacent spinning roll 126, which further aids in spinning the potatoes during their upwardly inclined advance. Where more than one potato or stone is engaged by the facing section 24 of each advancing paddle 23a, the rotating action of the tumbling roll 125 and the adjacent spinning roll 126 serves to effect discard of excess potatoes and stones, so that only one stone or potato is engaged by the facing section 24 of each advancing paddle 23a as it arrives at the upper end of the drop tube 61. Thus each row of upwardly advancing paddles 23a, in cooperative association with its tumbling roll 125 and spinning roll 126, serves to marshall and align the potatoes and stones in spaced successive order and in a single column before they are discharged into the drop tube 61. The tumbling and spinning agitation of the potatoes and remaining stones during their upwardly inclined advance by the advancing paddles 23a, also serves to rub off clinging soil from the potatoes and stones and to pulverize remaining hard clods of soil so that this debris may drop to ground between the paired tumbling and spinning rolls 125–126.

In cases where all the vines have not been substantially removed by the primary deviners 1 and the transverse debris removing conveyors 115, a floating idler roll 47 as previously described may be positioned in rolling contact with each of the spinning rolls 126, with each floating roll 47 mounted on a floating roll shaft 47' suspended by a pair of depending struts 57 supported from transverse bars 56–56' of the framework assembly as previously described. However, where all vines have been substantially removed by the action of the primary deviners 1 and the transverse debris removing conveyors 115, a baffle plate 135 as shown in FIG. 26, extending substantially the full length of each spinning roll 126, and whose lower edge is substantially in contact therewith, may be provided to prevent any potatoes from hurdling the spinning rolls 126. Each inclined baffle plate 135 may be supported by a pair of suspension struts 135' fixed to the transverse bars 56–56' of the framework assembly as indicated in FIG. 26.

It will be noted that the arm sections 23a' of the advancing paddles 23a in the modification shown in FIGS. 22, 24, 26 and 27, extend substantially in a horizontal plane, and that the tumbling rolls 125 are positioned directly under each set of horizontally extending arms sections 23a'. However, it will be appreciated that advancing paddles 23b which feature downwardly bent arm sections 23b' may be employed as shown in FIG. 31, in which case the adjacent tumbling rolls 125 and spinning rolls 126 would be arranged as shown in FIG. 31. Where downwardly bent arm sections 23b' are employed, it is desirable to provide a floor member 136 positioned between the advancing chain 20a and the adjacent tumbling roll 125. The floor member 136 extends from the discharge end of the floor of the drop bin 40a to a point adjacent the upper end of one of the drop tubes 61.

As shown in FIG. 31, this supporting floor member 136 may take the form of an inverted V-shape having an inclined floor forming leg 136' positioned directly under each row of inclined paddle arms 23b'. Each V-shaped floor forming member 136 has a vertical attaching leg 136" which may be secured by spaced bolts 137 and associated spacing collars 137' to the depending vertical leg of the adjacent T-shaped support bar 17.

In the arrangement shown in FIG. 31, each tumbling roll 125 and its supporting shaft 125', and its associated spinning roll 126 and its supporting shaft 126', are adjusted in position and elevation to provide a potato advancing trough therebetween, and to efficiently cooperate with its row of advancing paddles 23b, but would otherwise be mounted and driven in the same manner as the modification shown in FIGS. 26 and 27. In the modification shown in FIG. 31, the potatoes and remaining stones driven from the drop bin 40a by the inclined advancing paddles 23b, tumble laterally down the inclined legs 136' of the V shaped floor member 136 and then tumble and spin in the space between the adjacent tumbling roll 125 and associated spinning roll 126. If more than one potato or stone is engaged by the facing section 24 of each advancing paddle 23b, the excess potatoes or stones would be driven laterally over the downwardly inclined leg 136' of the V-shaped floor member 136, or roll downwardly over the spinning roll 126, toward the bin 40a until again re-engaged by an advancing paddle, and so that each inclined advancing paddle 23b discharges only one potato or stone in successive spaced order into the drop tube 61. A cooperating floating roll 47, operative to remove any of the remaining vines, may be associated with each of the spinning rolls 126, or alternatively, the baffle plate 135 suspend from the transverse bars 56–56' previously described may be associated with each spinning roll 126 as shown in FIG. 31.

In the modification shown in FIG. 32, the respective arm sections 23b' of the advancing paddles 23b are also arranged in a downwardly inclined position, with each row of inclined arm sections 23b' advancing over the inclined leg 136' of the inverted V-shaped floor member 136 constructed and supported as shown in FIG. 31 and previously described. In the modification shown in FIG. 32, only a tumbling roll 125a is provided for each row of advancing paddles 23b, with the tumbling roll 125a of this modification having a diameter of three to five inches, and centered directly under the facing sections 24 of each row of advancing paddles 23b'. Each of the tumbling rolls 125a of the modification shown in FIG. 32, rotate in the direction of the arrow indicated thereon, and which rotation assists in the elimination of excess potatoes and remaining stones, so that only one potato or stone is advanced by the facing section 24b of each advancing paddle 23b as it arrives at the upper end of the drop tube 61. In this modification, only the shaft 126', without a spinning roll mounted thereon, would be provided as the driving medium for each tumbling roll 125a. Each tumbling roll 125a would be otherwise constructed and mounted in the same manner as the tumbling roll 125 previously described, but is driven in the opposite direction with the upper periphery thereof moving toward the V-shaped floor member 136. An inclined baffle plate 135a, positioned as shown in FIG. 32 and suspended by suspension struts 135' from the transverse bars 56–56' of the framework assembly, is provided to maintain the advancing column of potatoes in supported position on the adjacent tumbling roll 125a and in tumbling contact with the adjacent baffle plate 135a.

To reduce the number of rolls required for the potato and stone advancing and marshalling assembly, and to eliminate gears 132–134 of FIG. 26 and thereby correspondingly reduce the cost of the harvester, the assembly shown in FIGS. 28–30 may be employed, and is fully operative to perform its intended functions when the tumbling rolls are eliminated and only a single spinning roll is used in association with each row of advancing paddles 23b. In this modification, four paddle supporting chains 20a are employed, each equipped with a paired series of spaced and longitudinally aligned advancing paddles 23b whose downwardly inclined arm sections 23b' are secured to and extend laterally from opposite sides of each advancing chain 20a, as shown in FIG. 30. The paddle advancing chains 20a, their sprocket drives, and the assembly framework is otherwise generally similar to that shown in FIGS. 22–26, as is evident by referring to FIGS. 28 and 29. The modification shown in FIGS. 28–30 is also equipped with a pair of drop bins 40a, a pair of transverse debris removing conveyors 115, and eight potato selector and stone eliminator units 60, as previously described.

In the modifications shown in FIGS. 28–30, each T-shaped bar 17 supports a pair of inverted V-shaped floor forming members 136a, each presenting an inclined floor forming leg 136a' which is somewhat wider than the inclined floor forming leg 136' previously described, and has a width sufficient to extend under substantially the entire length of the downwardly inclined paddle arm sections 23b' as shown in FIG. 30. These inclined floor forming legs 136a' in conjunction with the adjacent spinner rolls 126a provide support for the potatoes and stones as advanced by the row of advancing paddles 23b positioned directly thereabove, and are sufficiently inclined to cause a tumbling movement of the potatoes and stones as supported thereon and as advanced in an upwardly inclined direction superimposed by the row of advancing paddles 23b.

A single spinner roll 126a is positioned adjacent the outer edge of each row of advancing paddles 23b, and spaced sufficiently therefrom to leave a gap which is one-half inch to about one inch in width between its periphery and the adjacent side edge of the inclined floor forming leg 136a' of the adjacent inverted V-shaped member 136a. Each spinning roll 126a is covered with rubber or like gripping material, and may be made approximately three to five inches in diameter, with a preferred diameter of approximately four inches. The supporting shaft 126' of each spinning roll 126a is positioned in approximately the same inclined plane as the side edge of the adjacent inclined floor forming leg 136a', and is rotated in the direction indicated in FIG. 30. The supporting shaft 126' of each spinner roll 126a is supported by a suitable journal attached to the upper transverse bearing plate 37 as shown in FIG. 26, with the upper end of the shaft 126' provided with a driving sprocket 129 driven by a drive chain 129' as previously described. The lower end of the supporting shaft 126' of each spinner roll 126a is journaled in the lower bearing plate 38.

Since no tumbling rolls are used in this modification, the lower end of the spinner roll shaft 126' does not require a driving gear to provide a drive for an adjacent tumbling roll. It will also be noted that the modification shown in FIG. 30, is substantially similar to the modification shown in FIG. 31 when the tumbling rolls 125 are eliminated from the modification shown in FIG. 31.

Each spinner roll 126a as shown in FIGS. 28–30 may be provided with means for removing the remaining vines, as by the provision of a floating roll 47 in riding contact therewith, and whose roll shaft 47' is suspended from the transverse bars 56–56' by suspension struts 57 as previously described. Alternatively, each spinning roll 126a may be provided with a baffle plate 135, each of which is supported by a pair of suspension struts 135' extending from the overhead transverse bars 56–56' of the framework assembly. The lower edge of each baffle plate 135 is suspended in close proximity to the periphery of its spinning roll 126a, and prevents potatoes being tumbled between the spinning roll 126a and the adjacent inclined floor forming leg 136a', from hurdling the spinning roll 126a.

The potatoes and remaining stones are pulled from the floor of the drop bin 40a by the inclined advancing paddles 23b and pushed on to the lower end of the inclined floor forming leg 136a'. As the potatoes and stones are advanced by the facing section 24 of each row of advancing paddles 23b, excess potatoes and stones will tumble laterally beyond the reach of the facing sections 24 of the advancing paddles 23b, and rolled downwardly towards the drop bin 40a, to again be picked up by the advancing paddles, and so that each paddle 23b advances only a single potato or a single stone to dropping position at the upper end of its drop tube 61.

In the modifications shown in FIGS. 28–30, clinging soil is rubbed off from the potatoes and stones, and hard clods are pulverized during advance movement of the paddles 23b, so that the loosened debris sifts to ground in the space between the spinning roll 126a and the adjacent side edge of inclined floor forming leg 136a' of the angular floor member 136a.

The modification illustrated in FIGS. 22–27, the modifications illustrated in FIGS. 31 and 32 and the modification illustrated in FIGS. 28–30, are all highly effective in marshalling the potatoes and stones in single file rows, with each potato and stone advanced in columnized spaced relation for discharge into the upper ends of the respective drop tubes 61, in a manner so that the potato selector and stone eliminator units 60 will effectively operate to eliminate all remaining stones from the flow of potatoes before they reach the lower transverse conveyor 190 at the rear end of the harvester. These potato advancing and marshalling assemblies also operate to remove clinging soil from the potatoes and stones during their upwardly inclined advance to the drop tubes 61, so that a clean potato product is assured, notwithstanding damp or wet digging conditions and clinging types of soil. Where vines have been substantially destroyed by chemical and/or mechanical treatment prior to harvesting, the primary deviner 1, together with the transverse sod removing conveyors 115, may be amply sufficient to insure removal of all vegetable debris from the potato stream. However, where the vines and vegetable growth is so abundant or tenacious that all of such vegetable debris cannot be effectively removed by the primary deviners 1 and sod removing conveyors 115, the spinner rolls 126 or 126a as above described may have the floating deviner rolls 47 in riding contact therewith.

*Alternative potato selector and stone eliminator units*

FIGS. 34–46 illustrate an alternative form of potato selector and stone eliminator device which may be used in substitution for the potato selector and stone eliminator unit illustrated in FIGS. 6, 6a and 21 and heretofore described. As illustrated more particularly in FIG. 36, an alternative potato selector and stone eliminator device is positioned adjacent the upper run of each column of potato and stone advancing paddles and adjacent the upper end of the associated marshalling rolls 125 and 126, and embraces mechanism operative to deflect the stones and potatoes in different directions as they arrive in columnized order at the upper end of the marshalling rolls, and thus effectively separate the stones and clods from potatoes at this point. The alternative potato selector and stone eliminator devices may be positioned at the upper end of any one of the potato advancing and marshalling assemblies shown in FIGS. 22 through 32 and previously described, but for the purpose of illustration, is shown in FIG. 36 as associated with the potato advancing and marshalling assembly of the type illustrated in FIGS. 26 and 27.

The potato advancing and marshalling assembly as shown in FIGS. 34, 35 and 36 may comprise a series of four continuous advancing chains 20a composed of links 21 as heretofore described. The lower end of each advancing chain 20a is trained over sprocket 34 rotatably mounted on a stationary idler shaft 34' as shown in FIG. 26. The upper end of each continuous advancing chain 20a is trained over a sprocket 35a as shown in FIG. 36, and all four upper sprockets 35a are fixed to a common driven shaft 35′ which has a drive sprocket 36 fixed to one end thereof and driven by chain 36′ from the main transverse shaft 188 of the harvester. Each sprocket 35a is connected to shaft 35′ by a grooved or toothed slip clutch 35b which is equipped with laterally extending lugs 35c as shown in FIG. 36, and which are designed to slip into appropriate sockets formed in the side wall of the adjacent sprocket 35a to thereby drive the sprocket, but which will slip out of the sockets when an undue load strain is placed on the sprocket 35a by the marshalling chain 20a.

The upper run of each advancing chain 20a is supported by the T-shaped bar 17 as shown in FIG. 36, whose upper end is supported by block 18 fixed to the cross bar 18′ of the harvester, and whose lower end is supported by a cross plate 38 associated with the framework of the harvester, as shown in FIGS. 26 and 36. An inverted T-shaped deflector 19 having lateral legs 19′ and a vertical leg 19″ is suspended over the upper run of each advancing chain 20a. The upper end of the T-shaped deflector 19 is secured to the transverse support plate 37 of the harvester as shown in FIGS. 40 and 45, and its lower end is secured to the rear wall 42a of the receiving bin 40a, as shown in FIG. 25. The vertical leg 19″ of the T-shaped deflector 19 terminates short of the advanced edge of the bin floor 44a as shown in FIG. 36, and the remaining lateral legs 19′ thereof are contoured to form a part of the floor of the bin 40a as heretofore explained. The bin 40a for this modification is constructed as shown in FIGS. 22, 23, 25 and 28 and previously described.

The sensing unit 100 of each alternative selector device is positioned at the upper end of each tumbling roll 125. Since each sensing device is influenced by any electrical conductive object passing thereover, the columnized advancing paddles passing thereover, and extending laterally from the opposite sides of each advancing chain 20a, should be made of non-conductive material such as nylon or like plastic. As shown in FIG. 38, each advancing paddle 23c is composed of a non-conductive laterally extending arm 23c′ suitably fixed to the adjacentz link 21 of the chain 20a as by bolts or rivets, and its advancing face 23c″ supports a soft and non-conductive advancing plate 24 made from rubber or the like. The laterally extending advancing paddles 23c travel through holes 42b in the rear wall 42a of the collecting bin 40a, as shown in FIG. 25, and push out the potatoes and stones forwardly from the bottom wall 44a and 42b of the bin, a fragment of which is shown in FIG. 36. In the event any advancing paddle 23c of the columnized paddles associated with the marshalling chain 20a, is blocked in its advance by a stone or other obstruction, the lugs 35c of the slip clutch 35b will slip from the sockets of the sprockets 35a, but will remesh with the sprocket when the paddle jamming has been cleared. The sprocket engaging lugs 35c of the slip clutch 35b are so spaced as to drive the marshalling chain 20a and associated paddles 23c in advancing synchronism with the rotative movement of the deflecting paddles 140′ of the adjacent potato selector and stone eliminator unit as hereafter described.

As shown in FIGS. 34 and 36, a set of marshalling rolls comprising a tumbling roll 125 and a spinning roll 126 positioned at slightly higher elevation, are associated with each column of advancing paddles 23c. The tumbling roll 125 and the associating spinning roll 126 are covered with resilient and non-conductive material such as rubber. The lower end of the shaft 126′ which supports the spinning roll 126 and the lower end of the shaft 125′ which supports the tumbling roll 125, are suitably journaled in the lower cross plate 38 of the harvester framework as shown in FIG. 36. The tumbling roll shaft 125′ and the spinning roll shaft 126′ are driven in unison by a gear 132 fixed to the tumbling roll shaft 125′ and a gear 134 fixed to the spinning roll shaft 126′, joined together in driving assembly by an idler gear 133. Each spinner roll shaft 126′ has an end extension 126″ which extends through and is supported by a journal associated with a secondary cross plate 39 forming a part of the harvester framework. A driving sprocket 39′ is secured to each spinner roll shaft extension 126″; the sprockets 39′ being driven by a drive chain 39″ which may be driven by any suitable connection to the harvester driving assembly.

The upper end of each tumbling roll shaft 125′ is supported by a suitable journal 125″ fixed to one leg of a U-shaped bracket 138 supported by the angular cross bar 18′ of the harvester framework, as shown more particularly in FIGS. 40 and 41. Each U-shaped bracket 138 also supports the sensing unit 100 which contains the sensing circuit as shown in FIGS. 43 or 44 as hereafter described. The upper end of each spinner roll shaft 126′ is supported by a suitable journal fixed to a support bracket 139 which seats on and is secured to the angular cross bar 18′ of the harvester framework as shown in FIG. 39. The potatoes and stones removed from the collecting bin 40a by the non-conductive advancing paddles 23c are advanced thereby in columnized order along the adjacent tumbling roll 125 and spinner roll 126, so that each columnized advancing paddle 23c will forward advance only a single potato or stone over the upper arcuate surface of the sensing unit 100 positioned at the upper end of each tumbling roll 125.

The sensing circuit of each sensing unit 100 is contained within a box-like structure as shown in FIGS. 41 and 42 having a lower box part 101 made of metal or like conductive material, and having a cover part 101′ made of non-conductive material and which is arcuately shaped in contour conformity with the upper arcuate face of the tumbling roll 125 with which it is associated. It will thus be appreciated that the individually spaced and columnized stones or potatoes as shown in FIG. 42, are separately advanced by the successive advancing paddles 23c directly over and in contact with the non-conductive arcuate cover part 101′ of the box which contains the sensing circuit, and which functions to control the operation of a magnetic clutch and brake device 85 as shown in FIGS. 36 and 37. As shown in FIGS. 36, 39 and 41, the upper end of the arcuate covered part 101′ merges into a contoured drop nose 102 preferably made of non-conductive material, and which may be molded to present a quarter-sphere surface over which objects as advanced by the paddles 23c may drop. The contoured drop nose 102 is fixed to the adjacent leg of the channel shaped bracket 138 which supports the sensing unit 100.

Each magnetic clutch and brake device 85 operates to rotate an object deflecting paddle wheel 140 which is positioned adjacent the upper end of each spinning roll 126, and when rotated through a prescribed arc, operates to deflect either the advanced potato or stone into an adjacent receiving chute 142, as the sensing circuit may indicate. To prevent the columnized potatoes or stones from hurdling the spinner roll 126, a guide plate 135 as shown in FIG. 36 may be supported over each spinning roll 126 by the upwardly projecting struts 135′ of the harvester framework. The upper end of the deflecting plate 135 has an inwardly curved end 135″ as shown in FIG. 36, to baffle any jumping movement of the spaced and columnized potatoes and stones, and to direct them into sensing relation to the non-conductive arcuate cover 101′ of the sensing unit 100.

The object deflecting paddle wheel 140, as shown in FIGS. 34, 36, 39 and 40, is composed of two or more radial extending blades 140′ fixed to a paddle wheel shaft 141. The projecting end 141′ of the paddle wheel shaft 141 is supported in a bearing block 141″ which is fixed to the angular shaped transverse framing bar 56' of the harvester, as shown in FIG. 40. The paddle wheel shaft 141 is so positoned and oriented that the paddles 140' associated therewith will successively sweep across the drop nose 102 adjacent to the sensing unit 100, at a tilted angle with respect to the cushioning faces 24 of the advancing paddles as shown in FIGS. 36 and 38, when the paddle wheel shaft 141 is rotated.

The mouth end of each receiving chute 142 is positioned directly adjacent the upper end of each spinning roll 126, as shown in FIGS. 34, 35, 36, 39 and 40, and is designed to receive the potatoes which are deflected into the mouth thereof by the deflecting paddles 140'. The receiving chute 142 is shaped in the form of a tube of rectangular cross-section, and presents a side wall 142' which is directly adjacent the arcuate cover part 101' of the sensing unit 100. The upper end of the side wall 142' has a rectangular port opening 142a whose width is only slightly greater than the width of the deflecting paddle 140'. The clutch and brake device 85 which drives the paddle wheel shaft 141, is so constructed and operated as to normally maintain one of the paddles 140' of the paddle wheel 140 in position to substantially close the port opening 142a of the receiving chute 142, and thus block the entry of objects into the mouth end of the receiving chute. However, when the clutch and brake device 85 is energized to rotate the paddle wheel shaft 141 through an angular segment corresponding to the number of the deflecting paddles 140' which constitute the paddle wheel 140, the deflecting paddle blocking the opening 142a will be swung inwardly across the mouth of the chute 142, and the next succeeding deflecting paddle 140' will sweep across the drop nose 102 adjacent the sensing unit 100 and come to rest in a position to block the entry port 142a.

In addition to the side wall 142' which has the port opening 142a at the upper end thereof, each potato receiving chute 142 also presents additional side walls 142" whose upper ends extend substantially above the adjacent spinning roll 126 as shown in FIG. 40, and join with the sidewall 142' to provide a chute of rectangular cross section which is bent around the sprocket shaft 35' or other obstructions and terminates directly above the transverse potato conveyor 190. Where potatoes are to be deflected into the chute 142, the interior of the chute may be provided with resilient rubber cushioning and deflecting baffles 143 and 143' as shown in FIG. 40, and which are secured to the side walls 142' and 142" of the chute, and which serve to cushion the fall of the potatoes dropping onto the transverse conveyor 190.

In the structure shown in FIGS. 34 and 35, a total of eight spinning rolls 126 are employed, with two of the spinning rolls 126 positioned adjacent the opposite longitudinal frame members 11–11' of the harvester framework, and with the remaining spinning rolls 126 arranged in pairs therebetween. A total of five receiving chutes 142 are required (two of which are positioned adjacent the longitudinal side frame members 11–11'. The other three receiving chutes 142 may be duplex chutes positioned at the ends of the adjacently paired spinning rolls 126. Each duplex receiving chute 142 would present opposite side walls 142' each having a port opening 142a at the mouth end thereof, and its mouth end would be divided into two compartments by a rubber cushioning baffle 144 as shown in FIGS. 34 and 39, which serves to prevent an object deflected by the paddles 140' at one port hole 142a from being thrown through the opposite port hole 142a of the duplex receiving chute. Each vertically extending rubber baffle 144 may be fixedly suspended from a suitable suspension bar 144' secured to the angular cross frame members 56' of the harvester.

In the modifications shown in FIGS. 39 and 40, the potatoes are deflected by the deflecting paddle wheel 140 into the offside receiving chutes 142. The stones and sod which are not deflected, roll off the drop nose 102 and drop downwardly to ground. The stones, sod and other debris fall onto an inclined cover plate 145, extending over the transverse conveyor 190 as shown in FIG. 40, and thence deflected to ground and away from the transverse conveyor 190. The inclined cover plate 145 may be supported at the lower end thereof by the side wall 190' of the transverse conveyor 190, and its upper end may be secured to vertically extending straps 145' which are fixed to the lower transverse frame member 12' of the marshalling framework. Each of the potato receiving chutes 142 extends through a conforming hole in the inclined cover plate 145 as shown in FIG. 40 and conducts the potatoes contained therein directly to the transverse conveyor 190.

Where the potato crop as harvested, yields a relatively minor number of stones and sods to be separated from the potatoes by the potato selector and stone eliminator devices, it may be advantageous to manipulate the deflecting paddle wheel 140 to deflect the stones and sods into the adjacent receiving chutes 142, and to permit the potatoes to roll off the drop nose 102 at the end of the tumbling roll 125. To provide for such operation, it is necessary to provide a potato receiving chute 146 forwardly of each drop nose 102 to conduct the potatoes to the transverse conveyor 190, as shown in FIGS. 45 and 46. While the magnetic clutch and brake unit 85 which drives the paddle wheel 140 remains the same in both cases, a slight modification to the circuit system as shown in FIG. 44 and hereafter described, is required, and which is operative to manipulate the deflecting paddle wheel 140 to deflect stones and sod into the side receiving chute 142, and block the entry of potatoes into the receiving chute 142 and direct the selected potatoes across the drop nose 102.

Where the stones and sod are to be deflected into the side receiving chute 142, one of the deflecting blades 140' of the deflecting paddle wheel 140 is held stationary to block the port opening 142a therein when a potato moves across the arcuate cover 101' of the sensing unit 100. However, when a stone or sod is moved over the arcuate cover 101' of the sensing unit 100, the deflecting paddle 140' which blocks the port entry 142a, is swung inwardly across the mouth of the chute 142, and the next succeeding deflecting paddle 140' is swung across the drop nose 102 adjacent the sensing unit to push the sod or stone into the receiving chute 142, and then come to rest in port blocking position.

Where the stones and sod are to be deflected laterally into the offside receiving chute 142, each receiving chute 142 may be constructed as previously described, except that the lower end thereof terminates directly below the transverse sprocket shaft 35' so that the stones and sod will drop onto the inclined cover plate 145, and thence slide off therefrom to ground. To conduct the selected potatoes which fall off the drop nose 102 onto the transverse conveyor 190, a potato receiving chute 146 is positioned in advance of each drop nose 102. Each potato receiving chute 146 presents a pair of side plates 146', joined to a rear wall plate 146" which together provide a U-shaped enclosure which extends through the inclined cover plate 145 as shown in FIG. 45. The rear wall plate 146" may be secured to and supported by plate 37 of the marshalling framework, as shown in FIG. 45. A front plate 147 as shown in FIG. 45 completes the potato chute 146, the front plate 147 having openings 147' cut therein for the passage of the lower reach of the adjacent potato marshalling chain 20a and associated paddles 23c therethrough. Each potato receiving chute 146 may be provided with a series of soft rubber baffles 148 and 148' suitably arranged to baffle the fall of potatoes falling from the drop nose 102 onto the transverse conveyor 190.

A magnetic clutch and brake device 85 is operatively connected to the shaft 141' of each deflecting paddle wheel 140 and functions to intermittently rotate the paddle wheel 140 in successive stages under the control of the sensing unit 100. Each clutch and brake device 85 is contained within a non-magnetic tubular housing 85' which may be fixedly secured against rotation to the adjacent transverse framing plate 37 of the harvester as shown in FIG. 34.

As shown in FIGS. 34–37, each clutch and brake device 85 includes a cylindrical drive cup 86 formed of magnetic material and designed to rotate within the stationary tubular casing 85', and has a mechanically oscillated shaft 86' extending from the bottom wall thereof. The drive cup shaft 86' extends through the transverse frame plate 37 of the harvester and is rotatably journaled thereon. The clutch and brake device 85 also includes a clutch rotor 88 formed of magnetic material, and has a clutch shaft 88' extending therefrom which is connected as by a universal joint 141''' to the adjacent end of the paddle wheel shaft 141', as shown more particularly in FIGS. 36 and 40. The clutch rotor 88 is provided with a series of radially extending lug segments 88'' whose outer ends have an end area corresponding to the inner face area of lug sections 86'' extending from the drive cup 86. The lug segments 88'' correspond in number and spacing to the number and angular spacing of the deflecting paddles 140' associated with the paddle wheel 140, and fit within the inner circumference defined by the corresponding lug sections 86'' of the drive cup 86. Thus, when the drive cup 86 is magnetized and mechanically oscillated, the lug sections 86'' thereof will grip the lug segments 88'' of the clutch rotor 88 to thereby correspondingly rotate the clutch rotor 88 and the paddle wheel 140.

As shown in FIGS. 36 and 37, the drive cup 86 contains a magnetic clutch coil 87 wound on a spool 87'' which is placed on a magnetic core 87'. The magnetic clutch core 87' may be formed as an integral part of the bottom wall of the drive cup 86 and oscillates therewith. The lead wires from the clutch coil 87 may be connected to external slip rings 87''' which encircle the drive cup shaft 86'. The slip rings 87''' are connected to direct current input lines whose current flow is controlled by the sensing unit 100 as hereafter described. When the clutch coil 87 contained in the mechanically oscillated drive cup 86 is energized, the drive cup lug sections 86'' will grip the corresponding lug segments 88'' of the rotor 88 to rotate the rotor 88 and paddle wheel 140 in one direction only and in successive stages.

The clutch cup 86 is continuously oscillated clockwise and counter-clockwise through a prescribed angle by mechanical means hereafter described. The angular extent of these oscillations is determined by the number of deflecting paddles 140' associated with the deflecting paddle wheel, and where the paddle wheel 140 is equipped with four deflecting paddles 140' as shown in FIG. 36, the drive cup 86 will be oscillated back and forth through an angle of ninety degrees. The magnetic clutch coil 87 is energized and de-energized in accordance with the controlled impulses received from the sensing unit 100, and when the drive cup 86 is thereby magnetized during one cycle of oscillation, it will operate to rotate the deflecting paddle wheel 140 through an angle of ninety degrees, with resultant sweep of one of its deflecting paddles 140' across the drop nose 102 adjacent to the sensing unit 100 and into fixed residence position at the port opening 142a of the chute 142, and thus block the entry of objects into the chute 142.

To rigidly maintain one of the deflecting paddles 140' in port blocking position so that the object advanced by the pusher paddle 24 is not deflected but is pushed onto the drop nose 102, a magnetic brake coil 89 is telescoped over the clutch shaft 88', as shown more particularly in FIGS. 36 and 37. The magnetic brake coil 89 has a magnetic core 89' in which the clutch shaft 88' freely rotates. The brake coil 89 is contained within a brake cup having a bottom wall 89'' and a cylindrical body wall 89'''. The magnetic core 89' may be formed integral with the bottom wall 89'' of the brake cup, and the brake cup and the magnetic brake coil 89 contained therein is held against rotation as by screws which secure the end wall of the fixed tubular casing 85 to the bottom wall 89'' of the brake cup. When the brake coil 89 is energized, a braking effect is exerted on the clutch shaft 88' which operates to lock the deflecting paddle wheel 140 against rotation, and maintains one of its deflecting paddles 140' in position to block the adjacent port hole 142a of the chute 142.

The clutch coil 87 contained in the drive cup 86, and the brake coil 89 contained in the surrounding brake cup wall 89''', are alternately energized and de-energized under the control of the sensing unit 100, so that when the mechanically oscillated drive cup 86 is coupled to the clutch rotor 88 by the energization of its clutch coil 87, the four bladed paddle wheel 140 is rotated through an angle of ninety degrees; and upon de-energization of the clutch coil 87 and simultaneous energization of the brake coil 89, the brake wall 89'' will magnetically lock to the rotor lugs 88'' and thus lock the deflecting paddle wheel 140 against further rotative movement.

As shown in FIGS. 34 and 36, the drive cup 86 is mechanically oscillated through a drive system which may be directly connected to the sprocket shaft 35' by means of which the marshalling chain sprockets 35a are driven through the slip clutch 35b. The driven sprocket shaft 35' has a beveled gear 90 fixed thereto which meshes with the companion bevel gear 90' fixed to a relatively short longitudinally extending shaft 91 having a driven gear 91' fixed thereto. The short shaft 91 is supported by a suitable bracket or gear box 91'' fixed to the adjacent side frame member 11 of the marshalling frame as shown in FIG. 35. A transfer gear 92 supported by suitable stub shaft 92' meshes with the driven gear 91' and with a driven gear 93 fixed to a secondary shaft 93'. One end of the secondary shaft 93' is fixed to a cam arm 94 which has a camming stud 94' projecting therefrom. The cam stud 94' is designed to extend into a vertical slot 94'' formed in the enlarged head section 95' of a horizontally reciprocating bar 95 extends across the rear end of the harvester as shown in FIGS. 34 and 35, and is supported by suitable guide blocks 95'' fixed to the adjacent transverse framing plate 37 of the harvester framework.

The drive cup 86 of each clutch and brake device 85 is oscillated by the reciprocating bar 95 through an angle corresponding to the angular spacing of the deflecting paddles 140' of the paddle wheel 140 driven thereby. Where the deflecting paddle wheel 140 has four radially spaced deflecting blades or paddles 140', spaced ninety degrees apart, as shown in FIGS. 34, 39, 40, and 45, the driving cup 86 would be oscillated through an angle of ninety degrees. It will also be noted that alternate paddle wheels 140 are segmentally rotated in the same clockwise direction to push objects into the receiving chute 142 positioned at the right side thereof, while the intermediate deflecting paddle wheels 140 are rotated in a counter-clockwise direction to deflect objects into the rear receiving chute 142 positioned on the left hand side thereof. Therefore, the driving connections between the mechanically oscillated shafts 86' of the alternate drive cups 86, and the shafts 86' of the intermediate drive cups 86, are so connected to the reciprocating bar 95 to accomplish this result.

As shown in FIGS. 34, 35 and 36, the alternate drive cups 86 which segmentally rotate the paddle wheel 140 connected thereto in a clockwise direction, present a lever arm 96 fixed to the terminal end of its drive cup shaft 86' which extends downwardly as shown at the left hand side of FIG. 36, with the lower end thereof connected by hinge pin 97 to the lower end of an upwardly inclined connecting link 98 whose upper end is pivotally connected by hinge pin 99 to the reciprocating bar 95. The shaft 86' of each intermediate driving cup 86 which rotates its paddle wheel 140 in a counter-clockwise direction as shown in the right hand side of FIG. 36, has an upwardly extending lever arm 96' fixed to its terminal end which is connected by hinge pin 97' to one end of a downwardly inclined connecting link 98' whose opposite end is connected by hinge pin 99' to the reciprocating bar 95.

The lever arms 96–96' and the connecting links 98–98' are of such length as to oscillate the respective drive cup shafts 86' through an angle of ninety degrees where four paddles 140' are associated with the paddle wheel 140. It will be appreciated that where the paddle wheel 140 is provided with only two paddle blades 140' spaced 180 degrees apart, or three paddle blades 140' spaced 120 degrees apart, the lever arms 96–96' and associated connecting links 98–98' would be correspondingly modified to oscillate the drive cups 95 and correspondingly rotate the paddle wheels 140 through 180 degree or 120 degree segments.

The speed of segmental rotation of the paddle wheels 140 is so synchronized with the advanced movement of the rubber facing plates 24 of the columnized paddles 23c so as not to interfere with the advance movement of the deflecting paddle 140' across the adjacent drop nose 102. The paddle wheel 140 is segmentally rotated with a quick movement, and so that the wheel blade 140' operating to deflect the potato, is progressively swept across the face of the rearwardly inclined resilient facing section 24 of the advancing paddles 23c the moment the advancing paddle has positioned the object adjacent the inner end of the drop nose 102. Striking contact between the wheel blade 140' engaged in deflecting the object, and the paddle face section 24 of the adjacent advancing paddle 23c, is avoided by the rearward inclination of the paddle facing section 24 and the tilted position of the paddle wheel shaft 141 as illustrated in FIGS. 36 and 38.

Rotative synchronization of the paddle wheel 140 and advancing blades 23c is accomplished by proper proportional sizing of the beveled gears 90–90' and the driving and transfer gears 91', 92 and 93. This synchronization of movement is further assured by the provision of the slip clutch 35b associated with each chain driving sprocket 35a which operates to advance the advancing paddles 23c in synchronization with the segmental rotation of the paddle wheels 140. It will be noted that the slip clutch 35b is free to slip in the event any jamming of one of the columnized advancing paddles 23c should occur, but whose sprocket driving lugs 35c are angularly spaced in conformity with the lineal spacing of the advancing paddles 23c.

The marshalling assembly illustrated in FIG. 36 and above described, suggests horizontal advancing paddles 23c, each column of which cooperates with a tumbling roll 125 and an adjacent spinning roll 126. It will be appreciated, however, that the advancing paddles 23c formed of non-conducting material, may be inclined downwardly as well as rearwardly, as in the case of the downwardly inclined advancing paddles 23b shown in FIG. 31, and wherein the tumbling roll 125 and associated spinning roll 126 would be adjusted in elevation as shown in FIG. 31. In this modification, the sensing unit 100 and associated drop nose 102 would be positioned at the upper end of each depressed tumbling roll 125 as heretofore explained, and without change in the driving or manipulating mechanisms shown in FIG. 36.

It will be appreciated also that the advancing paddles 23c shown in FIG. 36 may be bent downwardly and rearwardly to correspond with the advancing paddles 23b shown in FIG. 32, and employing only a tumbling roll 125a associated with the downwardly inclined column of advancing paddles 23c. In this modification, the sensing unit 100 and associated drop nose 102 would be positioned at the upper end of the tumbling roll 125a as heretofore explained, without material change in the driving and manipulating mechanisms shown in FIG. 36.

As a further alternative, the columnized advancing paddles 23c shown in FIG. 36 may also be downwardly as well as rearwardly inclined as shown in FIG. 30, and use only a spinner roll 126a associated with each column of downwardly inclined advancing paddles 23c. In this modification, the sensing unit would have a sloped cover in conformity with the slope of the inclined leg 136a' of the V-shaped member 136a over which the objects are driven by the downwardly sloped advancing paddles 23c, and with a drop nose 102 extending therefrom. In this modification, using only a spinning roll 126a with each column of downwardly inclined paddles 23c, the spinning roll 126a would be driven from the lower end thereof as indicated in FIG. 36.

It is thus evident that various arrangements of tumbling rolls 125 or 125a and/or spinning rolls 126 or 126a, and/or inclined tumbling plates 136 or 136a may be provided in association with a sensing unit 100 and drop nose 102 positioned at the upper end of one of the rolls or tumbling plates, and that the non-conductive advancing paddles 23c may be downwardly inclined in accordance with the requirements of these modifications and within the purview of this invention.

*Electronic circuit for alternate potato sensing devices*

The circuit shown in FIG. 43 is designed to segmentally rotate the paddle deflecting wheel 140 through an angle of ninety degrees, when a potato has been advanced over the cover part 101' of the sensing unit 100, to thereby deflect the potato laterally into the receiving chute 142, and then lock one of the paddle wheel blades 140' in position to block the port opening 142a and prevent the entry of any stone or clod into the chute 142, but nevertheless permit the stone or clod to complete its journey across the drop nose 102 to ground.

The sensing unit positioned adjacent the upper end of the tumbling roll 125, or tumbling roll 125a, or spinner roll 126a, or inclined leg 136' of the floor member 136, as previously described, contains a sensing circuit A, an amplifying circuit B and a switching circuit C as diagrammatically indicated in FIG. 43, and which are connected in circuit with each other. The switching circuit C is also electrically connected to the clutch coil 87 and brake coil 89 of the magnetic clutch and brake device 85, and is also connected to a cam switch assembly associated with the clutch shaft 88' of the clutch and break device 85. Direct current, under control of the switching circuit C may be supplied to the clutch coil 87 and break coil 89 by a storage battery 110 of relatively low voltage such as approximately forty-five volts. This required voltage may be obtained from a dynamotor which steps up the six volt current supplied to it by the tractor engine battery, to approximately forty-five volts.

The sensing unit 100 has a cover part 101' whose outer surface forms a substantially uninterrupted continuation of the upper end of the tumbling roll 125, or tumbling roll 125a, or spinning roll 126 or spinning roll 126a, or inclined lower leg 136' of the floor member 136, so that the objects to be classified make smooth transition across the outer surface of the cover part 101' of the sensing unit 100. As previously explained, the cover part 101' of the sensing unit 100 is formed of non-conducting material such as "Teflon," to insure proper operation of the sensing unit. The sensing unit 100 may contain two or more partitions or non-conducting plates 103 as shown in FIG. 41 on which the elements and components of the sensing circuit A, amplifying circuit B and switching circuit C may be conveniently mounted.

The sensing unit 100 also contains a pair of spaced condenser plates 104 which are positioned directly adjacent the inner face of the cover part 101' of the sensing unit, as shown more particularly in FIGS. 41 and 42, and which are desirably contoured in conformity with the inner surface of the cover part 101'. The spaced condenser plates 104 provide the capacitor portion of a tuned oscillator tank circuit which comprises the combination of an inductance coil L1 which may be of miniature size and a capacitor C1 as represented by the condenser plates 104. The spaced condenser plates 104 provide an equivalent for the capacitor C1 of the circuit illustrated in FIG. 21 and heretofore described, and are similarly connected as by lead wires 80'' to the coil terminals 80—80' of the tank circuit inductance coil L1. The sensing circuit A, amplifying circuit B and switching circuit C of the control circuit illustrated in FIG. 43, is substantially identical and equivalent to the corresponding circuits A, B and C associated with the control circuit shown in FIG. 21 and heretofore described.

The clutch and brake device 85 as previously described may be the operating equivalent of the magnetic clutch and brake device illustrated in FIG. 21 and previously described, except that the magnetic clutch and brake device shown in FIG. 21 operates through magnetic fluid, whereas the clutch and brake device 85 shown in FIG. 43 is a salient pole type of clutch and brake. As a further modification, the salent pole clutch and brake device shown in FIG. 43 is equipped with a switch operating cam 105 fixed to the clutch shaft 88' which presents two or more equally spaced and radially extending cam lugs 105', equal in number to the paddle blades 140' associated with the deflecting paddle wheel 140. The cam lugs 105' are designed to manipulate the cam plate 105'' during segmental rotation of the switch operating cam 105, to thereby make and break contact with a contact point 105'''.

The slip ring 87''' mounted on the mechanically oscillated shaft 86' of the drive cup 86 are connected to the terminals of the clutch coil 87 and to lead lines 82 and 82' respectively which supply direct current to the clutch coil 87. One of the lead wires 83 to the brake coil 89 shown in FIG. 43 may be connected to a common lead wire 112 to which the clutch lead wire 82 is joined. The other lead 83' from the brake coil 89, as well as the clutch lead line 82', and common clutch and brake lead line 112, are all supplied with direct current from the battery 110 under the control of a flip-flop switch forming a part of the switching circuit C. The direct current leads 82-82' and 83-83' and the contact leads 84-84' are also connected to the output end of the sensing and control circuits A and C, which at the input end are in circuit with the one end terminals 80-80' of the inductance coil L1 and the condenser end terminals 80'' of the plate capacitor C1, and the tap terminal 81 of the inductance coil L1.

The transistor control circuit, as shown in FIG. 43, is similar to the control circuit shown in FIG. 21, and comprises an assembly of junction transistors, capacitors, resistors and diodes of relatively miniature size connected in circuit by fine wires. The transistor circuit per se can be operated on only two to three watts of input power, and the clutch and brake device 85 controlled thereby can be operated on only approximately twenty watts of input power. The sensing oscillator circuit A for the transistor control circuit includes a tuned oscillator tank circuit comprising the combination of the plate capacitor C1 and inductance coil L1 whose end terminals 80-80' are supplied with high frequency alternating current. The sensing oscillator circuit A may be the Hartley type in which the condenser plates 104 serve as a shunt tuning capacitor C1 to provide a high Q tank circuit, tuned to a high frequency. The sensing coil terminals 80-80' are also connected to a base coupling capacitor C25 and a collector coupling capacitor C26 to provide base and collector stabilization for the oscillator and to block the D.C. voltage from the tuned tank circuit.

Collector voltage for the first oscillator transistor Q1 is supplied by the minus 45 volt supply 110 through the lead wire 111 and filter resistors R36 and R38. Filtering capacitor C27 and C30 are connected from resistors R36 and R38 to ground, to furnish additional filtering and decoupling for the collector voltage. Resistors R28 and R29 are connected in series to provide a voltage divider across the minus 45 volt supply 110, and are proportioned so that their junction with the base of the first transistor Q1 will establish the proper operating potential at the base of the transistor. In conjunction with an emitter resistor R32, the voltage divider resistors R28 and R29 operate to establish the current level for the operation of the first transistor Q1. A capacitor C28 provides a high frequency by-pass for resistor R32.

Oscillation of the circuit A of FIG. 43 is produced by collector to base coupling through the collector coupling capacitor C26, inductance coil L1 and base coupling capacitor C25. Any random voltage variation on the collector of the transistor Q1 is applied with reversed polarity to the base of transistor Q1, by transformer action of the inductance coil L1, thus creating the condition required for oscillation. The frequency of oscillation, which may be about twenty-five megacycles, will depend on the value of the tuning capacitor C1, as established by the size, shape and spacing of the condenser plates 104, as well as on the inductance of the coil L1.

The direct current flowing in resistors R30 and R31 will increase as the amplitude of the high frequency oscillation decreases. The capacitor C29 is used to by-pass the high frequency to ground, so that direct current alone will pass through resistor R30. Thus a change in the amplitude of the high frequency will cause a change in the direct current voltage drop across the tapped resistor R30.

The sensing and control circuit shown in FIG. 43 employs a tuned oscillator tank circuit comprising the combination of the coil L1 and the capacitor C1 represented by the condenser plates 104, and either the coil L1 or the capacitor C1 may be employed as the sensing element. When coil L1 is used, a conducting object passed in sensing relation thereto will produce a loading effect on the circuit by reducing the Q of the circuit. Alternatively, the presence of a conducting object adjacent the condenser plates 104 will greatly increase the capacitance between plates and produce a similar loading effect. When the condenser plates 104 are employed as the sensing element, the coil L1 may be a very small radio frequency choke coil, not visible in FIGS. 41 and 42. A somewhat larger coil L1, located in the area where condenser plates 104 are positioned, may be alternatively used as the sensing element. It is not necessary for a conducting object to pass through the sensing coil L1 to produce a loading effect on the coil, since a loading effect is also produced when a conducting object passes over a non-conductive covering extending over the coil L1.

When an electrical conductor such as a potato is passed in sensing relation to the condenser plates 104, the Q of the tank circuit comprising the inductance coil L1 and capacitor C1 is thereby lowered, resulting in a reduction in the amplitude of oscillation, and causing the collector voltage to become less negative and the collector direct current to increase. The increased collector current, which results from passage of the potato across the condenser plates 104, causes a potential change or pulse at the junction of resistors R30 and R31. After the potato has passed beyond the condenser plates 104, the oscillator circuit A returns to normal, resulting in a higher negative collector potential. The adjustable tap on resistor R30 provides a means for adjusting the amplitude of the output pulse transmitted to resistor R35.

The pulse thus created, is applied to the pulse amplifying circuit B through resistor R35 and capacitor C32 connected between the sensing oscillator circuit A and the amplifying circuit B. The junction of resistor R35 and capacitor C32 is connected to a feed-back resistor R39. Capacitor C32 is also connected to the base of a second transistor Q2 and a resistor R34. The collector voltage for the second transistor Q2 is supplied from the minus 45 volt supply 110 by lead wire 111 through the filter combination of resistor R38 and capacitor C30. The operating point of transistor Q2 is determined by the combination of resistors R34, R41, R42 in conjunction with third transistor Q3 and resistors R37 and R40. The direct current feed-back through resistor R34 stabilizes the direct current operating point of the second transistor Q2. The resistor R33 in the emitter circuit of second transistor Q2 further stabilizes the direct current operating point of this stage of amplification, by direct current degeneration. A capacitor C31 connected in parallel with resistor R33 serves to adjust the amount of alternating current degeneration in the emitter circuit of second transistor Q2. The current pulse applied to the base of second transistor Q2 through capacitor C32 is amplified by the combination of second transistor Q2, capacitor C31 and resistors R33 and R37. The output voltage pulse across resistor R37 is coupled directly to the base of the third transistor Q3. A by-pass capacitor C33 by-passes the unwanted higher frequencies to ground.

The third transistor Q3 and resistors R40, R41, R42 and capacitor C34 provide provide the second stage of amplification. The pulse at the base of the third transistor Q3 causes an amplified current to flow through the resistor R40 which is located in the collector circuit of the third transistor Q3. Resistors R41 and R42 stabilize the direct current operation of transistor Q3 by direct current degeneration while capacitor C34 adjusts the alternating current degeneration. The collector voltage is obtained from the minus 45 volt supply 110 through lead wire 111. The signal pulse appearing across resistor R40 is directly coupled to the base of a fourth transistor Q4. A by-pass capacitor C35 by-passes the unwanted higher frequencies to ground.

The signal pulse is further amplified by the combination of the fourth transistor Q4, resistors R43 and R44 and capacitor C36. Resistor R43 stabilizes the direct current operation of transistor Q4 by direct current degeneration, and condenser C36 adjusts the alternating current degeneration. The pulse at the base of the fourth transistor Q4 causes an amplified current to flow through resistor R44. Resistor R39 and capacitor C37 combine to feed-back a portion of the output pulse to the base of the second transistor Q2 through capacitor C32. The feed-back reduces the amplification and stabilizes the operation of the amplifier circuit B and makes it substantially independent of changes in transistor gain.

The amplified pulse that appears at the junction of capacitor C38 and resistor R54 is a negative pulse which passes through the diode D3 to the base of a fifth transistor Q5. The diode D3 serves to prevent any positive pulse from reaching the base of transistor Q5 by diverting it to ground through resistor R54. The fifth and sixth transistors Q5 and Q6 and the resistors R45, R46, R47, R48, R49, R50, R51 and R57 are connected in the switching circuit C known as a flip-flop. This circuit is employed to control the power transistors Q7 and Q8, which in turn switch energizing current to either the clutch coil 87 or the brake coil 89. When the fifth transistor Q5 is in the "Off" or non-conducting state, and the sixth transistor Q6 is "On" or conducting, then the junction of resistor R57, the emitter of transistor Q6, and the base of the power transistor Q8 are at a high negative potential, whereas the junction of resistor R46, the emitter of the transistor Q5, and the base of the power transistor Q7, are at a low negative potential. When the base of transistor Q8 is at a high negative potential this transistor Q8 is in the full "On" position, and current flows from ground through resistor R53, transistor Q8, lead wire 83', and the brake coil 89 and returns to the minus side of the storage battery 110 through lead wire 83 and the common negative lead wire 112. At the same time, the base of power transistor Q7 is at a low negative notential, and the voltage drop across resistor R53 raises the potential of the emitter of power transistor Q7 to a higher negative value than its base, so that transistor Q7 is non-conducting and will not send current through the clutch coil 87.

When a negative pulse appears at the capacitor C38, it passes through diode D3 to the junction of resistors R45, R47, and the base of transistor Q5, and then switches transistor Q5 to the "On" position. The resulting current which flows from ground through resistor R46, transistor Q5 and resistor R48 will cause a negative voltage drop at the junction of resistors R48 and R50, and the collector of transistor Q5, which voltage drop is applied through resistor R50 to thereby switch the transistor Q6 to the "Off" position. When the transistor Q6 is in the "Off" position, there is little current flow through the emitter resistor R57 and it is at a low negative voltage, and since the base of power transistor Q8 is connected by lead wire 114 to the emitter of transistor Q6, power transistor Q8 will also be switched to "Off" position, and will stop current flow through the brake coil 89 and the brake of the magnetic clutch and brake device 85 is released. A high negative potential is simultaneously produced at the junction of resistor R46 and at the emitter of transistor Q5 when transistor Q5 is switched on. This junction is connected by lead wire 113 to the base of power transistor Q7, so that thereby the power transistor Q7 is switched on and current flows through resistor R53, transistor Q7, lead wire 82', clutch coil 87, lead wire 82 and the common negative lead wire 112.

When the clutch coil 87 is energized, the clutch shaft 88' of the clutch and brake device 85 is rotated until the switch cam 105 closes the switch element 105'''. Capacitor C40, which is normally charged through resistor R52 to the full voltage of the battery 110, will now partially discharge through resistor R56, lead wires 84–84', and switch element 105''', causing a rise in negative potential. This rise in negative potential at the junction of resistors R52 and R56 and capacitors C39 and C40, is conducted through diode D4 to the junction of resistors R50 and R51 and the base of transistor Q6. This negative pulse switches transistor Q6 to the "On" state, and this action in turn switches transistor Q5 to the "Off" state, and transistors Q7 and Q8 exchange conducting states, as explained above, so that the clutch coil 87 is de-energized and the brake coil 89 is energized. The positive pulse which appears when the switch element 105''' opens, is blocked by diode D4 and conducted to ground through resistor R55, and will therefore have no effect on the circuit operation.

The diodes D1 and D2 are respectively connected across clutch coil 87 and brake coil 89, and protect transistor Q7 and Q8 from reverse voltage surges caused by the collapse of the inductive fields in the clutch coil 87 and the brake coil 89.

A transistor circuit as illustrated in FIG. 43 and above described, is provided for each clutch and brake device 85, except that a common power source 110 may be provided for all of the individual transistor circuits. While a storage battery source of power as indicated in FIG. 43 can be used, it is more convenient to produce the circuit power by means of a dynamotor or other voltage converter capable of delivering approximately forty-five volts when driven by the usual automotive storage battery of the combustion engine 160. When powering the transistor circuits by means of a dynamotor, the dynamotor would be supplied with six volts from a conventional storage battery and generator arrangement driven by the combustion engine 160. Each transistor circuit and associated clutch and brake device 85 requires approximately only twenty watts of electrical power.

Each of the transistor circuits may be fully contained and sealed within the box part 101 and cover part 101' of the sensing unit 100, and since the transistor circuit is adapted for compact assembly, its sealed housing 101–101' may be made relatively small in size. By the use of the salient pole type of clutch and brake device 85, which can also be compacted in a small space, their housings 85' can also be made relatively small and compact in size. Thus by the use of compactly sized transistor circuits and compactly sized salient pole type clutch and brake device 85, the instrument containing electronic control housings 101–101' and the clutch and brake device housing 85' can be made very compact and light in weight.

When a potato passes over the cover part 101' of the sensing unit 100, the energizing current to the brake coil 89 is cut off, and current is switched to the clutch coil 87. The de-energized brake coil 89 thus releases the clutch rotor 88 with resultant rotation of the paddle wheel 140 in synchronism with the upwardly advancing paddles 23b, to thereby push the potatoes laterally from the cover part 101 or drop nose 102 into the receiving chute 142. At the termination of the ninety degree movement, the four lobed cam 105 fixed to the clutch shaft 88' closes contact 105''' to operate the control circuit to switch current from the clutch coil 87 to the brake coil 89, which then holds the paddle wheel 140 stationary until another potato signal is received.

If a non-conducting stone or clod is advanced over the cover part 101' of the sensing unit, no signal is received, and the paddle 140 remains locked in stationary position, so that the port blocking paddle 140' directs the stone or clod to ground discharge over the drop nose 102. Any potato or stone travelling along the upper surface of the tumbling roll 125 or 125a, or the spinning roll 126 or 126a, and in contact with the barrier 135, will be pushed by the curved end 135'' of the barrier into sensing proximity to the cover part 101' of the sensing unit 100.

Synchronizing adjustments may be made so that the paddle blades 140' of the paddle wheel 140 are segmentally rotated in timed relation to the advancing movement of the marshalling paddles 23b, and so that the deflecting paddle blades 140' swing into deflecting engagement with the potato when the advancing paddle 23b has moved the potato beyond the cover part 101' of the sensing unit. As shown in FIG. 38, it will be noted that the backward slant of the advancing paddle 23b will reduce the effective rate of approach of its advancing paddle face 24 with respect to the adjacent edge of the deflecting paddle blade 140', as they continue their respective motions. Since the paddle wheel shaft 141' is set at an inclined angle with respect to the advance movement of the paddle 23b, so that the paddle wheel blades 140' have a component of motion in the direction of potato movement, constant clearance is obtained between the rotating paddle wheel blade 140' and the adjacent advancing paddle face 24.

It will also be noted by referring to FIGS. 36, 37 and 43, that the drive cup 86 of the magnetic clutch and brake device 85 is provided with four lug sections 86'' which are selectively energized by the clutch coil. The clutch cup 86 oscillates back and forth through an angle of ninety degrees in synchronism with the advance movement of each advancing paddle 23b. When the lug sections 86'' of the drive cup 86 are magnetized by the clutch coil 87, the lug sections 86'' are magnetically coupled to the lug segments 88'' of the clutch rotor 88, which is thereby segmentally rotated in one direction only. Such coupling can only take place when the lug sections 86'' and lug segments 88'' are in alignment. When the clutch coil 87 is demagnetized, the brake coil 89 is magnetized to maintain the paddle wheel 140 locked in fixed port blocking position. When the clutch coil 87 is magnetized, the brake coil 89 is demagnetized, the clutch shaft 88' and the paddle wheel shaft 141 connected thereto are rotated in one direction only. Backward tilt of the advancing paddle face 24, and the skewed position of the paddle wheel shaft 141, may be relatively adjusted so that sufficient clearance is maintained between the advancing paddle face 24 and the adjacent deflecting paddle 140' during their relative movements. Each advancing paddle 23b as shown in FIG. 38 is made of insulating material such as nylon or other tough plastic, so that it has no influence on the sensing unit 100 when passing thereover.

By making minor changes and additions to optional control switches associated with the clutch and brake device 85, positioned exterior to the sensing unit 100, the deflecting paddle wheel 140 may be operated and manipulated to deflect stones and clods into the side receiving chute 142, and to block the port opening 142a therein when a potato or like conductive object arrives in sensing position and so that the potato or like conductive object continues its travel across the drop nose 102 for discharge into the potato receiving chute 146.

The control circuit for this arrangement is illustrated in FIG. 44. This control circuit operates to energize the clutch coil 87 so that the mechanically oscillated drive cup 86 segmentally rotates the clutch rotor 88 and the clutch paddle wheel 140 as a normal condition of operation, and to thereby deflect successive objects advanced to the drop nose 102 into the side receiving chute 142, unless further controlled. This further control is provided by means for de-energizing the clutch coil 87 and energizing the brake coil 89 when a potato or like conductive object is sensed by the sensing unit 100 and arrives at the drop nose 102, and which condition results in a locking of the paddle blades 140' in a position to block the opening 142a in the side chute 142, with the result that the potato or like conductive object continues its travel across the drop nose 102 and into the product receiving chute 146. In this circuit diagram shown in FIG. 44, the same sensing unit 100 may be used as is employed in connection with the control circuit shown in FIG. 43, and contains an identically similar sensing circuit A, amplifying circuit B and switching circuit C, including the spaced condenser plates 104 connected by fine lead wires 80'' to the outer terminals 80–80' of the inductance coil L1. The same salient pole clutch and brake device 85 is also employed in both switching circuits shown in FIGS. 44 and 43.

In the circuit shown in FIG. 44, as in the circuit shown in FIG. 43, the salient pole clutch and brake device 85 of the control circuit shown in FIG. 44 presents a pair of slip rings 87''' connected to the terminal ends of its clutch coil 87, and one of its slip rings 87''' is supplied with direct curent by current line 82 connected to a common current line 112 which is connected to the negative side of the battery 110. One of the end terminals of the brake coil 89 is also connected by lead line 83 to the common lead wire 112 joined to the negative side of the battery 110.

However, in the control circuit shown in FIG. 44 the other terminal of its clutch coil 87 is connected to a lead line 82a joined to the contact point 106''' of a cam switch which includes a cam disc 106 which is fixed to the continuously driven shaft 93' or an extension thereof, as shown in FIGS. 36 and 44. The continuously rotating clutch control cam 106 has a raised track section 106' of approximately 180 degrees in length, which is designed to manipulate a switch plate 106'' into conducting contact with the contact point 106''' to which the clutch lead wire 82a is connected. The circuit is completed by a lead line 82b connected to the switch plate 106'' and which leads to the transistor Q8, which in this case serves as the clutch control transistor of the associated flip-flop switch.

As a further modification, the lead line 83' from the other terminal of the brake coil 89 is connected to a two-way current line comprising current wires 83a and 83b extending in opposite directions. Current wire 83a leads to the switch point 107''' of a brake switch, which includes a continuously rotated brake control cam disc 107 fixed to the continuously rotating shaft 93' or an extension thereof. The brake switching cam 107 also has a raised cam track 107' which is approximately 180 degrees in arcuate extent, and designed to manipulate a brake switch plate 107'' grounded as at 83c and positioned to make closed circuit contact with the brake switch point 107'''. The other part of brake current line 83b extending from brake lead line 83' leads to the transistor Q7, which then provides the brake control transistor of the flip-flop switch. It will be here noted that the continuously rotated brake cam disc 107 presents its raised track section 107' in out-of-phase relation to the raised cam track 106' of the clutch control cam 106. Thus, when the raised track section 106' of the clutch cam 106 closes the circuit between the clutch leads 82a and 82b, the brake contact point 107''' is open and the brake coil 89 is de-energized, and no braking action is exerted on the paddle wheel 140.

As a further modification, the continuously rotated shaft 93' or an extension thereof, has a switching cam 108 secured thereto which presents a raised track lug 108' on the periphery thereof, designed to move its switch plate 108'' into circuit closing contact with the switch contact point 108'''. The contact point 108''' and the contact plate 108'' are connected to lead lines 84 and 84' which lead to the switching circuit C contained in the sensing unit 100 which operates in a manner similar to the switching circuit C associated with contact point 105''' and contact plate 105 in the control circuit shown in FIG. 43. It will be noted, however, that the switch cam 108 has a contact lug 108' or relatively short arcuate length, so that current flow in lead lines 84 and 84' occurs during only a short instant during each complete rotation of the switch cam 108.

The clutch control switch comprising the continuously rotated cam disc 106 and associated contact plate 106'' and contact point 106'''; the brake control switch comprising the continuously rotated brake control cam disc 107 and its contact plate 107'', contact point 107'''; and the main control switch comprising the continuously rotating cam disc 108 and associated plate 108'' and contact point 108''', may all be grouped together in relatively small space, and contained and protected within a suitable switch housing 109 which may be conveniently mounted on one of the side frame members 11 of the marshalling assembly, as indicated in FIG. 34.

It is apparent that when the control circuit illustrated in FIG. 44 is used, the deflecting paddle wheel 140 continues to segmentally rotate in the same direction and through successive angles of ninety degrees, when a stone or clod is delivered to the drop nose 102, or when no object is delivered by the adjacent advancing paddle face 24 to the drop nose. However, when a potato or like conductive object is delivered by the advancing paddle face 24 to the drop nose 102, the control circuit shown in FIG. 44 operates to de-energize the clutch coil 87 so that the drive cup 86 continues to oscillate without driving engagement with the rotor 88, and simultaneously operates to energize the brake coil 89 so as to lock one of the deflecting paddle blades 140' in position to block the port opening 142a in the side chute 142, and so that the potato or like conductive object continues its travel over the drop nose 102 and into the product receiving chute 146.

When a potato or like conductive object is individually advanced in sensing relation to the spaced condenser plates 104 of the capacitor C1 as shown in FIG. 44, a surge is thereby produced in the oscillator circuit A which is applied to the amplifier circuit B contained in the sensing unit 100. After amplification, the resulting negative pulse is applied to the switching circuit C, causing the transistor Q5 to switch from a non-conducting to a conducting state, and simultaneously causing the transistor Q6 to switch from a conducting to a non-conducting state. Since the emitter of transistor Q5 becomes more negative when it is conducting, the increase in negative potential is applied to the base of transistor Q7 through the protective resistor R7, causing transistor Q7 to become conductive. Transistor Q7 is connected in parallel with the contact plate 107'' and contact point 107''' of the brake switching cam 107. When transistor Q7 is conducting, current will flow from the battery 110 through lead wires 112 and 83, brake coil 89, lead wires 83' and 83b, transistor Q7 and resistor R53 to ground. At the same time, the emitter of transistor Q6 becomes less negative when it is switched to a non-conducting state, and the drop in negative potential is applied to the base of transistor Q8 through the protective resistor R8, causing transistor Q8 to become non-conducting. When the transistor Q8 is non-conducting, no current can flow through the clutch coil 87. Thus a signal emanating from the capacitor C1 will energize the brake coil 89 and lock the deflecting paddle wheel 140 against rotation, and the transistor Q8 will simultaneously open the clutch circuit and de-energize the clutch coil 87.

The single lobed switch cam 108, fixed to the secondary shaft 93' and under continuous rotation, is adjusted so that its contact plate 108'' and contact point 108''' are momentarily brought into circuit closing position once during every revolution of shaft 93'. When a potato signal is received, the paddle wheel 140 is locked against rotation, so that the potato or like conductive object may proceed from the drop nose into the product chute 146. Adjustments are made so that the switching circuit between contact plate 108'' and contact point 108''' is momentarily closed after the potato is discharged into chute 146. This partially discharges condenser C40 through resistor R56, causing a negative pulse to be applied to the base of the transistor Q6 through condenser C39 and diode D4. Transistor Q6 is thereby switched to a conducting state and transistor Q5 to a non-conducting state, causing transistor Q8 to become conducting and transistor Q7 non-conducting. This will reset the switching circuit C, allowing the clutch switch elements 106'' and 106''' to control the clutch circuit and the brake switch elements 107'' and 107''' to control the brake circuit, thereby producing continuous segmental rotation of the deflecting paddle wheel 140, as previously described, until another potato or other conductive body is advanced in sensing relation to the sensing unit 100.

From the above description it is evident that, with very little change and by adding control switches exterior to the sensing unit 100, and by substituting interchangeable leads 82', 83', 84 and 84' shown in FIG. 43, for the leads 82b, 83b, 84 and 84' shown in FIG. 44, the salient pole type clutch and brake devices associated with each column of advancing paddles of the marshalling assembly may be simply adjusted or modified to operate the deflecting paddle wheels 140 to deflect either conductive objects such as potatoes as in the circuit shown in FIG. 43, or non-conductive objects such as stones and clods as in the circuit illustrated in FIG. 44. For both deflecting systems, the sensing unit 100 and the salient pole type clutch and brake devices 85 may be similar in construction and design and provide standard replacement components. The sensing units 100, compactly contained in a sealed housing, occupy minimum space and can be constructed and assembled at relatively low cost.

Operation and maintenance

The actual field operation of the potato harvester as illustrated in the drawings is abundantly evident from the preceding description. The potato harvester of this invention embraces components and operating sections which can be separately manufactured and then integrated together to provide a complete potato harvester which will yield a clean potato product under substantially all field conditions.

Vine and debris removal is adequately provided for. The potatoes, stones, sod, vines, clods, earth and other material excavated by the digging shoes or scoops 170, is initially conducted over the primary sifting and elevating conveyor 180, where excavated material of smaller size than the potatoes to be harvested, is sifted therethrough to ground. Where the excavated material also presents stones, clods and sod larger than the potatoes under harvest, the secondary sifting conveyors 115 operate to adequately remove such large size debris. Where the crop field is sufficiently free of large stones and hard clods to permit elimination of the secondary sifting conveyors 115, the conveyors 115 may be readily detached from their supporting and driving sprockets and removed from the harvester.

A primary deviner 1 is desirably associated with each primary sifting and elevating conveyor 180 as standard harvester equipment, since the excavated crop material will invariably include vines or at least vine remnants which should be removed from the product flowing through the harvester. The primary deviners 1 are highly effective for this purpose, and are kept clean and free of vine entanglements by the stripper fingers 115a which may be attached directly to the adjacent side edge of the transverse conveyors 115. When operating under field conditions where excessive vines and above-ground growths are present, and beyond the capacity of the primary deviners 1 to completely remove, a floating deviner roll 47 may be associated with each spinner roll 46 or 126 or 126a as above described. Such conditions may occur where vine killing chemicals and subsequent vine beating equipment have not been used to prepare the potato field for harvesting. The rotation of the tumbling rolls 45 or 125 or 125a and spinner rolls 46 or 126 or 126a will normally operate to throw any remaining vines travelling through the marshalling assembly, into contact with the floating deviner roll 47. However, if rotation of these rolls is inadequate for this purpose, a series of stationary sweep rods may be mounted on the marshalling assembly framework, adjacent the deviner roll 47, which are operative to sweep the vines into gripping engagement with the floating deviner roll 47.

The potato and stone marshalling system of this invention is highly effective in assuring lineally spaced and columnized advance of individual objects to a position for classification at the rear end of the harvester. In principle, the marshalling system provides a series of grooves or channels along which the objects are lineally advanced and columnized in singularizing spaced relation, by the cooperating action of the advancing paddle faces 24 operating in conjunction with the tumbling and/or spinner rolls, and/or the inclined floor members as illustrated in FIGS. 27, 30, 31 and 32. This marshalling assembly will effectively and positively advance the objects in columnized order and in singularized and uniformly spaced relation, for positive classification at the terminal end of the marshalling assembly. In addition, the tumbling action to which the recovered potatoes and like product are subject, removes dirt and soil therefrom, so that a clean crop product is discharged from the harvester.

It will also be noted that the entire marshalling assembly, including the marshalling chains 20 or 20a and associated paddles 23, 23a, 23b or 23c, the tumbling rolls 45, 125 or 125a, the spinner rolls 46, 126 or 126a, the floating deviner rolls 47 or deflecting plates 135, and all drives therefor, are assembled as a unit on a rectangular shaped marshalling frame comprising the side bars 11–11', the end bars 12–12' and 13–13' and associated vertical struts 14–14'. The entire marshalling assembly may therefore be independently manufactured and assembled as an integrated unit, and then inserted into the harvester framework, in a manner to facilitate both manufacture, installation, replacement and repair.

The potato selector and stone eliminator mechanisms associated with the harvester can also be manufactured and assembled as integrated units, and then applied to the harvester framework. The deflecting paddle 65 below the sensing ring 62, as shown in FIG. 6, may be mechanically manipulated by means of a magnetic fluid clutch and brake mechanism 70, or a salient pole type clutch and brake device 85 as heretofore described; each of which operates under the control of its own sensing circuit. Similarly the paddle wheel 140 may be manipulated by either a magnetic fluid clutch and brake mechanism 70 or a salient pole clutch and brake device 85, as preferred. It will also be appreciated, however, that within the purview of this invention, the deflecting paddle 65 shown in FIG. 6, or the deflecting paddle wheel 140 shown in FIGS. 36, 43 and 44, may be mechanically manipulated by other types of clutches; as for example, a friction type clutch which includes a mechanically driven clutch disc equipped with a clutching electromagnet, and an adjacent friction disc equipped with a braking electromagnet, both under the control of a sensing circuit. It will also be appreciated that compressed air or hydraulic fluid may provide the mechanical means for manipulating the deflecting paddle 65 or for segmentally rotating the deflecting paddle wheel 140, in which case the flow of compressed air or hydraulic fluid to the air or fluid clutch would be controlled by electromagnetic valves, each sensitively controlled by a sensing circuit as heretofore described.

Where the columnized and lineally spaced potatoes and stones are discharged from the marshalling assembly into corresponding vertical drop tubes 61, the drop tubes should be in the order of from two to three feet in length for reasons heretofore explained. To provide room for drop tubes 61 of such length, the transverse potato conveyor 190 must be mounted at a low level. However, where deflecting paddle wheels 140 positioned adjacent the discharge end of the marshalling assembly are employed, the product receiving side chute 142 or advance chute 146 may be short in length, so that the transverse conveyor 190 may be brought up to a higher elevation, with minimum drop of the product onto the transverse conveyor 190. Where drop tubes 61 are used, requiring a transverse conveyor 190 positioned at a low level, the product receiving end of the side conveyor 200 must also be at a correspondingly low level to receive the product discharged from the transverse conveyor 190. In such case, the side conveyor 200 desirably receives the crop product on the lower reach thereof, with the side conveyors 200 so constructed as to include dump racks 202–204 in association therewith and operative to discharge the harvested product onto the cantilever loading conveyor 220. However, where the transverse conveyor 190 is at a higher elevation, as permitted by the use of classification paddle wheels 140 at the discharge end of the marshalling assembly, the potato product may be discharged on the upper run of a side conveyor 200 which may be simple in form, and without dump racks 202–204.

The cantilever loading conveyor 220 can be hydraulically manipulated by suitable controls positioned adjacent the driver's seat 159, and whereby the driver can conveniently adjust the discharge conveyor 220 for proper product discharge into the bin body of the adjacent hauling vehicle. Where it is desirable to bag the harvested product in the field, a bagging platform may be positioned adjacent the discharge end of the side conveyor 200, and the bagged product rolled from the bagging platform into an adjacent hauling vehicle.

The harvester of this invention preferably incorporates a combustion engine 160 of adequate power and coupled to travel the harvester as a self-propelled piece of equipment. However, the harvester of this invention may be drawn by a separate hauling tractor, in which case the harvester may then be equipped with a small power unit 160 sufficient in power to drive its various operating mechanisms; or alternatively, a power take-off may extend to the harvester from the hauling tractor.

Harvesters may be constructed in accordance with the teachings of this invention, for the harvesting of other root crops than potatoes; as for example, sugar beets, turnips, onions and the like, as will be evident to those skilled in the art. The marshalling assemblies, and selector and classifying mechanisms of this invention, are also adapted for use in the classification of other rotund products or articles, as will be evident to those skilled in the art.

While certain novel features of this invention have been disclosed herein and are pointed out in the claims, it will be understood that various omissions, substitutions and changes may be made by those skilled in the art, without departing from the teachings of this invention.

What is claimed is:

1. A mobile potato harvester system including in combination, a device for excavating one or more potato rows, automatic means for separating and removing stones and debris which are smaller and larger than the potatoes to be gathered and conveying the potatoes and remaining stones to a receiving hopper, a flexible drive member extending longitudinally from the receiving hopper, a column of spaced potato advancing paddles fixed to and extending laterally from said flexible drive member, each of said advancing paddles presenting an arm section fixed to the drive member and extending laterally therefrom and terminating in a potato advancing paddle section which is rearwardly inclined with respect to the direction of travel thereof, a primary tumbling roll positioned under the column of advancing paddles and providing tumbling support for the potatoes, a secondary tumbling roll positioned adjacent said primary tumbling roll and extending along the line of travel of the outer ends of the columnized paddle sections advancing over said primary tumbling roll to thereby maintain the potatoes adjacent to said secondary tumbling roll under the advancing influence of the paddles, means for rotating said primary and secondary tumbling rolls to thereby tumble the advancing potatoes in contact therewith and laterally eject all but one of the potatoes from the advancing influence of each paddle, means for returning the ejected potatoes to the receiving hopper for recycle, and a resiliently supported devining roll positioned above said secondary tumbling roll and in resilient pressure contact therewith, said devining roll being subject to the rotative influence of said secondary tumbling roll and cooperating therewith to strip and remove vines and vegetation from the potatoes as advanced by said paddles.

2. A mobile root crop harvester system including in combination; a digging device for excavating a root crop row, a continuous sifting conveyor whose upper run extends from said digging device in an upwardly inclined direction to the discharge end thereof, means for driving said sifting conveyor whereby earthy material and debris which is smaller than the selected root crop to be gathered is sifted out of the excavated material during the upwardly inclined travel of the upper run of said sifting conveyor, deviner means including a pair of vine gripping surfaces arranged in resilient pressure relationship and positioned adjacent the discharge end of said sifting conveyor, means for driving said vine gripping surfaces whereby vines and vegetation are caught and stripped from the stream of excavated material as supplied by said shifting conveyor, and a driven member designed to be advanced in close proximity to and substantially at right angles to the driven movement of said vine gripping surfaces and operative to engage and loosen vines and other debris adhering to said vine gripping surfaces.

3. A mobile root crop harvester system including in combination; a digging device for excavating a root crop row, a continuous sifting conveyor whose upper run extends from said digging device in an upwardly inclined direction to the discharge end thereof, means for driving said sifting conveyor whereby earthy material and debris which is smaller than the selected root crop to be gathered is sifted out of the excavated material during the upwardly inclined travel of the upper run of said sifting conveyor, a deviner roll held in resilient pressure contact with said sifting conveyor adjacent the discharge end thereof, means for driving said deviner roll whereby vines and other debris are caught and stripped from the stream of excavated material as discharged from said sifting conveyor, and a driven member designed to be transversely advanced in close proximity to the surface of said deviner roll and in a direction substantially parallel to the axis thereof to thereby engage and loosen vines and other debris adhering to said deviner roll.

4. A mobile root crop harvester system including in combination; a digging device for excavating a root crop row, a continuous primary sifting conveyor whose upper run extends from said digging device in an upwardly inclined direction to the discharge end thereof, means for driving said primary sifting conveyor whereby earthy material and debris which is smaller than the selected root crop to be gathered is sifted out of the excavated material during the upwardly inclined travel of the upper run of said primary sifting conveyor, a deviner member having a continuous vine gripping surface positioned adjacent to the discharge end of said primary sifting conveyor but below the upper run thereof, means for resiliently maintaining the vine gripping surface of said member in resilient pressure relation to said primary sifting conveyor, means for driving the vine gripping surface of said deviner member in the same direction as the direction of travel of the lower run of said primary sifting conveyor whereby vines and vegetation are caught between the vine gripping surface of said deviner member and said primary sifting conveyor and thereby stripped from the stream of excavated material as discharged from said primary sifting conveyor, a continuous secondary sifting conveyor having the upper run thereof positioned below but adjacent to said deviner member and extending transversely of the harvester, said secondary sifting conveyor having openings therein which are sufficiently large to permit the selected root crop and remaining debris of corresponding size to sift through the upper run thereof but otherwise support stones, sods, clods and other debris whose size is larger than the selected root crop, means for driving said secondary sifting conveyor to thereby transport and discharge to one side of the harvester the large size debris as supported thereon, and means for receiving and collecting the selected root crop passing through the upper run of said secondary sifting conveyor.

5. A mobile root crop harvester system including in combination; a digging device for excavating a root crop row, a continuous primary sifting conveyor whose upper run extends from said digging device in an upwardly inclined direction to the discharge end thereof, means for driving said primary sifting conveyor whereby earthy material and debris which is smaller than the selected root crop to be gathered is sifted out of the excavated material during the upwardly inclined travel of the upper run of said primary sifting conveyor, a deviner member having a continuous vine gripping surface positioned adjacent to the discharge end of said primary sifting conveyor but below the upper run thereof, means for resiliently maintaining the vine gripping surface of said member in resilient pressure relation to said primary sifting conveyor, means for driving the vine gripping surface of said deviner member in the same direction as the direction of travel of the lower run of said primary sifting conveyor whereby vines and vegetation are caught between the vine gripping surface of said deviner member and said primary sifting conveyor and thereby stripped from the stream of excavated material as discharged from said primary sifting conveyor, a continuous secondary sifting conveyor having the upper run thereof positioned adjacent to said deviner member and extending transversely of the harvester, said secondary sifting conveyor having openings therein which are sufficiently large to permit the selected root crop and remaining debris of corresponding size to sift through the upper run thereof but otherwise support stones, sods, clods and other debris whose size is larger than the selected root crop, means for driving said secondary conveyor to thereby transport and discharge to one side of the harvester the large size debris as transported thereby, a plurality of stripping prongs presenting terminal ends, and means for advancing the terminal ends of said stripping prongs along a path of travel which is directly adjacent to the vine gripping surface of said deviner member and in a direction longitudinally of the axis of said deviner member to thereby strip vines and vegetation from clinging contact with said deviner member.

6. A mobile root crop harvester system, which includes; a digging device for excavating a root crop row, a primary sifting conveyor whose upper run extends from said digging device in an upwardly inclined direction to the discharge end thereof, means for driving said primary sifting conveyor whereby earthy material and debris which is smaller than the selected root crop to be gathered is sifted out of the excavated material during travel of the upper run of said primary sifting conveyor, a deviner roll positioned adjacent to the discharge end of said primary sifting conveyor but below the upper run thereof, means for resiliently maintaining said deviner roll in resilient pressure relation to said primary sifting conveyor, means for rotating said deviner roll in the same rotative direction as the direction of travel of the lower run of said primary sifting conveyor whereby vines and vegetation are caught between the periphery of said roll and said primary sifting conveyor and thereby stripped from the stream of excavated material as discharged from said primary sifting conveyor, a secondary sifting conveyor having the upper run thereof positioned adjacent to but below said deviner roll and extending transversely of the harvester, said secondary sifting conveyor having openings therein which are sufficiently large to permit the selected root crop and remaining debris of corresponding size to sift through the upper run thereof but otherwise support stones, sods, clods and other debris whose size is larger than the selected root crop, means for driving said secondary sifting conveyor to thereby transport and discharge to one side of the harvester the large size debris as supported thereon, and a stripping prong fixed to said secondary sifting conveyor which presents a stripping terminal which is advanced during the movement of the upper run of said secondary sifting conveyor along a path of travel which is directly adjacent to the periphery of said deviner roll and in a direction longitudinally of the axis of said deviner roll to thereby strip vines and vegetation from clinging contact with said deviner roll.

7. A mobile root crop harvester system including in combination; a digging device for excavating a root crop row, a primary sifting conveyor whose upper run extends from said digging device in an upwardly inclined direction to the discharge end thereof, means for driving said primary sifting conveyor whereby earthy material and debris which is smaller than the selected root crop to be gathered is sifted out of the excavated material during the upwardly inclined travel of the upper run of said primary sifting conveyor, a deviner member having a continuous vine gripping surface positioned adjacent to the discharge end of said primary sifting conveyor but below the upper run thereof, means for resiliently maintaining the vine gripping surface of said member in resilient pressure relation to said primary sifting conveyor, means for driving the vine gripping surface of said deviner member in the same direction as the direction of travel of the lower run of said primary sifting conveyor whereby vines and vegetation are caught between the vine gripping surface of said deviner member and said primary sifting conveyor and thereby stripped from the stream of excavated material as discharged from said primary sifting conveyor, a secondary sifting conveyor having the upper run thereof positioned adjacent to said deviner member and extending transversely of the harvester, said secondary sifting conveyor having openings therein which are sufficiently large to permit the selected root crop and remaining debris of corresponding size to sift through the upper run thereof but otherwise support stones, sods, clods and other debris whose size is larger than the selected root crop, means for driving said secondary sifting conveyor to thereby transport and discharge to one side of the harvester the large size debris as supported thereon, and a plurality of stripping prongs fixed to said secondary sifting conveyor and presenting stripping terminals which are advanced by the movement of the upper run of said secondary sifting conveyor to a position directly adjacent the vine gripping surface of said deviner member to thereby strip vines and vegetation from clinging contact with the vine gripping surface of said deviner member.

8. A mobile potato harvester system including in combination; a digging device for excavating a potato row, a primary sifting conveyor extending longitudinally of the harvester in an upwardly inclined direction from said digging device and having openings therein sufficiently large to sift out small size debris and convey selected size potatoes and debris not siftably discarded thereby to the upper end thereof, a deviner member having a continuous vine gripping surface adjacent the discharge end of said primary sifting conveyor, means for resiliently maintaining the vine gripping surface of said deviner member in relative pressure contact with said primary sifting conveyor adjacent the discharge end thereof, means for driving said deviner member to thereby strip and remove vines and the like from the material discharged from the upper end of said primary sifting conveyor, a secondary sifting conveyor having the upper run thereof positioned adjacent to said deviner member and extending transversely of the harvester and having its lower run positioned below and in spaced relation to the upper run thereof, said secondary sifting conveyor having openings therein which are sufficiently large to permit potatoes and remaining debris of corresponding size to sift through the upper run thereof but otherwise support and transport large size stones, sods, clods and other debris for discharge at one side of the harvester, and a hopper positioned between the upper and lower runs of said secondary sifting conveyor for receiving and collecting the potatoes and medium sized debris as sifted through the upper run of said secondary sifting conveyor and not previously discarded.

9. A mobile potato harvester system including in combination; a digging device for excavating a potato row, a primary sifting conveyor extending longitudinally of the harvester in an upwardly inclined direction from said digging device and having openings therein sufficiently large to sift out small size debris and convey selected size potatoes and debris not siftably discarded thereby to the upper end thereof, vine gripping means adjacent the discharge end of said primary sifting conveyor, means for driving said vine gripping means to thereby strip and remove vines and the like from the material discharged from the upper end of said primary sifting conveyor, a second sifting conveyor having the upper run thereof positioned adjacent to said vine gripping means and extending transversely of the harvester and having its lower run positioned below and in spaced relation to the upper run thereof, said secondary sifting conveyor having openings therein which are sufficiently large to permit potatoes and remaining stones and hard earthy lumps of corresponding size to sift through the upper run thereof but otherwise support and transport large size stones, sods, clods and other debris for discharge at one side of the harvester, a hopper positioned between the upper and lower runs of said secondary sifting conveyor for receiving and collecting the potatoes and remaining stones and hard earthy lumps sifted through the upper run of said secondary sifting conveyor and not previously discarded, automatically driven means for columnizing and advancing the remaining stones, hard earthy lumps and potatoes from said hopper in single file columns and during said advance to gently tumble the columnized potatoes, to remove remaining clinging soil therefrom, a series of selector means respectively positioned at the terminal ends of said columns for separating the columnized potatoes from the remaining stones and hard earthy lumps, and means for conveying the debris separated potatoes to loading discharge.

10. A mobile potato harvester system including in combination; a digging device for excavating a potato row, a primary sifting conveyor extending longitudinally of the harvester in an upwardly inclined direction from said digging device and having openings therein sufficiently large to sift out small size debris and convey selected size potatoes and debris not siftably discarded thereby to the upper end thereof, a secondary sifting conveyor having the upper run thereof positioned adjacent the discharge end of said primary sifting conveyor and extending transversely of the harvester and having its lower run positioned below and in spaced relation to the upper run thereof, said secondary sifting conveyor having openings therein which are sufficiently large to permit potatoes and remaining stones and hard earthy lumps of corresponding size to sift through the upper run thereof but otherwise support and transport large size stones, sods, clods and other debris for discharge at one side of the harvester, a hopper positioned between the upper and lower runs of said secondary sifting conveyor for receiving and collecting the potatoes and medium sized stones and hard earthy lumps as sifted through the upper run of said secondary sifting conveyor and not previously discarded, a series of automatically operated means for advancing and columnizing the potatoes and remaining stones and hard earthy lumps from said receiving hopper into a series of moving columns and during said advance to gently tumble the columnized potatoes to remove remaining clinging soil therefrom, a series of selector means positioned to receive the respective columns of potatoes and remaining stones and hard lumps as discharged from the respective advancing and columnizing means and operative to separate the potatoes from the remaining stones and hard earthy lumps, and means or conveying the debris separated potatoes to loading discharge.

11. A mobile potato harvester system including in combination; a digging device for excavating a potato row, a primary sifting conveyor extending longitudinally of the harvester in an upwardly inclined direction from said digging device and having openings therein sufficiently large to sift out small size debris and convey selected size potatoes and debris not siftably discarded thereby to the upper end thereof, a deviner member having a continuous vine gripping surface adjacent the discharge end of said primary sifting conveyor, means for resiliently maintaining the vine gripping surface of said deviner member in relative pressure contact with said primary sifting conveyor adjacent the discharge end thereof, means for driving said deviner member to thereby strip and remove vines and the like from the material discharged from the upper end of said primary sifting conveyor, a secondary sifting conveyor having the upper run thereof positioned adjacent to said deviner member and extending transversely of the harvester and having its lower run positioned below and in spaced relation to the upper run thereof, said secondary sifting conveyor having openings therein which are sufficiently large to permit potatoes and medium size stones and hard earthy lumps of corresponding size to sift through the upper run thereof but otherwise support and transport large size stones, sods, clods and other debris for discharge at one side of the harvester, a hopper positioned between the upper and lower runs of said secondary sifting conveyor for receiving and collecting the potatoes and medium size stones and hard earthy lumps as sifted through the upper run of said secondary sifting conveyor and not previously discarded, a series of automatically driven means for conveying and marshalling the potatoes and remaining stones and hard earthy lumps from said receiving hopper into a series of upwardly moving columns, a series of selector means positioned to receive the respective columns of potatoes and remaining stones and hard earthy lumps as discharged from the respective conveying and marshalling means and operative to separate the potatoes from the remaining stones and hard earthy lumps, and means for conveying the debris separated potatoes to loading discharge.

12. A mobile potatoe harvester system including in combination; a digging device for excavating one or more potato rows, automatically driven conveyor means for separating and removing stones and earthy material which are smaller than the potatoes to be gathered, automatically driven conveyor means for separating and discarding stones and hard earthy lumps which are larger than the potatoes to be gathered, automatically driven means for columnizing and advancing the remaining stones, hard earthy lumps and potatoes in single file columns and during said advance to gently tumble the columnized potatoes to remove remaining clinging soil therefrom, electrical sensing means at the terminal end of each of said columns which is sensitive to the difference in electrical characteristics of potatoes as compared to the remaining stones and hard earthy lumps, an electrically controlled manipulator associated with each of said sensing means and responsive to said sensing means and automatically operative to separate the columnized potatoes from the remaining stones and hard earthy lumps as identified by said sensing means, and means for conveying the selected potatoes to loading discharge.

13. A mobile potato harvester system including in combination, a digging device for excavating one or more potato rows, automatically driven conveyor means for separating and removing stones and earthy material from the excavated material which are smaller than the potatoes to be gathered, automatically driven means positioned in cooperating relation to the terminal end of said conveyor means for stripping and removing vines and vegetation from the excavated material, a second automatically driven conveyor means for separating and removing stones and hard earthy lumps which are larger than the potatoes to be gathered, automatically driven means for columnizing and advancing the remaining stones, hard earthy lumps and potatoes in single file columns and during said advance to gently tumble the columnized potatoes to remove remaining clinging soil therefrom, electrical sensing means at the terminal end of each of said columns which is sensitive to the difference in electrical characteristics of potatoes as compared to the remaining stones and hard earthy lumps, a manipulator associated with each of said sensing means whose operating power is under the control of its sensing means, said manipulator being automatically operative to separate the columnized potatoes from the remaining stones and hard earthy lumps as identified by said sensing means, and means for conveying the selected potatoes to loading discharge.

14. A mobile potato harvester system including in combination, a digging device for excavating one or more potato rows, a first automatically driven conveyor means for separating and removing stones and earthy material from the material excavated which are smaller than the potatoes to be gathered, automatically driven means positioned in cooperative relation to the terminal end of said first conveyor means for stripping and removing vines and vegetation from the excavated material, a second automatically driven conveyor means for separating and removing stones and hard earthy lumps which are larger than the potatoes to be gathered, and automatic means for separating and removing remaining stones and hard earthy lumps from the potatoes to be gathered which includes, a series of electrical sensing means each sensitive to the higher electrical conductivity of potatoes but relatively non-sensitive to the lower conductivity of stones and earthy material, a series of automatically driven means for columnizing and advancing the remaining stones, hard earthy lumps and potatoes in single file columns and in spaced order into operative relation to the respective sensing means and further operative during such advance to gently tumble the columnized potatoes to remove remaining clinging soil therefrom, and an electrically controlled manipulator associated with each of said sensing means and under the control of its sensing means which is automatically operative to separate the columnized potatoes from the remaining stones and hard earthy lumps as identified by said sensing means, and means for conveying the selected potatoes to loading discharge.

15. A mobile potato harvester system including in combination, a digging device for excavating one or more potato rows, a first automatically driven conveyor means for separating and removing stones and earthy material from the material excavated which are smaller than the potatoes to be gathered, automatically driven means positioned in cooperative relation to the terminal end of said conveyor means for stripping and removing vines and vegetation from the excavated material, a second automatically driven conveyor means for separating and removing stones and hard earthy lumps which are larger than the potatoes to be gathered, and automatic means for separating and removing remaining stones and hard earthy lumps from the potatoes to be gathered which includes, a plurality of sensing means each electrically sensitive to the higher electrical conductivity of potatoes, but relatively non-sensitive to the lower conductivity of stones and earthy material, automatic means for marshalling the potatoes and remaining stones and hard earthy lumps into a plurality of single file columns and in spaced order, automatic means for advancing each column into operative relation to each of said sensing means and operative during such advance to gently tumble the columnized potatoes to remove remaining clinging soil therefrom, an electrically controlled manipulator for each of said columns responsive to its sensing means and automatically operative to separate the potatoes from the remaining stones and hard earthy lumps in the column as identified by said sensing means, and means for conveying the selected potatoes to loading discharge.

16. A mobile potato harvester system including in combination, a digging device for excavating a potato row, a pair of successive automatically driven conveyors for respectively separating and removing from the excavated material stones and earthy material and hard lumps which are smaller and larger than the potatoes to be gathered, automatic means for columnizing and advancing the potatoes and remaining stones and hard lumps into a series of single file columns and in spaced order and during said advance to gently tumble the columnized potatoes to remove remaining clinging soil therefrom, a series of sensing means each positioned in sensing relation to a column of potatoes and stones and lumps as discharged from said advancing and columnizing means, each of said sensing means being electrically sensitive to the higher electrical conductivity of potatoes but relatively non-sensitive to the lower conductivity of stones and hard earthy lumps passing through said sensing means, a series of electrically controlled manipulators each responsive to one of said sensing means and automatically operative to separate the potatoes from the remaining stones and hard earthy lumps as identified by said sensing means, and means for conveying the selected potatoes to loading discharge.

17. A mobile potato harvester system including in combination, a potato excavating device, an automatically driven and upwardly inclined digging conveyor extending from said excavating device and operative to sift out small size debris from the excavated material and convey selected size potatoes and debris not siftably discarded thereby to the upper end thereof, automatically driven means positioned in cooperative relation to the terminal end of said digging conveyor and operative to strip and discard vines and vegetation from the excavated material, a second automatically driven sifting conveyor operative to convey and discharge stones, sods, clods and other large size debris larger than the potatoes to be gathered and sift out the potatoes and remaining medium sized stones and clods, automatically driven means for columnizing and advancing the remaining stones, hard earthy lumps and potatoes in single file columns and during said advance to sift out remaining debris and gently tumble the columnized potatoes to remove remaining clinging soil therefrom, a series of sensing means each positioned in sensing relation to a column of potatoes, stones and clods, a series of selector means each responsive to one of said sensing means and operative to separate remaining stones and clods from the potatoes in the column as identified by its sensing means, and means for conveying the selected potatoes to loading discharge.

18. A mobile potato harvester system including in combination, a potato excavating device, an automatically driven and upwardly inclined digging conveyor extending from said excavating device and operative to sift out small size debris from the excavated material and convey selected size potatoes and debris not siftably discarded thereby to the upper end thereof, automatically driven deviner means positioned in cooperative relation to the terminal end of said digging conveyor and operative to strip and discard vines and vegetation from the excavated material, a transversely driven sifting conveyor designed to support and convey large stones, sods, clods and other large size debris larger than the potatoes to be gathered for discharge along one side of the harvester and to sift out the potatoes and remaining medium sized stones and clods not previously discarded, automatically driven means for columnizing and advancing the remaining stones, hard earthy lumps and potatoes in single file columns and during said advance to sift out remaining debris and gently tumble the columnized potatoes to remove remaining clinging soil therefrom, a series of sensing means each positioned in sensing relation to a column of potatoes, stones and clods, a series of selector means each responsive to one of said sensing means and operative to separate remaining stones and clods from the potatoes in the column as identified by its sensing means, and means for conveying the selected potatoes to loading discharge.

19. A mobile potato harvester system including in combination, a potato excavating device, an automatically driven and upwardly inclined digging conveyor extending from said excavating device and operative to sift out small size debris from the excavated material and convey selected size potatoes and debris not siftably discarded thereby to the upper end thereof, automatically driven deviner means positioned in cooperative relation to the terminal end of said digging conveyor and operative to strip and discard vines and vegetation from the material as discharged from the upper end of said digging conveyor, a transversely driven sifting conveyor designed to support and convey large stones, sods, clods and other large size debris larger than the potatoes to be gathered for discharge along one side of the harvester and to sift out the potatoes and remaining medium sized stones and clods not previously discarded, automatically driven means for columnizing and advancing the remaining stones, clods and potatoes in single file columns and during said advance to sift out remaining debris and gently tumble the columnized potatoes to remove remaining clinging soil therefrom, a series of sensing circuits each including sensing means positioned in adjacent relation to the respective columns of potatoes, stones and clods, a series of selector means each responsive to one of said sensing means and operative to separate remaining stone and clods from the potatoes in the column as moved adjacent its sensing means, and means for conveying the selected potatoes to loading discharge.

20. A mobile potato harvester system including in combination, a potato excavating device, an automatically driven and upwardly inclined digging conveyor extending from said excavating device and operative to sift out small size debris from the excavated material and convey selected size potatoes and debris not siftably discarded thereby to the upper end thereof, automatically driven deviner means positioned in cooperative relation to the terminal end of said digging conveyor and operative to strip and discard vines and vegetation from the material as discharged from the upper end of said digging conveyor, a transversely driven sifting conveyor designed to support and convey large stones, sods, clods and other large size debris larger than the potatoes to be gathered for discharge along one side of the harvester and to sift out the potatoes and remaining medium sized stones and clods not previously discarded, a collecting hopper positioned to receive the potatoes and medium size stones and clods sifted through said transversely driven sifting conveyor and not previously discarded, automatic means for advancing and columnizing the potatoes and remaining stones and clods from said receiving hopper into a series of advancing columns, a series of sensing means each positioned in sensing relation to a column of potatoes, stones and clods, a series of selector means each responsive to one of said sensing means and operative to separate remaining stones and clods from the potatoes in the column as moved adjacent its sensing means, and means for conveying the selected potatoes to loading discharge.

21. A mobile potato harvester system including in combination, a digging device for excavating one or more potato rows, automatically driven conveyor means for separating and discarding stones and hard earthy materials from the potatoes to be gathered, an oscillator circuit having a sensing means which is electrically sensitive to the higher electrical conductivity of potatoes but relatively non-sensitive to the lower conductivity of stones and earthy material, a switching circuit electrically responsive to the pulsations in the oscillator circuit by which it is controlled, automatic means for marshalling potatoes and the remaining stones into a column, means for advancing the column in sensing proximity to said sensing means and during said advance to gently tumble the columnized potatoes to remove remaining clinging soil therefrom, an electrically controlled manipulator operatively controlled by the switching circuit as associated with the oscillator circuit, said electrically controlled manipulator being operative to separate potatoes from the remaining stones in the column as identified by the sensing means of its oscillating circuit, and means for conveying the selected potatoes to loading discharge.

22. A mobile potato harvester system including in combination, a digging device for excavating one or more potato rows, automatically driven conveyor means for separating and discharging stones and hard earthy materials from the potatoes to be gathered, a plurality of oscillator circuits each having a sensing means which is electrically sensitive to the higher electrical conductivity of potatoes but relatively non-sensitive to the lower conductivity of stones and earthy material, a plurality of switching circuits each electrically responsive to the pulsations in the oscillator circuit by which it is controlled, automatic means for marshalling potatoes and the remaining stones into a plurality of single file columns and in spaced order, automatic means for advancing each column in sensing proximity to one of said sensing means and during said advance to gently tumble the columnized potatoes to remove remaining clinging soil therefrom, a series of electrically controlled manipulators each of which is operatively controlled by one of the switching circuits associated with one of said oscillator circuits, each of said electrically controlled manipulators being operative to separate potatoes from the remaining stones in the column as identified by the sensing means of its oscillating circuit, and means for conveying the selected potatoes to loading discharge.

23. A mobile potato harvester system including in combination, a digging device for excavating one or more potato rows, automatically driven conveyor means for separating and discharging stones and hard earthy materials from the potatoes to be gathered, an oscillator circuit having a sensing means which electrically sensitive to the higher electrical conductivity of potatoes but releatively non-sensitive to the lower conductivity of stones and earthy material, an amplifier circuit connected to the oscillator circuit and operative to amplify the electrical pulsations produced in the oscillator circuit, a switching circuit connected to the amplifier circuit and electrically responsive to the pulsations in the amplifying circuit, automatic means for marshalling potatoes and the remaining stones into a column, means for advancing the column into sensing proximity to said sensing means and during said advance to gently tumble the columnized potatoes to remove remaining clinging soil therefrom, an electrically controlled manipulator operatively controlled by the switching circuit, said electrically controlled manipulator being operative to separate potatoes from the remaining stones in the column as identified by the sensing means of its oscillating circuit, and means for conveying the selected potatoes to loading discharge.

24. A mobile potato harvester system including in combination, a digging device for excavating one or more potato rows, and automatically driven conveyor for separating and discarding stones and hard earthy materials which are smaller than the potatoes to be gathered, automatic means positioned in cooperative relation to the terminal end of said conveyor for stripping and removing vines and vegetation from the excavated material, a second automatically driven conveyor for separating and discarding stones and hard earthy materials which are larger than the potatoes to be gathered, a plurality of oscillator circuits each having a sensing means which is electrically sensitive to the higher electrical conductivity of potatoes but relatively non-sensitive to the lower conductivity of stones and earthy material, a plurality of amplifier circuits each operative to amplify the electrical pulsations produced in the oscillator circuit to which it is connected, a plurality of switching circuits each electrically responsive to the pulsations in the amplifying circuit to which it is connected, automatic means for marshalling potatoes and the remaining stones into a plurality of single file columns and in spaced order, automatic means for advancing each column in sensing proximity to one of said sensing means and during said advance to gently tumble the columnized potatoes to remove remaining clinging soil therefrom, a series of electrically controlled manipulators each of which is operatively controlled by one of the switching circuits associated with one of said oscillator circuits, each of said electrically controlled manipulators being operative to separate potatoes from the remaining stones in the column as identified by the sensing means of its oscillating circuit, and means for conveying the selected potatoes to loading discharge.

References Cited by the Examiner
UNITED STATES PATENTS

| | | | |
|---|---|---|---|
| 2,369,723 | 2/45 | Denlinger | 171—14 |
| 2,438,500 | 3/48 | Hertzler | 198—45 |
| 2,467,773 | 4/49 | Parker | 209—81 |
| 2,468,639 | 4/49 | Sample | 130—30 |
| 2,558,894 | 7/51 | Wright | 130—30 |
| 2,623,635 | 12/52 | Ward | 209—81 |
| 2,633,685 | 4/53 | Edwards | 171—28 |
| 2,758,697 | 8/56 | Schultz | 198—30 |
| 2,790,532 | 4/57 | Albertoli | 198—30 |
| 2,848,099 | 8/58 | Triglione | 198—45 |
| 3,034,585 | 8/59 | Rainville et al. | 171—28 |

T. GRAHAM CRAVER, *Primary Examiner.*

CARL W. ROBINSON, ANTONIO F. GUIDA, ARNOLD RUEGG, *Examiners.*